(12) United States Patent
Penilla et al.

(10) Patent No.: US 10,282,708 B2
(45) Date of Patent: *May 7, 2019

(54) SERVICE ADVISOR ACCOUNTS FOR REMOTE SERVICE MONITORING OF A VEHICLE

(71) Applicant: Emerging Automotive, LLC, Los Altos, CA (US)

(72) Inventors: Angel A. Penilla, Sacramento, CA (US); Albert S. Penilla, Sunnyvale, CA (US)

(73) Assignee: Emerging Automotive, LLC, Los Altos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/928,054

(22) Filed: Mar. 21, 2018

(65) Prior Publication Data
US 2018/0211231 A1  Jul. 26, 2018

Related U.S. Application Data

(63) Continuation of application No. 15/696,618, filed on Sep. 6, 2017, now Pat. No. 9,928,488, and a
(Continued)

(51) Int. Cl.
*G06Q 10/00* (2012.01)
*G01M 17/007* (2006.01)
(Continued)

(52) U.S. Cl.
CPC .......... *G06Q 10/20* (2013.01); *G01M 17/007* (2013.01); *G06Q 10/06314* (2013.01);
(Continued)

(58) Field of Classification Search
CPC .. G06Q 10/20; G06Q 30/08; G06Q 10/06314; G06Q 10/1095; G06Q 30/0611;
(Continued)

(56) References Cited

U.S. PATENT DOCUMENTS 3,690,397 A    9/1972 Parker
3,799,063 A    3/1974 Reed
(Continued)

*Primary Examiner* — Nha T Nguyen

(57) ABSTRACT

Methods and systems are provided. One method includes receiving a request, at a server, to establish an advisor account for a vehicle associated with a user account. The request identifies a service entity and a vehicle service to be assigned to the service entity. The service entity is configured to receive said diagnostics data of the vehicle. The advisor account is associated to the service entity. Programming data is sent to the vehicle for use by a computer of the vehicle to identify select diagnostics data that relates to the vehicle service and to make accessible said select diagnostics data to the advisor account. The advisor account is made accessible to the service entity subsequent to establishing of the advisor account. The server receives select diagnostics data from the vehicle regarding the vehicle service, and the select diagnostics data is accessible for viewing and/or processing by a device of the service entity. The select diagnostics data produces updates that identify characteristics or changes in characteristics that relate to the vehicle service, and the server uses the identified characteristics or changes in characteristics to trigger a notification to the service entity regarding a problem or potential problem regarding the vehicle service.

17 Claims, 40 Drawing Sheets

Related U.S. Application Data continuation of application No. 15/615,812, filed on Jun. 6, 2017, now Pat. No. 9,818,088, which is a continuation of application No. 14/176,138, filed on Feb. 9, 2014, now Pat. No. 9,697,503, which is a continuation of application No. 15/607,418, filed on May 26, 2017, which is a continuation of application No. 14/063,638, filed on Oct. 25, 2013, now Pat. No. 9,189,900, and a continuation-in-part of application No. 14/063,837, filed on Oct. 25, 2013, now Pat. No. 9,139,091, which is a continuation-in-part of application No. 13/842,158, filed on Mar. 15, 2013, now Pat. No. 9,229,905, which is a continuation-in-part of application No. 13/452,882, filed on Apr. 22, 2012, now Pat. No. 9,123,035.

(60) Provisional application No. 61/896,007, filed on Oct. 25, 2013, provisional application No. 61/745,729, filed on Dec. 24, 2012, provisional application No. 61/478,436, filed on Apr. 22, 2011.

(51) Int. Cl.
| | | |
|---|---|---|
| *G06Q 30/08* | (2012.01) | |
| *G06Q 10/06* | (2012.01) | |
| *G06Q 10/10* | (2012.01) | |
| *G07C 5/00* | (2006.01) | |
| *G07C 5/08* | (2006.01) | |
| G06Q 30/02 | (2012.01) | |
| G06Q 30/06 | (2012.01) | |
| H04W 4/02 | (2018.01) | |

(52) U.S. Cl.
CPC ......... *G06Q 10/1095* (2013.01); *G06Q 30/08* (2013.01); *G07C 5/006* (2013.01); *G07C 5/0808* (2013.01); *G06Q 30/0282* (2013.01); *G06Q 30/0283* (2013.01); *G06Q 30/0611* (2013.01); *G07C 5/008* (2013.01); *H04W 4/023* (2013.01)

(58) Field of Classification Search
CPC .......... G06Q 30/0283; G06Q 30/0282; G01M 17/007; G07C 5/0808; G07C 5/006; G07C 5/008; H04W 4/023
See application file for complete search history.

(56) References Cited

U.S. PATENT DOCUMENTS

| | | |
|---|---|---|
| 3,867,682 A | 2/1975 | Ohya |
| 4,052,655 A | 10/1977 | Vizza |
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |
| 5,121,112 A | 6/1992 | Nakadozono |
| 5,132,666 A | 7/1992 | Fahs |
| 5,184,058 A | 2/1993 | Hesse |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,343,970 A | 9/1994 | Severinsky |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diller et al. |
| 5,488,283 A | 1/1996 | Dougherty et al. |
| 5,492,190 A | 2/1996 | Yoshida |
| 5,548,200 A | 8/1996 | Nor et al. |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Nor |
| 5,595,271 A | 1/1997 | Tseng |
| 5,596,258 A | 1/1997 | Kimura et al. |
| 5,612,606 A | 3/1997 | Guimarin et al. |
| 5,627,752 A | 5/1997 | Buck et al. |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,892,598 A | 4/1999 | Asakawa et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,301,531 B1 | 10/2001 | Pierro |
| 6,307,349 B1 | 10/2001 | Koenck et al. |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,416,209 B1 | 7/2002 | Abbott |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestman et al. |
| 6,498,454 B1 | 12/2002 | Pinlam |
| 6,511,192 B1 | 1/2003 | Henion |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova |
| 6,794,849 B2 | 9/2004 | Mori et al. |
| 6,850,898 B1 | 2/2005 | Murakami |
| 6,915,869 B2 | 7/2005 | Botti |
| 6,922,629 B2 | 7/2005 | Yoshikawa et al. |
| 6,937,140 B1 | 8/2005 | Outslay |
| 6,940,254 B2 | 9/2005 | Nagamine |
| 7,013,205 B1 | 3/2006 | Hafner |
| 7,039,389 B2 | 5/2006 | Johnson, Jr. |
| 7,084,781 B2 | 8/2006 | Chuey |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |

(56) References Cited

U.S. PATENT DOCUMENTS

| | | |
|---|---|---|
| 7,402,978 B2 | 7/2008 | Pryor |
| 7,532,965 B2 | 5/2009 | Robillard |
| 7,565,396 B2 | 7/2009 | Hoshina |
| 7,630,802 B2 | 12/2009 | Breed |
| 7,650,210 B2 | 1/2010 | Breed |
| 7,674,536 B2 | 3/2010 | Chipchase |
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,751,945 B2 | 7/2010 | Obata |
| 7,778,746 B2 | 8/2010 | McLeod |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B1 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 9,622,159 B2 | 4/2017 | Buttolo et al. |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0035741 A1 | 2/2005 | Elder |
| 2005/0044245 A1 | 2/2005 | Hoshina |
| 2005/0110460 A1 | 5/2005 | Arai |
| 2005/0231119 A1 | 10/2005 | Ito et al. |
| 2006/0125620 A1 | 6/2006 | Smith et al. |
| 2006/0182241 A1 | 8/2006 | Schelberg |
| 2006/0247832 A1* | 11/2006 | Taki .................. G06Q 10/02 |
| | | 701/31.4 |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0287578 A1 | 11/2009 | Paluszek |
| 2009/0304101 A1 | 12/2009 | LoPorto |
| 2009/0312903 A1 | 12/2009 | Hafner et al. |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0037057 A1 | 2/2010 | Shim |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichai et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |

(56) References Cited

U.S. PATENT DOCUMENTS

| | | |
|---|---|---|
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032110 A1 | 2/2011 | Taguchi |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | Nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Tucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0042968 A1 | 2/2014 | Hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

\* cited by examiner

User 1

| User 1 Logins | User 1 Roles | User 1 Vehicles |
|---|---|---|
| • Administrator(edit)<br>Add New | • Owner(edit)<br>• Weekend driving(edit)<br>• Commute driving(edit)<br>Add New | • Ford SUV(edit)<br>• Honda Hybrid(edit)<br>Add New |

User 2

| User 2 Logins | User 2 Roles | User 2 Vehicles |
|---|---|---|
| • Child(edit) | • School commute(edit)<br>• Errands(edit) | • Honda Hybrid |

User 1

| User 2 Logins | User 2 Roles | User 2 Vehicles |
|---|---|---|
| • Child(edit)<br>Add New | • School commute(edit)<br>• Errands(edit)<br>Add New | • Honda Hybrid<br>Add New |

FIG. 2

User 2

| User 2's login settings for login: CHILD | |
|---|---|
| Fuel use settings | • Electric battery<br>• Plug in<br>• Fuel<br>• Hybrid |
| Driving characteristics | • Speed restrictions<br>• Fuel use restrictions |
| Location based settings | • GPS aided travel restrictions<br>• Map restrictions<br>• Travel radius boundaries<br>• Dynamically load maps<br>• Dynamically load directions<br>• Dynamically load fuel<br>• Dynamically load charge<br>• Dynamically load battery<br>• Fuel purchase location restrictions |
| Time based use and restrictions | • Day driving<br>• Night driving<br>• Time specific driving |
| Automatic purchase settings | • Financial institution linking<br>• Fuel purchase settings<br>• Charge time purchase settings<br>• Battery purchase settings<br>• Car wash purchase settings |

User editable

Admin or restricted

FIG. 4

User 2

| User 1's login settings for login: CHILD ||
|---|---|
| Tracking & metrics | • Vehicle cameras<br>• Vehicle event recording<br>• Mileage usage characteristics<br>• Top & average speeds<br>• Driving history maps and graphs<br>• Fuel efficiency<br>• Wear and tear notifications |
| Comfort | • Climate<br>• Seats positions<br>• Seat heater / cooler<br>• Suspension/ride settings<br>• Entry lighting<br>• Remote start / stop |
| Entertainment | • Radio Memory<br>• Internet access settings<br>• Streaming services |
| Driving Modes | • Sport<br>• Comfortable<br>• Soft<br>• Off-road<br>• High performance<br>• Economy |
| Refueling routing and purchase | • Incentive based fuel finder<br>• Refueling availability maps<br>• Offers<br>• History<br>• Metrics |

User editable
Admin or restricted

FIG. 5

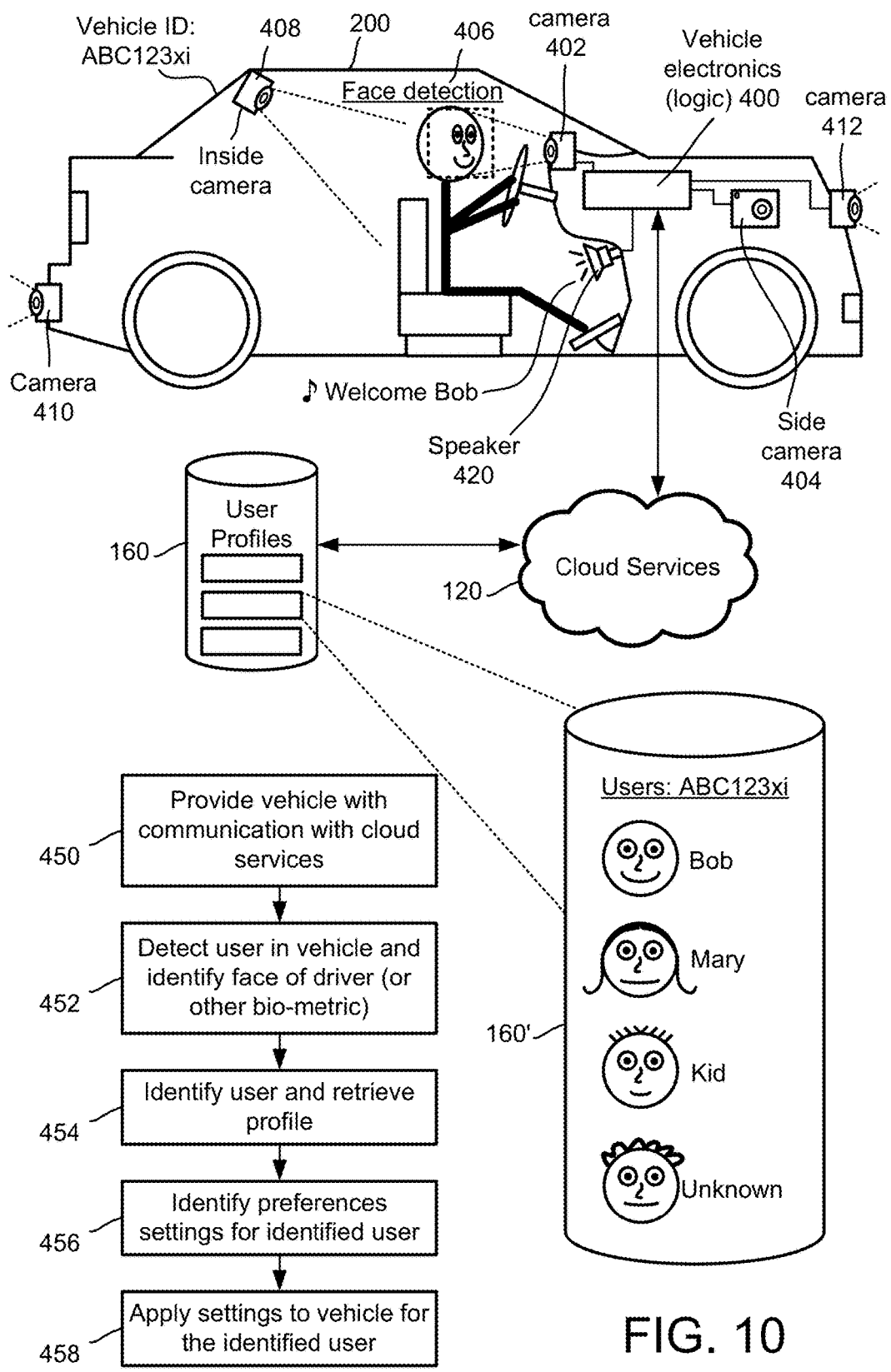

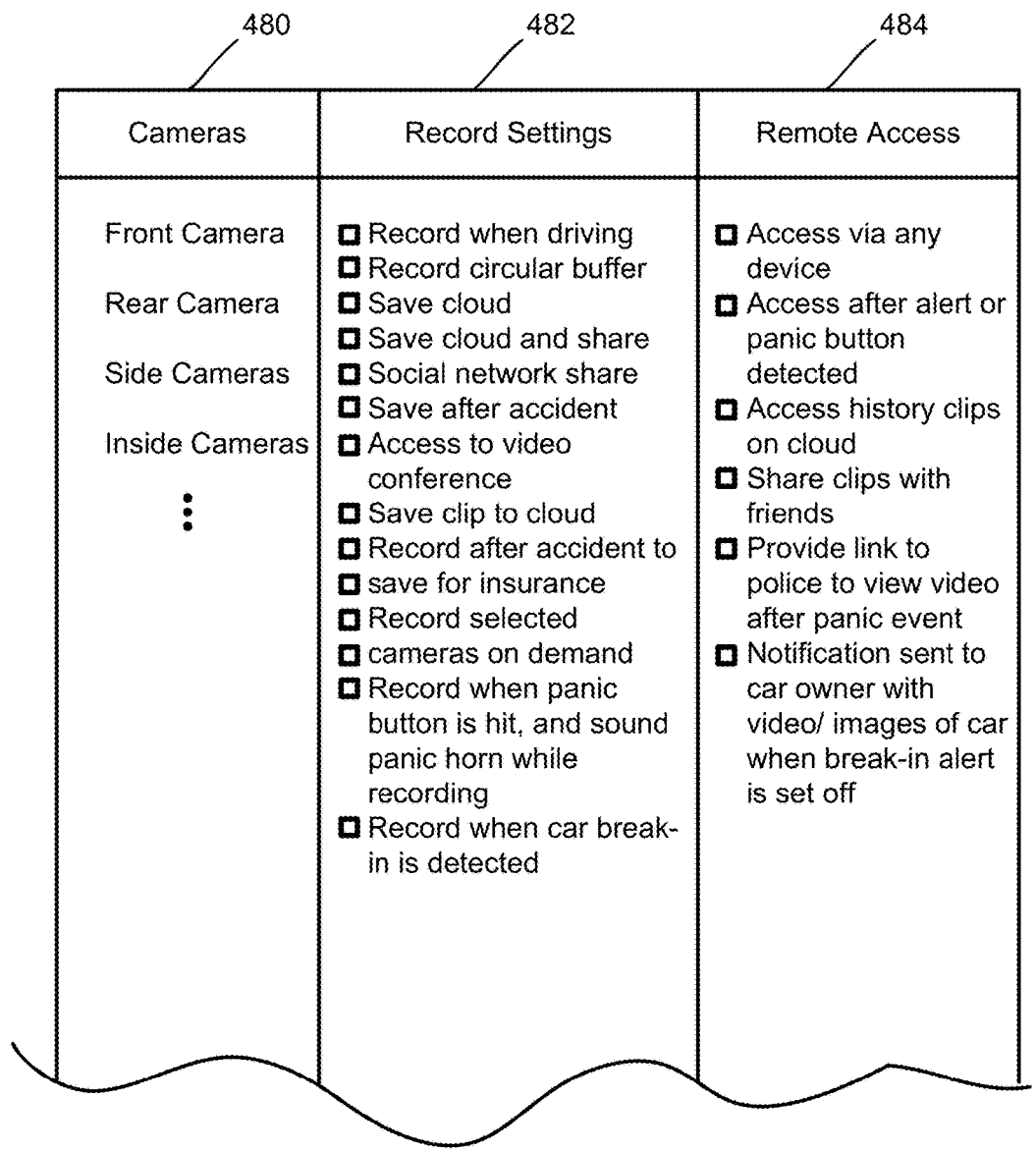

| Cameras | Record Settings | Remote Access |
|---|---|---|
| Front Camera<br><br>Rear Camera<br><br>Side Cameras<br><br>Inside Cameras<br><br>⋮ | ☐ Record when driving<br>☐ Record circular buffer<br>☐ Save cloud<br>☐ Save cloud and share<br>☐ Social network share<br>☐ Save after accident<br>☐ Access to video conference<br>☐ Save clip to cloud<br>☐ Record after accident to save for insurance<br>☐ Record selected cameras on demand<br>☐ Record when panic button is hit, and sound panic horn while recording<br>☐ Record when car break-in is detected | ☐ Access via any device<br>☐ Access after alert or panic button detected<br>☐ Access history clips on cloud<br>☐ Share clips with friends<br>☐ Provide link to police to view video after panic event<br>☐ Notification sent to car owner with video/ images of car when break-in alert is set off |

FIG. 11

Manufacturer API  130
Class:
HVAC

1954 — Data declarations:  1950
currentTempLeft = 60
currentTempRight = 70
StatusAC = True
isAuto = True
isDual = True
displaySkin = modern
scheduleAMtemp(time)
learnedTemp1 = 74
learnedTemp1Time = 803am
learnedTemp1Days = MTWTHF
learnedTemp2 = 60
learnedTemp2Time = 513pm
learnedTemp2Days = MTWTHF
learnedTemp2AC = on
IcePresent = false
fastefrostMode = off
Errors = false 1956 — Function Declarations
updateTemp(left,right);
getTempRight(temp);
getTempLeft(temp);
setTempLeft(temp);
setTempLeft(temp);
toggleAC();
toggleAuto();
toggleDual();
toggleSkin(skinID);
scheduleAMTemp(temp, time, date, frequency);
schedulePMTemp(temp,time,date,frequency);
learnTempBackgroundRoutine(temp, time, date, frequency);
updateDisplay()

104
        ⎯EZ FUN HVAC APP
1972
        ⎯updateTemp(80,76);

```
{
        setLeftTo = 80;
        setRightTo = 76;
        theCurrentTempR = getTempRight(temp);
        theCurrenTempL = getTempLeft(temp);
        if setLeftTo != theCurrentTempL
        {
                setTempLeft(left);
        }
        if setRightTo != theCurrentTempR
        {
                setTempRight(right);
        }
        updateDisplay()

If isError()
        {
                return isError();
        }

Learned Behavior Vehicle Application

Past Actions Data

Average for a Monday in December
Engine start: 803am
Fuel level range: 50 miles
Temp in vehicle at start: 32F
Heat set to after vehicle start: 75F
Ice present on windshield: yes
Defrost activated: yes
How long between defrost process and vehicle moving: 7 minutes
Vehicle depart time: 810am
AC set to after vehicle start: NA
Miles driven at vehicle shut off: 15 miles
Engine start: 505PM
Fuel level range: 35 miles
Temp in vehicle at start: 76F
Heat Set to after vehicle start: NA
AC set to after vehicle start: 65F
Time to reach 65F: 4 minutes
Miles Driven at vehicle shut off: 15 miles

Average for a Tuesday in December
Engine start: 805am
Fuel level range: 20 miles
Temp in vehicle at start: 30F
Heat set to after vehicle start: 80F
Ice present on windshield: yes
Defrost activated: yes
How long between defrost process and vehicle moving: 7 minutes
Vehicle depart time: 812am
AC set to after vehicle start: NA
Miles driven at vehicle shut off: 18 miles
Engine start: 510PM
Fuel level range: 5 miles
Temp in vehicle at start: 78F
Heat Set to after vehicle start: NA
AC set to after vehicle start: 65F
Time to reach 65F: 5 minutes
Miles Driven at vehicle shut off: 15 miles

Past Actions Data

Average for a Saturday in December
Engine start: 12:15PM
Fuel level range: 40 miles
Temp in vehicle at start: 65F
Heat set to after vehicle start: NA
Ice present on windshield: no
Defrost activated: no
How long between defrost process and vehicle moving: NA
Vehicle depart time: 12:16PM
AC set to after vehicle start: NA
Miles driven at vehicle shut off: 5 miles
Engine start: 12:28PM
Fuel level range: 35 miles
Temp in vehicle at start: 65F
Heat Set to after vehicle start: NA
AC set to after vehicle start: NA
Time to reach NAF: NA
Miles Driven at vehicle shut off: 5 miles

Learned Behavior Vehicle Application

Learned Behavior Logic Assumptions and Deductive Reasoning

Check the user's calendar and adjust assumptions based on when the first meeting is, the meeting's location, how long it will take to get the vehicle's temperature and defrosting if applicable completed and if the user needs to re-fuel before arriving at work.

User most likely will start the engine between 803am and 805am

If the temperature is in the 30s inside the vehicle, the user will most likely heat the vehicle to the mid 70s to 80 degrees. Also the user is not likely to use the AC.

If there is ice present on the windshield, the user will most likely activate defrosting measures for 7 minutes before departure.

User usually drives between 15 and 18 miles

The user usually starts the vehicle in the afternoon between 5:05 and 5:10PM

If the temperature is in the mid 70s, the user usually activates the AC to achieve a temperature of 65 degrees The user is normally comfortable on Saturdays when the temperature in the vehicle is 65 degrees. No advance cooling or heating required. The usually makes frequent stops on Saturday and may benefit from route prioritization apps and Gas/Time saving routes, fuel stations, sponsored paths etc.

Learned Behavior Vehicle Application

Potential Actions using Logic & Past Data

Vehicle Learning App Decisions:

Tuesday PM:
The user will most likely need to drive ~16.5 miles on Wednesday morning but only has a range of 5 miles. Email and or text the user that they will need extra time to get to work in the morning due to re-fueling and that the vehicle will be auto starting 12 minutes earlier than usual. Confirm decision is ok with the user.

Wednesday AM:
Vehicle is usually started at ~804am and defrosted for 7 minutes when ice is present and usually departs at 811am, but the user needs 12 minutes to refuel. Start vehicle at 752am and defrost until 759am while heating to 77F because when the temperature is 34F like today inside the vehicle, the user likes the temperature to be about 77F. Set the user's ratio station to 102.5, the most commonly listened to station at this time. Display stock information for the most commonly queries stocks at this time. Check most common commute route in and make sure there aren't delays, else suggest a new route in advance. The user typically goes to coffee on the way to work. Launch the nearest Starbucks coffee location APP. The user usually "one button touch" orders and pays for a medium coffee. Directly from the app.

Friday PM:
Tell the user Saturdays are normally full of errands. Suggest the user send tomorrow's itinerary to the vehicle's app on the network or directly on the vehicle to report if and when the user should get started due to traffic, road construction, suggest fuel locations and ask if 65F degrees is still ok or adjust to a different temperature before the user enters the car around 12pm. Ask the user what time they will most likely depart if its not at 12pm like usual. Download specials and coupons for locations the user typically frequents on Saturdays and display to the user on the vehicle's interface on the user's mobile device.

Saturday PM:
The user said they would like to get started at 10am today but the vehicle interior is more than 20% lower than the user usually likes it. Turn the vehicle on at 955am and heat to 65F since 65F seems to be the user's most commonly used temperature. Display the specials for the nearest dry cleaner since the user typically gets dry cleaning done on Saturdays based on GPS data. Show the user lunch specials nearby and deals to claim since the user usually stops for lunch while out on errands on Saturday.

SERVICE ADVISOR ACCOUNTS FOR REMOTE SERVICE MONITORING OF A VEHICLE

CLAIM OF PRIORITY

The present application is a continuation of U.S. application Ser. No. 15/696,618 filed on Sep. 6, 2017, entitled "Methods and Systems for Assigning Service Advisor Accounts for Vehicle Systems and Cloud Processing" which is a continuation of U.S. application Ser. No. 15/615,812 filed on Jun. 6, 2017 (now U.S. Pat. No. 9,818,088, issued on Nov. 14, 2017) entitled "Vehicles and Cloud Systems for Providing Recommendations to Vehicle Users to Handle Alerts Associated with the Vehicle" which is a continuation of U.S. patent application Ser. No. 14/176,138, filed on Feb. 9, 2014, (now U.S. Pat. No. 9,697,503, issued on Jul. 4, 2017) entitled "Methods and Systems for Providing Recommendations to Vehicle users to Handle Alerts Associated with the Vehicle and A Bidding Market Place for Handling Alerts/Service of the Vehicle," which claims priority of U.S. Provisional Patent Application No. 61/896,007, filed on Oct. 25, 2013, entitled "Methods and Systems for Intelligent Software, Data, Job, Bid and Offer Transfer between Entities though a Vehicle Service Marketplace," which are herein incorporated by reference.

U.S. application Ser. No. 15/696,618 is a continuation of U.S. application Ser. No. 15/607,418 filed on May 26, 2017, entitled "Vehicles and Cloud Systems for Assigning Temporary E-Keys to Access use of a Vehicle," which is a continuation of U.S. application Ser. No. 14/063,638, filed on Oct. 25, 2013 (now U.S. Pat. No. 9,189,900, issued on Oct. 28, 2015), entitled "Methods and Systems for Assigning e-Keys to Users to Access and Drive Vehicles," which are incorporated by reference.

U.S. patent application Ser. No. 14/176,138 is a continuation-in-part of U.S. patent application Ser. No. 14/063,837, filed on Oct. 25, 2013, (now U.S. Pat. No. 9,139,091, issued on Sep. 22, 2015) entitled "Methods and Systems for Setting and/or Assigning Advisor Accounts to Entities for Specific Vehicle Aspects and Cloud Management of Advisor Accounts," which claims priority, as a continuation-in-part of U.S. application Ser. No. 13/842,158, filed on Mar. 15, 2013, (now U.S. Pat. No. 9,229,905, issued on Jan. 5, 2016) entitled "Methods and Systems for Defining Vehicle User Profiles and Managing User Profiles via Cloud Systems and Applying Learned Settings to User Profiles", which claimed priority of U.S. Provisional Patent Application No. 61/745,729, filed on Dec. 24, 2012, and entitled "Methods And Systems For Electric Vehicle (EV) Charging, Charging Systems, Internet Applications And User Notifications", all of which are herein incorporated by reference.

U.S. patent application Ser. No. 14/176,138 is a continuation-in-part of U.S. application Ser. No. 13/452,882, filed Apr. 22, 2012, (now U.S. Pat. No. 9,123,035, issued on Sep. 1, 2015) and entitled "Electric Vehicle (EV) Range Extending Charge Systems, Distributed Networks Of Charge Kiosks, And Charge Locating Mobile Apps", which claims priority to U.S. Provisional Application No. 61/478,436, filed on Apr. 22, 2011, all of which are incorporated herein by reference.

FIELD OF THE EMBODIMENTS

The present invention relates to systems and methods for managing user profiles for vehicles and exchange of information with cloud-based processing systems.

BACKGROUND

Vehicles, such as motorized vehicles and electric vehicles have been around for some time. Vehicles provide a means that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles. It is in this context that embodiments of the invention arise.

SUMMARY

The methods, systems and apparatus include electronics of vehicles that drive display devices in vehicles and communicate wirelessly with Internet services.

Methods and systems provide access to cloud services over the Internet for managing a user profile of a vehicle on a cloud processing system connected to the Internet. One example method includes receiving requests to access the user profile to define settings for one or more vehicles. The method includes receiving input for user settings at the vehicle using the cloud processing system. The method includes processing the input over time to learn behavior associated with the input to the use settings. The method includes transmitting settings to the vehicle to be automatically implemented based on the learned behavior. In one example, the profile is associated with a plurality of vehicle types and the method includes detecting a violation of a setting or an incompatible setting in the profile that is user defined via the user account. The method can then automatically send a notification to a predefined administrator of the profile. The method being executed by a processor.

The profile can be transferred to one or more vehicles, can be set for a temporary period of time, can be set with wireless payment systems, and is accessible over the Internet to accept changes or updates.

In one embodiment, a user can assign an ad advisor account to any individual. The Advisor account can be for any duration, and the duration can be set by the user. In one embodiment, the advisor account can be assigned to a guest driver of a vehicle. The guest driver can be, for example, a friend, a known individual, a service person, a valet person or valet service, etc. The creation of an advisor account can therefore be for a short duration, or long duration, or permanently, or until the account is canceled, stopped, revoked, expires, or eliminated by the person/user that issued or created the advisor account. In one embodiment, the advisor account can act to provide access to a vehicle.

In one embodiment, a method includes receiving a request, at a server, to establish an advisor account for a vehicle to be associated a user account. The request identifies a service entity and a vehicle service to be assigned to the service entity. The service entity is configured to receive said diagnostics data of the vehicle. The advisor account is associated to the service entity. Programming data is sent to the vehicle for use by a computer of the vehicle to identify select diagnostics data that relates to the vehicle service and to make accessible said select diagnostics data to the advisor account. The advisor account is made accessible to the service entity subsequent to establishing of the advisor account. The server receives select diagnostics data from the vehicle regarding the vehicle service, and the select diagnostics data is accessible for viewing and/or processing by a device of the service entity. The select diagnostics data produces updates that identify characteristics or changes in characteristics that relate to the vehicle service, and the server uses the identified characteristics or changes in characteristics to trigger a notification to the service entity regarding a problem or potential problem regarding the vehicle service.

In one embodiment, a method includes receiving a request, at a server, to define an advisor account for a vehicle associated with a user account. The request identifies an advisor entity, a vehicle aspect to be assigned to the advisor entity, and privileges assigned to the advisor entity for the vehicle aspect. The method further includes generating the advisor account for the advisor entity as a sub-account of the user account that is associated with the vehicle. The method includes sending instruction data to the vehicle from the server, wherein the instruction data defines that the vehicle aspect is associated with the advisor account. The method also includes receiving data updates, at the server, from the vehicle for the vehicle aspect, from time to time. The data updates are displayable on a user interface that is accessible to the advisor entity, the user interface being rendered by the server that provides access to the advisor account.

In some embodiments, the privileges define a level of access to data about the vehicle or remote access of the vehicle via the advisor account for the vehicle aspect.

In some embodiments, the user account includes a plurality of advisor accounts; each advisor account is associated with the vehicle and assigned to different advisor entities for different vehicle aspects, each of the different vehicle aspects being assigned with same or different privileges.

In some embodiments, a vehicle aspect is a part, feature, function, operation or combinations thereof of the vehicle, and each vehicle aspect or multiple vehicle aspects are assignable to the advisor account with associated privileges.

In some embodiments, the data updates define characteristics or changes in characteristics of the vehicle aspect.

In some embodiments, the advisor account enables remote access to the vehicle to act upon a feature of the vehicle aspect.

In some embodiments, the method further includes receiving one or more request from the user account associated with the vehicle to assign one or more advisor accounts that are in addition to the advisor account, wherein each of the advisor accounts are associated with different vehicle aspects of the vehicle.

In some embodiments, the advisor account includes a communication protocol to enable a user of the advisor account to provide advice regarding the vehicle aspect.

In some embodiments, the user of the advisor account, in accordance with the privileges, is enabled to perform remote diagnostics to provide additional advice, order parts and schedule appointments.

In some embodiments, the privileges are associated with the vehicle aspect for which the advisor account is defined; the privileges exclude access to vehicle aspects not included in the privileges via the advisor account.

In some embodiments, driver accounts are defined as sub-accounts to the user account, the driver accounts define roles that limit or enable aspects of the vehicle.

In some embodiments, advisor account access and details are enabled via a website or an application, the website or application provide user interface screens for creating accounts, editing accounts and viewing activity and history regarding the accounts.

In some embodiments, the vehicle aspect is one or more of engine oil, engine light, oil pressure, battery status, electric powertrain status, phone lists, temperature, cooling system, charging system, radio settings, geo-location data, advisor history, tire rotation, tire heath, oil filter, battery, brake pads, brake systems, wipers, coolant, brake oil, transmission fluid, air filter, recall condition, broken part, service cycle, maintenance updates, part updates, advertisements regarding the vehicle, suggestions, and combinations of two or more thereof.

In one embodiment, a method for assigning and using advisor accounts for a vehicle is provided. The method includes receiving a request, at a server, to define an advisor account for a vehicle associated with a user account, the request identifying an advisor entity, a vehicle aspect to be assigned to the advisor entity, and privileges assigned to the advisor entity for the vehicle aspect. The method further includes generating the advisor account, at a server, for the advisor entity as a sub-account of the user account that is associated with the vehicle. The method also includes sending instruction data, from the server, to the vehicle, the instruction data defining that the vehicle aspect is associated with the advisor account. The method also receives data updates, at the server, from the vehicle for the vehicle aspect, from time to time, the data updates being displayable on a user interface that is accessible to the advisor entity, the user interface being rendered by the server that provides access to the advisor account, wherein the privileges define a level of access to data about the vehicle or remote access of the vehicle via the advisor account for the vehicle aspect and the user account is enabled to create a plurality of advisor accounts, each advisor account is associated with the vehicle and assigned to different advisor entities for different vehicle aspects, each of the different vehicle aspects being assigned with same or different privileges as defined in the advisor account. The method is executed by a processor.

In some embodiments, a vehicle aspect is a part, feature, function, operation or combinations thereof of the vehicle, and each vehicle aspect or multiple vehicle aspects are assignable to the advisor account with associated privileges.

In some embodiments, the data updates define characteristics or changes in characteristics of the vehicle aspect.

In some embodiments, the advisor account enables remote access to the vehicle to act upon a feature of the vehicle aspect.

In some embodiments, the advisor account includes a communication protocol to enable a user of the advisor account to provide advice regarding the vehicle aspect.

In some embodiments, the user of the advisor account, in accordance with the privileges, is enabled to perform remote diagnostics to provide additional advice, order parts and schedule appointments.

In some embodiments, the advisor accounts can be issued to any type of vehicle. Without limitation, the types of vehicles can include personal vehicles; company owned vehicles, fleet vehicles, delivery vehicles, mass transport vehicles, shared vehicles, electric vehicles, two wheel vehicles, tractor trailers, commuter vehicles, trains, planes, cars, trucks, campers, trailers, etc.

BRIEF DESCRIPTION OF DRAWINGS

FIG. 2 shows additional role settings for different users, in accordance with one embodiment.

FIGS. 3-5 show additional vehicle profile settings, in accordance with one embodiment.

FIG. 10 illustrates validation method for enabling a profile on a vehicle and biometric validation, in accordance with one embodiment.

FIG. 11 illustrates various settings for a profile and adjustments that can be made over the Internet via a device, e.g., using a portable device or the vehicle electronics and displays, and remote controls and settings in accordance with one embodiment.

FIG. 13B describes one example of how stored data and function declarations may be compiled to provide intermediary access to a vehicle's computer controlling vehicle systems, in accordance with one embodiment.

FIG. 13C describes a set of computer readable and executable code that can be compiled together by a third party APP developer in the form of an APP, in accordance with one embodiment.

FIG. 16B describes how one of many types of inputs into an assumption and reasoning logic module can be compiled over time, in accordance with one embodiment.

FIG. 16C describes one example of what an assumption and reasoning logic module may produce using the data points collected on an ongoing basis in FIG. 16B, in accordance with one embodiment.

FIG. 16D describes an example list of decision the decision and action engine may take based on information provided by the assumption and reasoning logic module and sets of assumptions created, in accordance with one embodiment.

DETAILED EMBODIMENTS

Figure 1:
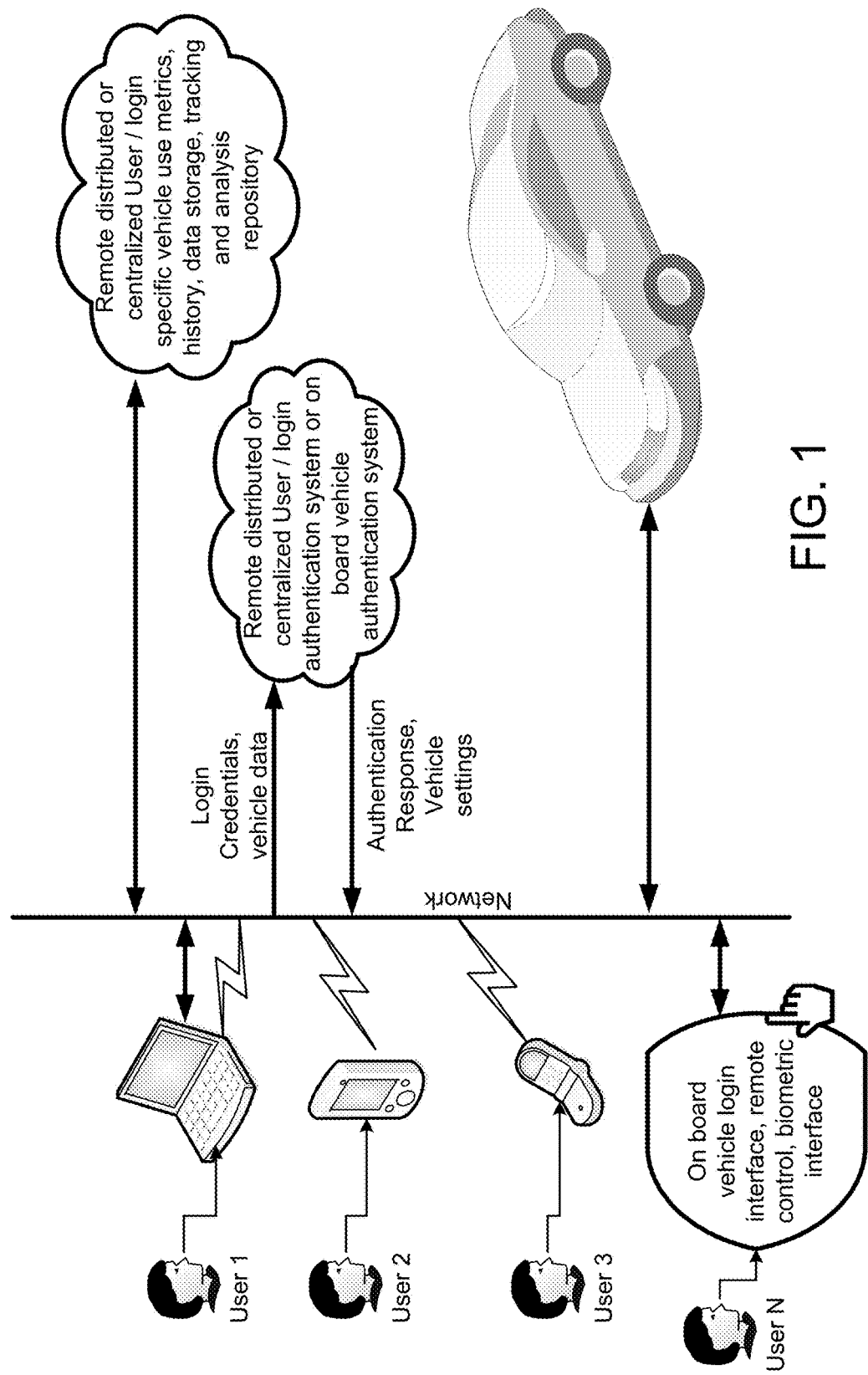
FIG. 1 shows example profiles settings for a vehicle, and association to roles, in accordance with one embodiment.

Embodiments of the present invention define methods, systems and apparatus for use in vehicles. The methods, systems and apparatus include electronics of vehicles that drive display devices in vehicles and communicate wirelessly with Internet services.

The Internet services provide access to cloud services. The cloud services provide access to user accounts and access to settings, configurations, applications and other customization defined by the user. Customization can include user interface customization of a vehicle display or displays. The customization can include the ability to select specific applications (APPS) to be activated by the vehicle and interfaced via the display or displays, voice input, touch input, etc. The customization is also provided with a learning engine that learns use behavior by the user or patterns of behavior of multiple users, and automatically implements settings or programming to aspects of the user interface, or provides recommendations or notifications with recommendations. The programming can include automatic programming at certain times, days, months, years, etc., and can be updated or molded over time as the user continues to use the vehicle UI.

In one embodiment, a user can assign and add advisor account to any individual. The Advisor account can be for any duration, and the duration can be set by the user. In one embodiment, the advisor account can be assigned to a guest driver of a vehicle. The guest driver can be, for example, a friend, a known individual, a service person, a valet person or valet service, etc. The creation of an advisor account can therefore be for a short duration, or long duration, or permanently, or until the account is canceled, stopped, revoked, expires, or eliminated by the person/user that issued or created the advisor account. In one embodiment, the advisor account can act to provide access to a vehicle.

In one embodiment, access can be by way of electronic keys (e.g., e-keys), which can be sent by a vehicle owner/admin to some person or entity. For example, the user-owner of the vehicle can assign a valet with access to the vehicle by going on an application (App or website) on a computing device (e.g., mobile or non-mobile device), identifying the recipient, identifying a mode for communicating with the recipient (e.g., text, email, message, notification, etc.), selecting the account privileges (e.g., what type of access, speed limits, geographic restrictions, amount of time the e-keys will be valid (or else expire)), and requesting that e-keys be sent to the recipient.

In one embodiment, a user can access cloud services for a vehicle manufacturer and identify the particular vehicle from selected choices. The user can then identify a customization profile for the vehicle by defining the look and feel of a UI display, arrangement of vehicle controls on displays, add and associate third party APPS to the vehicle display, and save the configuration.

The configuration, in one embodiment, is saved to the profile of the user. In one embodiment, the profile is saved on a database of a specific vehicle manufacturer that offers the customization option. In still other embodiments, once a configuration is saved to the profile account of a user, that configuration can be shared to other vehicles of the user. In still other embodiments, when a user buys a new car, the custom configuration can be transferred either entirely or partially to the new vehicle. In some embodiments, if the vehicle has more or less system functions, the customization can be adjusted automatically or the user can be provided with options to update the customization to add or delete features. In one embodiment, the customization will be facilitated via a website. In one embodiment, the website may be of the vehicle manufacturer. In one embodiment, the website of the vehicle manufacturer can allow the user to add APPS that are created by third parties. The third parties can create APPS that communicate with APIs of the system components of specific vehicles of the manufacturer. Once APPS are selected, the user can add them to the custom user interface (UI) display.

The user can also be allowed to arrange the APPS or icons of APPS in a specific custom arrangement that is saved to the user's profile. In one embodiment, the user's profile can also be run on various vehicles, other than those owned by the user. For instance, if the user is renting a vehicle and the vehicle has access to cloud services, the user can enter his user name and password (or other identifiers), which log the user into the cloud services and saved profiles. The saved profiles will then enable logic to build a custom UI for the user based on the vehicle being driven. In one embodiment, the system components and APIs of the system components of the rented vehicle can be paired or linked to the user's saved APP selections.

The user's saved UI configuration may also be transferred to the display of the rented (or other vehicle) vehicle. A best-fit configuration can also be generated using the user's profile selections, so that the configuration provided for the other vehicle will closely resemble or appear as it does for the configured vehicle. In other embodiments, the user's use metrics can be monitored. The use metrics can include use of APPS, use be of system components of the vehicle, use of the vehicle, environment conditions, and historical actions taken by the user via the input/output controls of the vehicle (e.g., buttons, levers, keys, fobs, display selections, display interface actions, communication actions, etc.).

These historical actions can then be used to define learned actions. The learned actions can be analyzed to change configuration settings in the user's saved profile. For instance, if the user uses a particular APP every day at a particular time, that APP icon can be surfaced to the display or preset to start. The APP can then provide information to the user at about the same time the user normally needs the information. Other historical use patterns can be monitored and such data can be saved to the user's profile.

The data can then be used by algorithms that build assumptions based on historical inputs by a user as well as environmental inputs, location inputs, vehicle diagnostic inputs; internet connected marketing deals, the user's calendar, traffic conditions as well as news. The assumptions the algorithm builds are then processed into decisions and actions by an additional algorithmic process to activate local or remote audio and visual alerts, change vehicle systems, display information on a vehicle's displays and request a decision from a user locally or remotely to complete an action.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

A cloud processing system, as described herein, will include systems that are operated and connected to the Internet or to each other using local networking communication protocols. A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.).

The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In other embodiments, the electronics of a vehicle can synchronize with a user's portable electronics. The user's electronics can include, for example mobile devices that include smartphones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as 802.11.ac, 802.11ad and subsequent wireless networking protocols, Bluetooth communication or combinations of Wi-Fi and Bluetooth. It should be understood that vehicle electronics can communicate with cloud processing 120 via any number of communication methods, so long as exchanges of data can be made with cloud processing 120 from time to time.

The communication can be made by vehicle electronics while the vehicle is on or when the vehicle is off, so long as communication and processing circuitry of vehicle electronics has a power source. The power source can include battery power that powers vehicle electronics to communicate with cloud processing 120 when vehicle is turned off. When vehicle is turned on, the battery that drives vehicle electronics can be recharged.

Still further, certain applications can increase in size when being used or decrease in size to enable selection at a later time. For example, selecting the temperature system component may expand the system component to a larger space, thus temporarily removing other displayed components. The user can also select other buttons to access other system controls, other apps, or modify or add applications or system controls. When modifications are made, the modifications are saved to a user database and profile of the user, as managed by cloud services.

Cloud services will therefore allow any future modifications to be made to the custom configuration at any time and from any computer connected to the Internet. Still further, the custom configuration can be transferred to a second vehicle. If the custom configuration is transferred to a second vehicle, the system can select the system components for the second vehicle and attempted do a best match of applications available for the second vehicle that resemble or match the ones used in a first vehicle. Specific settings, arrangements and other features may also be transferred to a second vehicle, by simply transferring the custom configuration to a second vehicle.

In one embodiment, the functions of the specific applications illustrated in the display will be monitored and restricted depending on safety considerations while driving. For example, if the interfacing functionality requires more interactivity with the display, or requires a reading of text or inputting text, those functions will be disabled during operation of the vehicle. Once the vehicle comes to a stop, or is placed in Park, certain of these functions will be activated. In other embodiments, other safety considerations will allow for applications to shift from outputting text to outputting audio or voice. The input can also be changed from touchscreen, button touches, selections, and/or voice input. In still other embodiments, safety considerations can allow certain user interface components to move about the display to provide easier reading while driving or automatic conversion of text to audio.

For example, content being displayed in the center panel display of the vehicle, can be automatically shown in the dashboard display region of the vehicle, such as in front of the steering wheel. In still other embodiments, some content or display data can be moved from the center console or the display in front of the steering wheel to the windshield of the vehicle in a heads-up display area. Accordingly, algorithms executed by the applications and applications of the manufacturer, can cooperate to provide functionality to the application features and interfaces, while maintaining safety parameters defined by rules. The safety parameters will therefore allow content of the user interface to be shifted around to various displays of the vehicle, or translated to voice or audio at certain points in time.

These settings and customizations can be made through the web/cloud services and tools provided by the website of, for example the manufacturer of the vehicle. In one embodiment, the cloud services provided by the manufacturer can be provided by a partner of the manufacturer. The partners of the manufacturer can include software companies that develop, host, or manage certain functionality provided by the vehicle manufacturer. In other embodiments, the partner software companies can integrate tools or components with tools and components of the vehicle manufacturer. This provides for integration with one or more cloud services, software services, Internet services, and services provided by systems of vehicles or systems of the vehicle manufacture. In either case, whether the software and logic is designed and constructed by one or more entities, the cloud services provided by the vehicle manufacturer or the website that provides the tools for customization will appear as a unified simple to use interface for the user. As mentioned above, the cloud services can provide databases for saving the user profile and data associated with the user account.

The user profile can include settings made by the user, customizations made by the user, identification of applications purchased or added to the vehicle customizations, etc. Still further, the user profile data can be part or be associated with the user account. In this manner, the user that customized a user interface can access the Internet at any time, whether through the vehicle or through any other computing device having access to the Internet and make changes, modifications, or access control features of the vehicle remotely. In one embodiment, the profile of the user can be accessed from any vehicle, such as rented vehicles or shared vehicles. Settings and profile data can then be shared for a period of time on any vehicle and use data on that vehicle can be stored.

When the user is not using the vehicle, the custom configuration can be turned off or locked out for another session. Once the user wants to start a new session, the user can log back in and the custom configuration returns. In other embodiments, the custom configuration will automatically turn off when the user is not driving the vehicle or has not logged into the vehicle. In other embodiments, the custom configuration can be automatically turned on when the user is detected. The user can be detected using biometrics, login credentials, image detection of the face, fingerprint detection, retina scans, etc. In some embodiments, biometrics can include data used to identify the user, such as face recognition, fingerprint reading, retina scans, voice detection, or combinations thereof. Still further, the custom configuration can be transferred to other vehicles.

If the user wishes to use his or her custom configuration in another vehicle, the user can login to the custom configuration or user account from another vehicle. If the other vehicle does not have all the system components needed to define the custom configuration, the custom configuration can be supplemented with other similar components automatically. In other embodiments, the custom configuration can be transferred from one vehicle to another, or when the user buys a new vehicle. In another embodiment, the custom configuration can be adjusted based on the driver. The custom configuration can also be preset remotely from the Internet, using the cloud services. The custom configuration can also be configured to provide limited use of certain systems or the vehicle, such as when a guest is driving the vehicle. In other embodiments, restrictions can be placed on the vehicle speed, location of driving, and automatic notifications for the user or the master user of the vehicle. The master user of the vehicle can have a master account with administrator credentials.

In still another embodiment, the vehicle can be loaned to a child of driving age (under 21/18 years of age), and the child can be provided with restricted use of the vehicle. When the child exceeds or does not follow the restrictions of the vehicle, automatic notifications can be provided to the user that is the administrator of the vehicle. The notifications can be by cell phone, smartphone, tablet computer, mobile device, text messages, phone calls, commendations of phone calls and text, audio messages, audible sounds, vibrations, and commendations thereof. History use of the vehicle can also be maintained in cloud services. The history use can provide the user with information as to where the vehicle has been, the speed or events, violations that occurred when use of the vehicle etc. The configuration can also provide messages to the driver warning the driver of when the vehicle has exceeded a restriction, or is approaching a restriction in use, driving area, speed, etc.

The screen displays can have various configurations, placements, sizes, number of pages, tabs, etc., and the user can provide controls for some or all of the interfaces and controls in certain locations. The selection can be enabled for third-party applications. The third-party applications can be selected from the vehicle site, or by providing links to third-party sites. The third-party applications can be pre-identified by the site and displayed to the user if they are compatible with the particular vehicle selected. In another embodiment, the third-party applications can all be shown to the user whether or not they are compatible with the vehicle. Upon binding/pairing or attempting to find application for the vehicle, compliance as to whether the applications operate or comply with the particular vehicle can be made.

In one embodiment, certain third-party applications can be reviewed by the vehicle site administrators before they are made available to users for selection. In other embodiments, the third-party applications can be approved or disapproved. In still other embodiments, the third-party applications can be augmented with restrictions made by the vehicle manufacturer, or dictated by law. The restrictions can be applied, based on the anticipated interfacing with the vehicle interfaces, to ensure safety during driving. For instance, if a particular application requires entry of text, navigation of controls, or other activities that would distract the driver during operation of the vehicle, such vehicle controls or application controls for application interfaces can be temporarily disabled, or can be automatically transferred to a heads up display, or can switch to take audio vocal input from the user. In some embodiments, when the vehicle has come to a stop or is place to park, certain controls or interfaces can be re-enabled, or moved back to original display location or converted back from voice input to touch input. In one embodiment, tools provided by the vehicle site or third-party site can provide for customization of the layout of the display screens of the user interface.

The customization can include organizing or laying out system interfaces as well as application interfaces, such as those interfaces provided by 3rd parties. In one embodiment, interface rules are applied to determine if the system interfaces can be replaced with third-party application interfaces, while providing access to the control interfaces via the APIs of the systems. For example, if the user wants to provide a custom speed indicator, the speed indicator must be compliant (via APIs and/or mapping) with the system interfaces so that the speed readings can be populated to the third-party application. In one embodiment, rules can be integrated with or applied to the applications and system user interfaces for when the vehicle is moving. As mentioned above, such rules can limit interactivity with certain user interfaces while the vehicle is moving to prevent unsafe driving. In one embodiment, the custom user interface is saved to the user profile.

The user profile may contain settings, such as selections of the user interface components associated with the system of the vehicle, as well as user interface is provided by third-party applications. In addition, the user profile can contain and store settings provided by the user. The settings provided by the user, as mentioned is this disclosure can also be learned settings based on use. The settings can further include remote access settings, as well as settings allow the user to control vehicle components from a remote location or a remote computer. The setting can also include providing access to the user account to view historical driving patterns, recent driving activities, the performance of the vehicle during specific driving sessions, the performance of specific vehicle components, etc.

In one embodiment, the custom user interface configuration can be transferred to the vehicle. The custom configuration, as mentioned above is stored in the database of the vehicle manufacturer, or a database held by a 3rd party that cooperates with the vehicle manufacturer to provide cloud services. The database, in one embodiment, is a network accessible storage which allows access to the user to program and modify the user interface using any computer or device having access to the Internet, including the vehicle itself or a third-party vehicle. The method then proceeds to operation where the custom user interface can be activated in managed for Internet connectivity for components of the custom interface. For example, the vehicle's Internet access protocols can be set, or registered with an Internet provider or service provider for the cloud services. The service provider for the cloud services can be the vehicle manufacturer, a company cooperating with the vehicle manufacturer, a third-party company, or combinations thereof.

In one embodiment, the method/logic can also enable local communication with mobile devices that may be in the vehicle. The enablement may be provided by allowing synchronization with the computing system of the vehicle, or with the computing communications of the portable device. For example, the local communication can be paired automatically, based on a preset pairing process where pairing keys are entered. This provides for automatic settings and synchronization when the user enters the vehicle with the portal device. As mentioned above, user interfaces associated with applications loaded on the user's portal device can also synchronize to the display screens of the vehicle, as predefined by the user.

In one embodiment, vehicle settings are saved to either a memory number button on the vehicle or synced to a key fob, or accessible via an interface or voice activation. In one example, a vehicle operator profile is provided to allow users to maintain their individualized profiles, settings and accounts for vehicles from any internet connected device or be able to login to their vehicle physically in or near the vehicle by the use of a fob, thumb print, eye scan and or manual login using an input device that interacts with the vehicle's login system.

In one embodiment, the profile can be managed at a user account saved to a central or cloud distributed system, to manage access. Any vehicle can be abstracted so that any user can log into any vehicle if they have an account that allows access to that vehicle. For instance, a vehicle owner with the role of "administrator" (e.g., an administrator of a user account that has a profile associated therewith or multiple/sub profiles) can create logins for his or her vehicle (s) for additional users such as his or her children, spouse, mechanic, and valet driver among other applications. Logins can be created for individuals or for roles such as the role of "child" where all users with the role "child" would have the same vehicle specifications applied to the vehicle they will be logging into. Similarly, the role of valet can be given and shared by any valet driver.

The purpose of abstracting vehicle operators from the vehicle itself is a shift from the current state of the art in which settings are vehicle specific—each vehicle typically only having the ability to store 1-3 sets of settings, to where vehicle settings are user specific and 1–n logins can be managed through an access management system. The embodiments defined herein allow each user to apply his or her settings to any vehicle based on their login information in which they provide their login and password. When a user logs into a vehicle, the vehicle will determine locally on board and/or communicate remotely with a central or distributed access management system to determine the validity of the login presented to the system. If the user's login is recognized, the system will apply settings and use privileges to the vehicle prescribed by the login.

Logins can have "role" specific settings and privileges or settings and privileges set only by the administrator that cannot be overridden by the user of the login. For instance, an administrator may create a login for "John" their 16-year-old son. The administrator can apply settings to John's login that John cannot override such as the maximum speed the vehicle can travel. For instance, Although the vehicle may have the ability to travel at a speed of 130 mph, John's login will only allow the vehicle to travel at a speed up to 90 mph. Additionally, every login may have settings that the user of the login can toggle to their liking such as the list of radio stations they would like pre-programed every time they log in to any vehicle that accepts their login.

Logins can control all aspects of a vehicle's behavior and can be attributed to individuals or roles. These settings can be toggled via a network connected device such as a computer, web application, smart-phone or directly on the vehicle. Administrators can decide which settings are locked for specific logins or roles, which are open for the login user to toggle and which settings are to be enforced depending on the time of year, or time or day etc., or when a condition or event is detected.

Login settings that can be set and remotely administered include but are not limited to, driving characteristics (rate of speed, fuel consumption guidelines) location based settings (GPS aided travel restrictions, travel radius boundaries, dynamically loading maps, dynamically loading directions, dynamically loading fuel, charge and battery service and purchase locations etc.), time of day based use restrictions (day driving only for example), automatic purchase settings (financial institution linking for automatic purchasing of fuel, charge time, batteries, car washes, etc.), fuel settings (Electric only, fuel only, hybrid only etc.), refueling routing and purchase (incentive based re-fueling maps, incentive based refueling offers etc.) driving characteristic settings (sport, comfortable, soft, off-road, high performance, economy mode), entertainment system settings (radio memory settings, internet access or restriction, streaming services settings), comfort & HVAC settings (climate control, seat positions, seat heater/cooler, suspension/ride settings, entry lighting, remote start, remote stop etc.) tracking/metric settings (camera/video recording guidelines, mileage, top speed, average speed, MPG, wear and tear settings and notifications, historical travel maps).

Automatic purchase settings can be processed in response to requests from the vehicle. The request can be, for example, to transact a payment is for one of a car wash service, a fast food service, a toll road service, a goods purchase service, a rental service, a lease service, or combinations thereof.

Additionally, combinations of settings or setting profiles (such as "sport" where your seat moves to sport position for additional support, suspension stiffens, throttle response becomes aggressive etc.) can be set as well instead of individually setting use characteristics. In one embodiment, logins are user specific, not vehicle specific, so any family member can use their login on any family vehicle and the vehicle will perform based on the metrics and restrictions dictated by the login used to operate the vehicle.

Companies or entities can create and manage logins to company vehicles for delivery drivers, car washers, and mechanics among other applications. Each login can be configured to provide or restrict access based on the user logged into the vehicle. A company may only allow a delivery vehicle to travel at a maximum speed of 80 mph to limit reckless driving. A company may create a role of "local delivery only" where a driver with that login can only drive the vehicle within their territory. Breaches in territory travel will result in a recorded event and notification to the vehicle administrator as well as the vehicle operator. A grace period will be given to re-route back into the driver's territory before more aggressive vehicle disabling mechanisms are deployed. The driver will be given visual and audio cues as to how to avoid vehicle disabling.

A dealership can grant "test drive" logins to potential customers, which allows them to operate less than 100 mph and only within a 5-mile radius. In one embodiment, alerts or notifications can be automatically triggered if violations in the restrictions are detected. A dealership may also grant a "demo" login for instance which showcases the vehicle's capabilities, available APPS, features and benefits. Variations of the "demo" login can be used on variations of potential buyers. A "18-24 year old demo" may be useful for enticing that demographic and showcases the vehicle's features 18-24 year olds are most receptive to.

A valet can be given a password to login only as "Valet" which will impose restrictions on trunk operation, vehicle speed operation, vehicle location notification settings etc. A recording option can be provided, which can set a recording within and around the vehicle when in the valet mode. This way, the user can login to see what the valet driver did while in possession the car, in case the owner feels that something is not correct when the vehicle is returned to the owner. Additionally, while the valet is driving the car, a notification can be provided to the valet that will alert the valet that recording is in progress, and their face can be shown on the display while the valet parks the car.

A user may set the valet login to alert the user that left the vehicle with a valet that the car has traveled beyond the allowed radius or has reached a speed greater than 100 mph, for example. This alert can be sent wirelessly to an email address, texted via mobile phone number or sent to a mobile device having a login-profile mobile application capable of sharing current vehicle location, speed, fuel status among other metrics. The last logged in user of the vehicle or vehicle administrator can send visual, audio or auto override notifications to the valet letting them know they need their car back, they are traveling too fast or even auto shut down to prevent theft.

A parent can set up a login to the family vehicle for their child that only allows the child to drive within a certain radius. For example the vehicle may only be used to drive between home and school. A map can be outlined on the account management interface by a parent when setting up the child's login to support the home to school restriction intended.

In one embodiment, a parent or company may give a child or company driver a login that also carries a financial allowance connected to one or more financial institutions administered through the access management and/or login management system by administrators. For instance, a child may have the need to re-fuel the vehicle by purchasing either traditional fuel, battery units, and or charging time but a parent does not want to give a general credit card to the child. The parent will set a budget for fuel purchase for the given login and the login will then allow the vehicle will communicate with the fuel, battery, and or charge-dispensing unit automatically using a wired or wireless communication systems funding the purchase automatically up to the allotted budget set in the login of the vehicle.

In one embodiment, these features are useful for fleet vehicles where company vehicle users currently use a corporate credit card to purchase fuel where fraud may exist in the form of using company credit cards, or company fuel accounts to fuel personal vehicles. The new system ensures only the company owned vehicle is approved to purchase the traditional fuel, battery, charging time and also maintains metrics on which logged in user consumed fuel and re-fueled which vehicle.

In one embodiment, a process is created so that some or all manufacturers use the same type of login/access management system. By way of example, any user can log into any vehicle from any brand in so far as they have account creation access or a recognized login. Once logged in, each vehicle will receive and impose the login-based settings as long as the manufacturer supports the login/access system.

FIG. 1 shows various methods a user can interact with a vehicle login system, in accordance with one embodiment. The user may use any network-connected device ranging from a mobile computer, mobile phone, mobile network device all connecting to a remote converged or distributed network cloud system. The user may also interact with the vehicle login system directly on or near the vehicle. The user supplies login credentials to a vehicle login interface which are sent to the remote distributed or centralized user login authentication system or onboard vehicle authentication system. The processing logic receiving the login credentials processes the data and returns an authentication response to the user attempting to log in. If the authentication is a success, the vehicle the user attempted to log into has vehicle settings applied to it and the user is allowed to operate the vehicle. If the authentication is a failure, the user is presented with a failed access notification on the login interface.

FIG. 2 shows two different types of users and an example of how the user is organized, in accordance with one embodiment. In this example, User 1 is an administrator of a vehicle login system over vehicles he or she owns. User 1 has the ability to add or remove logins, roles and vehicles to his login system. Since User 1 is an administrator, he or she can add more logins and or roles to the system to allow a family member to have access to the family vehicles for instance. In this case, a family member "User 2" is shown. The administrator has given this family member a login named User 2 and has granted two roles to User 2. User 1 may only want User 2 to have access to a certain vehicle and to certain roles only. User 1 may only want User 2 to have access to the vehicle for the purposes of traveling between school and home. In this case User 1 has created a role that is applied to User 2, which only allows the vehicle to travel within certain restrictions and geographical locations.

In this example, User 2 does not have the ability to alter his or her login, role or vehicle since they do not have administrator access. However, User 1 can make changes on behalf of User 2. The full range of settings over a vehicle that applies to a given role or login is a super set of settings. User 2 may have access to a subset of settings that User 1 allows changes to by User 2.

Figure 3:
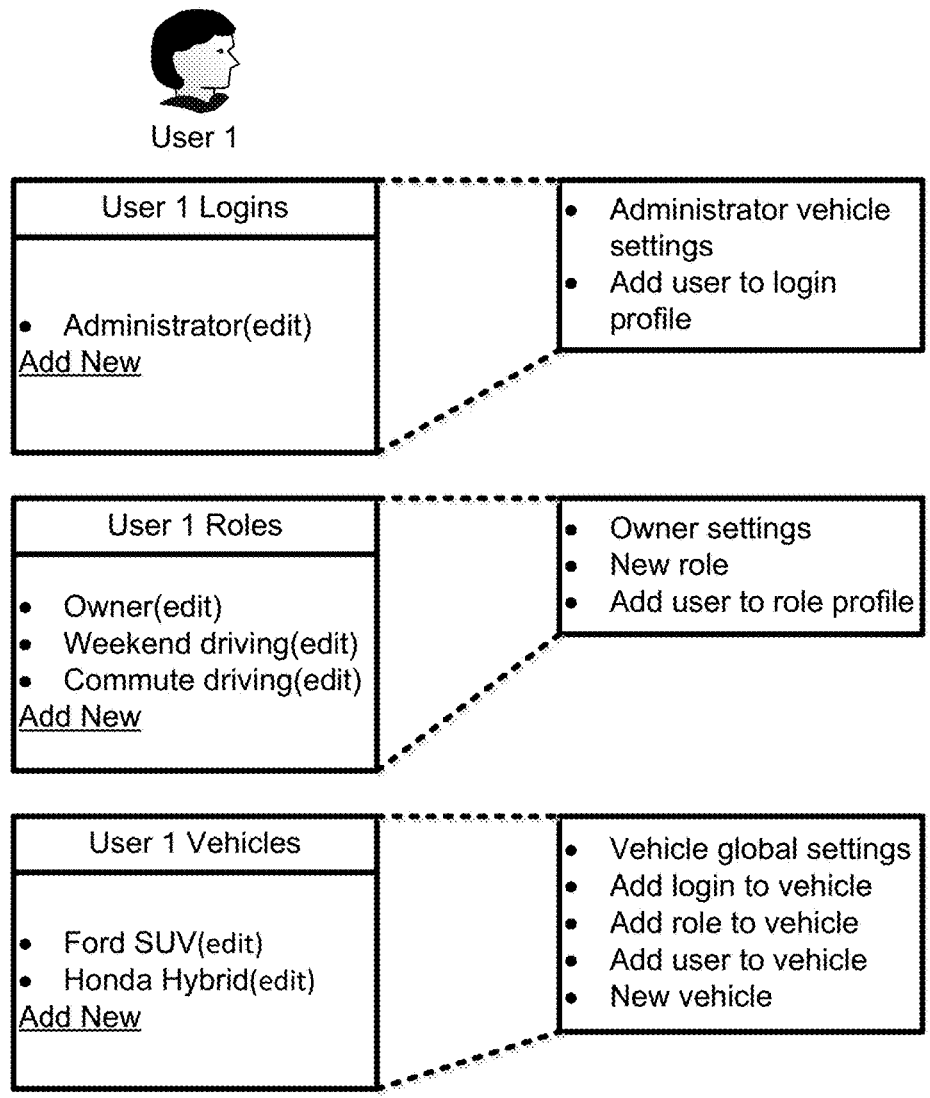

FIG. 3 shows a graphical representation of a example set of settings an administrator such as User 1 may have to administer logins, roles, and vehicles. FIG. 3 further expands the depth of settings, including but not limited to, vehicle administration, adding or deleting users and roles, vehicle global settings that apply to all roles and logins, adding or deleting vehicles among other settings.

FIG. 4 shows one sample of many potential configuration settings for a given vehicle. In this case, User 2 has a login created for him or her named "CHILD". This login contains a set of settings that may or may not be configurable by User 2 since User 2 is not an administrator, only a subset of settings are open to him or her to alter. The drawing illustrates the settings that are user editable and admin only or restricted. The left column lists the type of settings corresponding on the same row on the right column. These settings are examples and may be altered, added to, or subtracted from in different embodiments. For instance, fuel use settings allow an admin in this case to choose what type of fuel the user login CHILD is allowed to use while logged into the vehicle. Similarly, location based settings allows an administrator to draw out a map of the area the user login CHILD is allowed to travel within while logged into the vehicle.

FIG. 5 describes extended settings from FIG. 4. This figure describes additional vehicle settings that are configurable by the user with the login "CHILD" and those that are only configurable by User one being the Administrator. FIG. 5 also describes a subset of settings a user login CHILD in this case is allowed to change. For example, the user login CHILD is allowed to select his or her radio stations, streaming services, and Internet access settings for a unified experience in any vehicle they log into using this log in. Similarly, the user login CHILD can access driving modes and set the vehicle mode to sport for instance. It should be understood that the example "CHILD" profile is just that, an example, and any type of user profile may be set with the defined privileges and/or restrictions.

Figure 6:
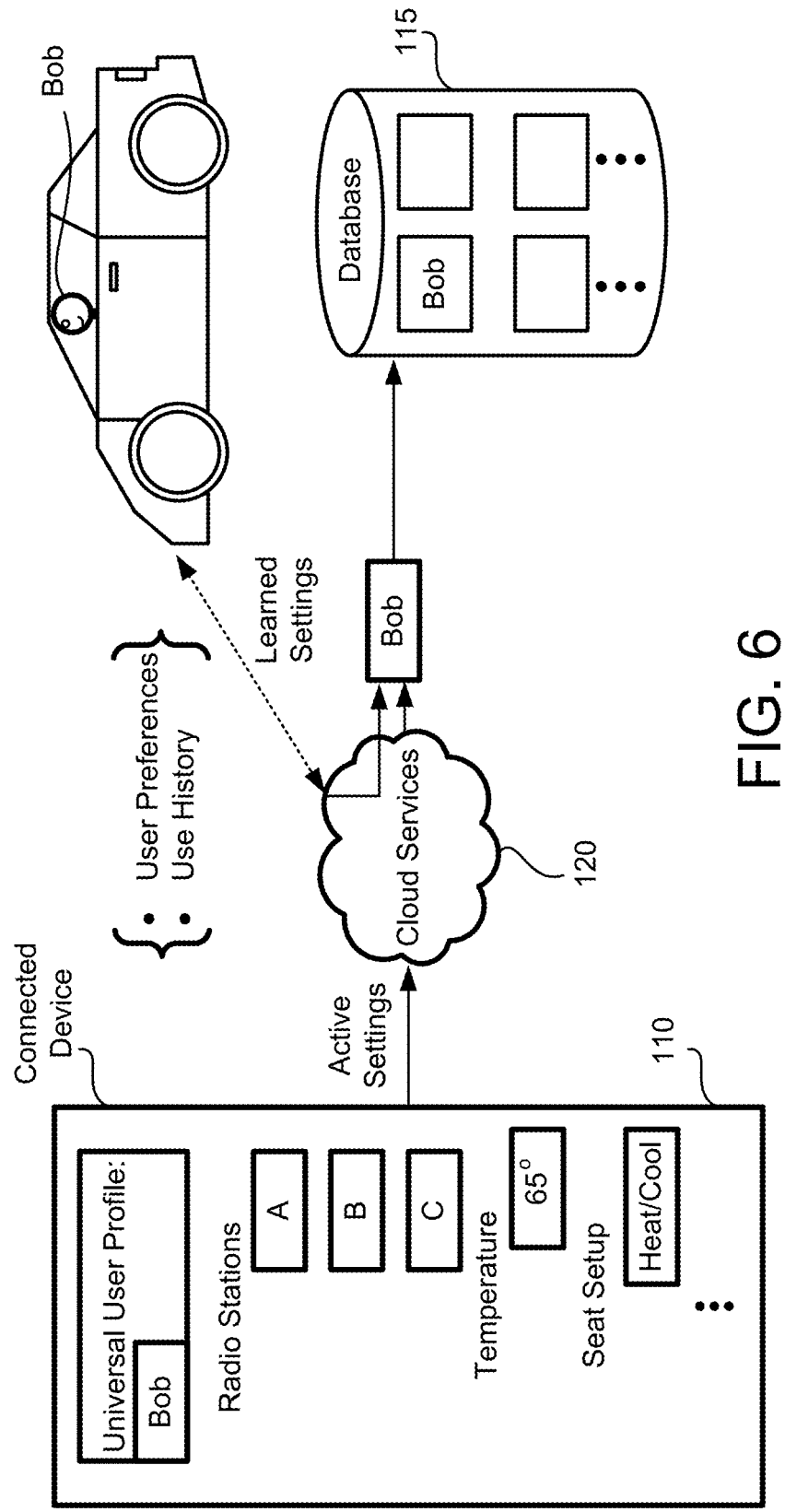
FIGS. 6-9B show example pairing of a vehicle to a user profile, and examples of a shared vehicle transfers of profiles for limited use of the profiles on the shared vehicles, in accordance with one embodiment.

FIG. 6 illustrates an example of utilizing a profile of the user, to access cloud services 120, and a database 115, in accordance with one embodiment of the present invention. In this example, a user may utilize a connected device 110 to access cloud services 120. Using the connected device 110, the user, in this case Bob, is accessing his universal profile settings. His profile settings may include settings that have been selected before in earlier sessions, or default settings implemented by a vehicle manufacturer, or another user such as an administrator. In the example, the user may access particular active settings managed by cloud services 120 which can cause Bob's profile in database 115 to be updated.

In one embodiment, Bob's profile can include specific settings, preferences, use history, and learned settings from earlier uses of one or more vehicles. The profile settings defined by Bob, are then transferred by cloud services 122 one or more vehicles utilized by Bob. For example, if the user wishes to utilize his regular everyday car, the profile settings may already be stored on the vehicle. If the user wishes to utilize a different vehicle, such as a friend's vehicle, a rented vehicle, a shared vehicle, a temporary vehicle, a loaner vehicle, a test drive vehicle, a company vehicle, etc., the user's profiles can also be transferred to that vehicle.

The user profiles can include standard settings that may be set at the various vehicles, or custom settings that can be selected for the user based on learned settings over time by use of various vehicles. In one embodiment, the user profiles are continuously updated and store to a database 115, which is accessible by cloud services 120. Database 115 may include data storage, such as cloud storage, data center databases, distributed databases, local storage on vehicles, network storage, and the like.

Figure 7:
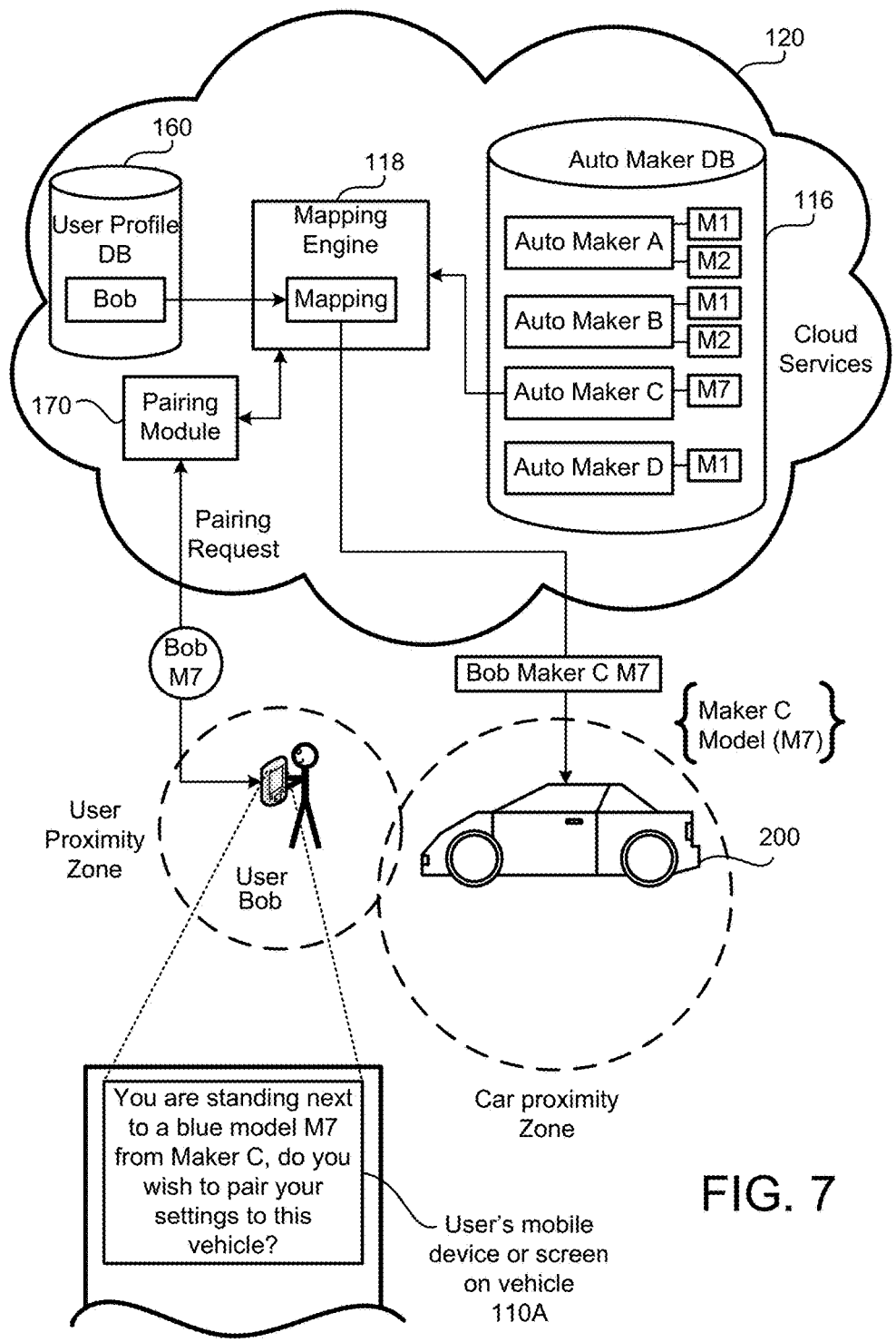

FIG. 7 illustrates an example of a user (Bob) that may wish to utilize a car 200, in accordance with one embodiment of the present invention. For example, the car 200 may be a shared vehicle, such as those commonly shared in urban cities. Shared vehicles are those that belong to a company and where the company provides accounts to users to access the vehicles for specific trips, specific times, periods of time, etc. Users that share those vehicles typically park the vehicles at different locations throughout an urban city. Users wishing to find a vehicle to use can access an application or website having access to an Internet connected application to find the vehicle closest to the particular user.

Once the user has located a proximate vehicle, such as car 200, the user may approach the vehicle so as to utilize the vehicle 200. In one embodiment, when the user approaches the vehicle, and comes in close proximity to the vehicle as detected by the geo-location of the users mobile device, a pairing request can be detected. The pairing request may be triggered once the proximity zone of the car 200 and the proximity zone of the user substantially or partially overlap. The proximity zone's may overlap when the user comes in close proximity to the vehicle, such as within a few feet, within a mile, or the user has touched or bumped the vehicle.

The pairing request may be automatically sent by the users device to cloud services 120. The pairing request can include sending the model of the vehicle 200 that may have been obtained by the users mobile device from the vehicle 200 directly. In the illustrated example, the pairing request by the users mobile device can include identification of the vehicle that the user has come in close proximity to. A pairing module 170, can then communicate with a mapping engine 118 that determines information associated with car 200.

An automaker database 116 can include data regarding a plurality of vehicles, including standard user interfaces, configuration interfaces, and other information necessary to provide user Bob with a custom interface for vehicle 200.

The mapping engine 118, in this example includes a map or that communicates with the automakers database to identify the settings, applications, APIs, or modules that allow integration of Bob's user profile from the user profiles database 160 so that Bob's profile can be sent to car 200. In the illustrated example, the mapping engine, the of the mapper, will obtain Bob's profile 160 for cloud services and obtain vehicle information for the user interfaces of the vehicle desired for use by the user.

The mapping engine 118 will the transfer Bob's profile to vehicle 200. At this point, the user, Bob, can be provided with an interface on a mobile device to allow access to the vehicle. The user interface can include a plurality of screens with instructions, check information, cost information, billing information, etc. As illustrated in FIG. 7, the users mobile device can provide various notifications, such as identifying to the user that the user standing next to a blue model M7 from maker C. The user interface can ask Bob if Bob wishes to pair settings to the specific vehicle 200. If Bob desires to actually utilize the shared vehicle 200, the pairing request may be initiated as mentioned above.

Figure 8:
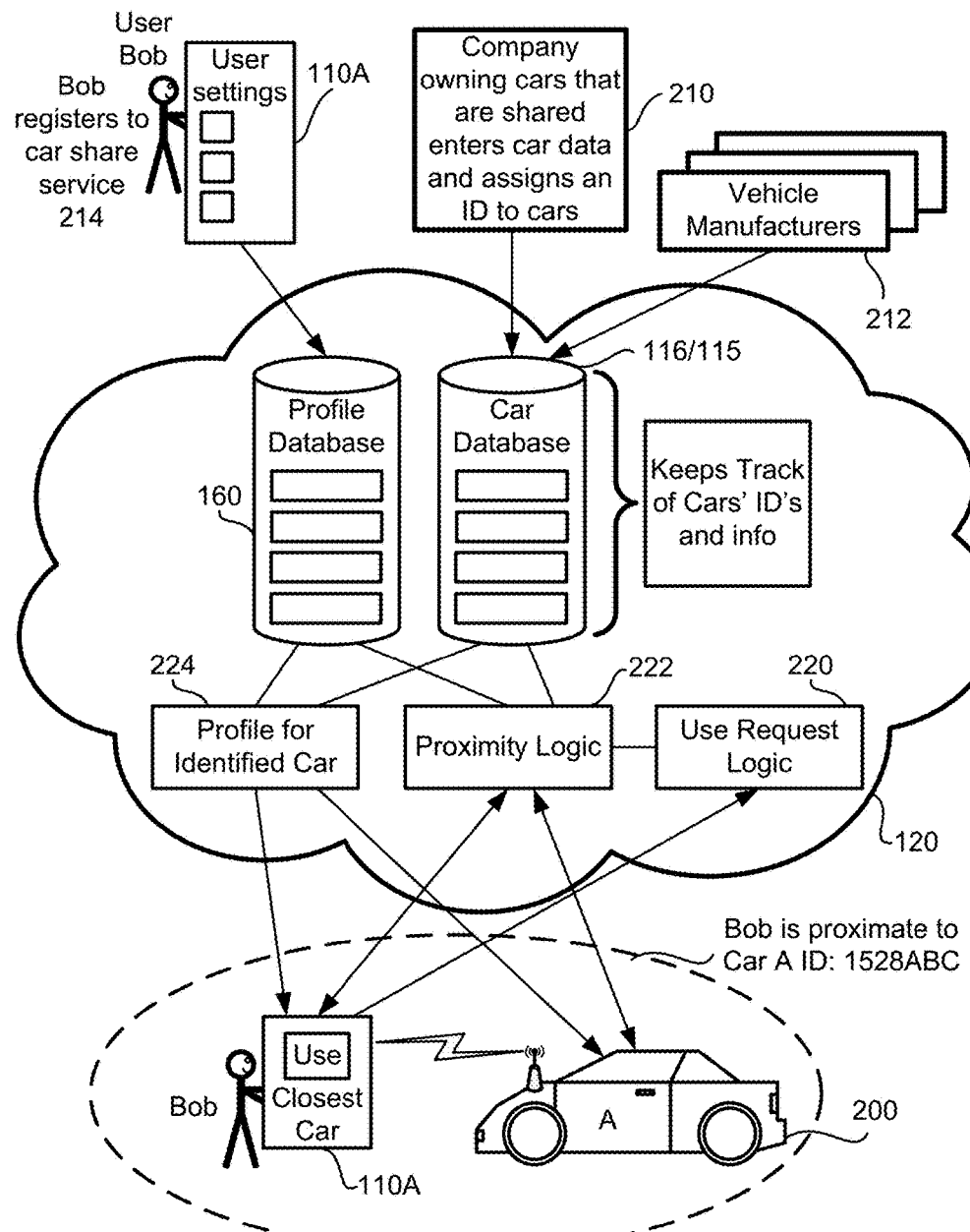

FIG. 8 illustrates another embodiment where the user Bob has utilized his mobile device 100a to define or access a plurality of settings. In one embodiment, the user may register 214 with a car sharing service, such as via a user interface or application having access to the Internet and the company providing the service. Cloud services 120 can then provide access to the profile database 160 where Bob's profile may be stored. The profile 160 may be accessible to 3rd parties, such as car sharing service.

Also shown in cloud services 120 is the car database 116/115. The car database can then be provided with information from the car sharing company 210 that identifies the cars that the company owns and that are shared with the service. The car data including assigned IDs to the vehicles and cars can be stored in the car database 116/115. Additional data can be supplemented from vehicle manufacturers 212. The cloud services 120, in accordance with one embodiment, can include logic for profile identification for vehicles 224, logic for proximity detection 222, user request logic 220, and other managing logic for receiving request from users, managing databases from a car sharing database, managing data from vehicle manufacturers, and receiving request to manage profiles an axis vehicles.

As illustrated, when the user Bob approaches the vehicle 200, the Bob's mobile device 110a can identify the closest car, which may be car A. In this example, Bob is identified to be proximate to the car having an ID 1528ABC. In one embodiment, when the user comes in proximity to the car 200, the car can beep or light up when enabled, it can open the doors to allow the user to access the vehicle when the logic has paired the user to the vehicle, the profile of the user can be transferred to the vehicle, the use of the vehicle is managed by the user's online account (storing historical use data and any billing information), automatic payment for use can be made from predefined payment arrangements stored in the profile, and use of the vehicle can be restricted to predefined rules, based on the profile. Accordingly, the profile database 160 can include both profiles of the user, such as user settings, as well as profile restrictions that may be set by the car sharing service.

Figure 9A:
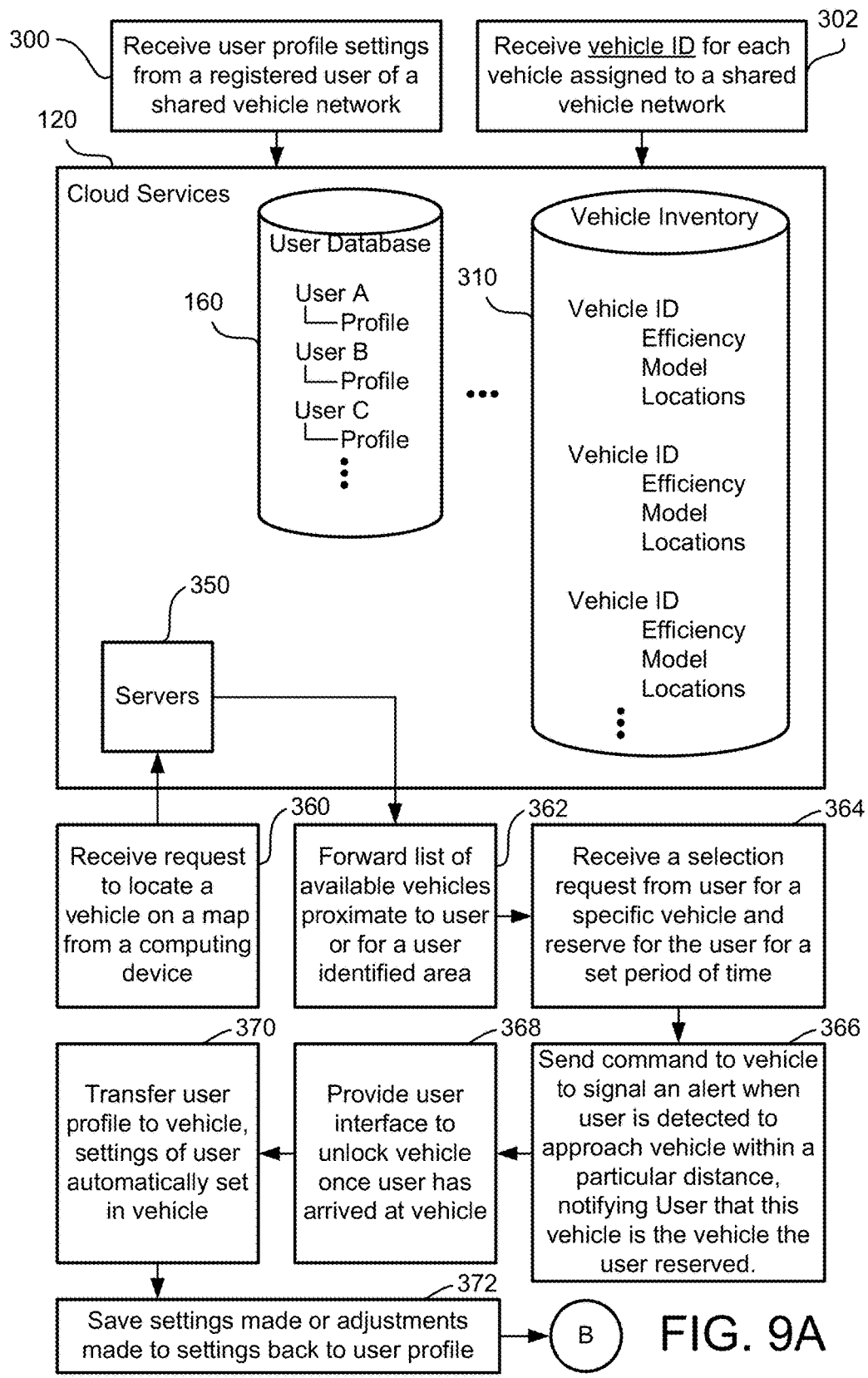

FIG. 9A shows one example process for utilizing user profile settings from a registered user and utilizing settings of a shared vehicle network, in accordance with one embodiment of the present invention. In this illustration, operation 300 receives the user profile settings from a registered user of a shared vehicle network. The registered users profile can be obtained from a cloud services profile, such as the profile used for a number of vehicles which may be in or outside of the shared vehicle network.

In another embodiment, the profile may be the profile set by the shared vehicle network, based on the service contract entered by the user. In operation 302, vehicle IDs for each vehicle assigned to a shared vehicle network are received by cloud services 120. Cloud services 120 will therefore maintain a user database 160 with a plurality of user profiles.

Cloud services can also maintain a vehicle inventory database 310 for the shared vehicle network. Servers 350, which operate cloud services 120, and therefore managing access database 160 and 310, as well as provide logic for providing access to vehicles, unlocking vehicles, and transferring user profiles to specific vehicles. In operation 360, the servers 350 may receive a request to locate a vehicle on a map from a computing device. The request may be provided with reference to the user's current location, using GPS or the like. The request is then processed by servers 350, and servers 350 communicate the forward a list of available vehicles proximate to the user or for the users identified area in operation 362. In operation 364, a selection request is received from the user for a specific vehicle and a reservation is made for the use of the vehicle for a set period of time.

In operation 366, a command is sent to the vehicle the signal alert when the user is detected to approach the vehicle within a particular distance, notifying the user that the vehicle is the vehicle that the user reserved. This provides for a method of allowing the user to easily identify the vehicle that the user reserved. For example, if the user is instructed to go to a specific parking lot to identify the vehicle that was reserved, the user would have a difficult time identifying which vehicle it is that the user reserved. However, by allowing cloud services to signal to the vehicle to sound the alarm, turn on a light, beep, for make any other identifying gesture, the user can easily identify the vehicle in the parking lot.

In operation 368, a user interface is provided to the user's mobile device that will provide a notification to the user indicating that the person/user has arrived at the vehicle. In operation 370, the users profile is transferred to the vehicle.

The transfer of the profile will allow the settings of the user to automatically be set in the vehicle. The settings can include, for example, temperature, radio settings, seat settings, meter settings, air settings, etc.

Figure 9B:
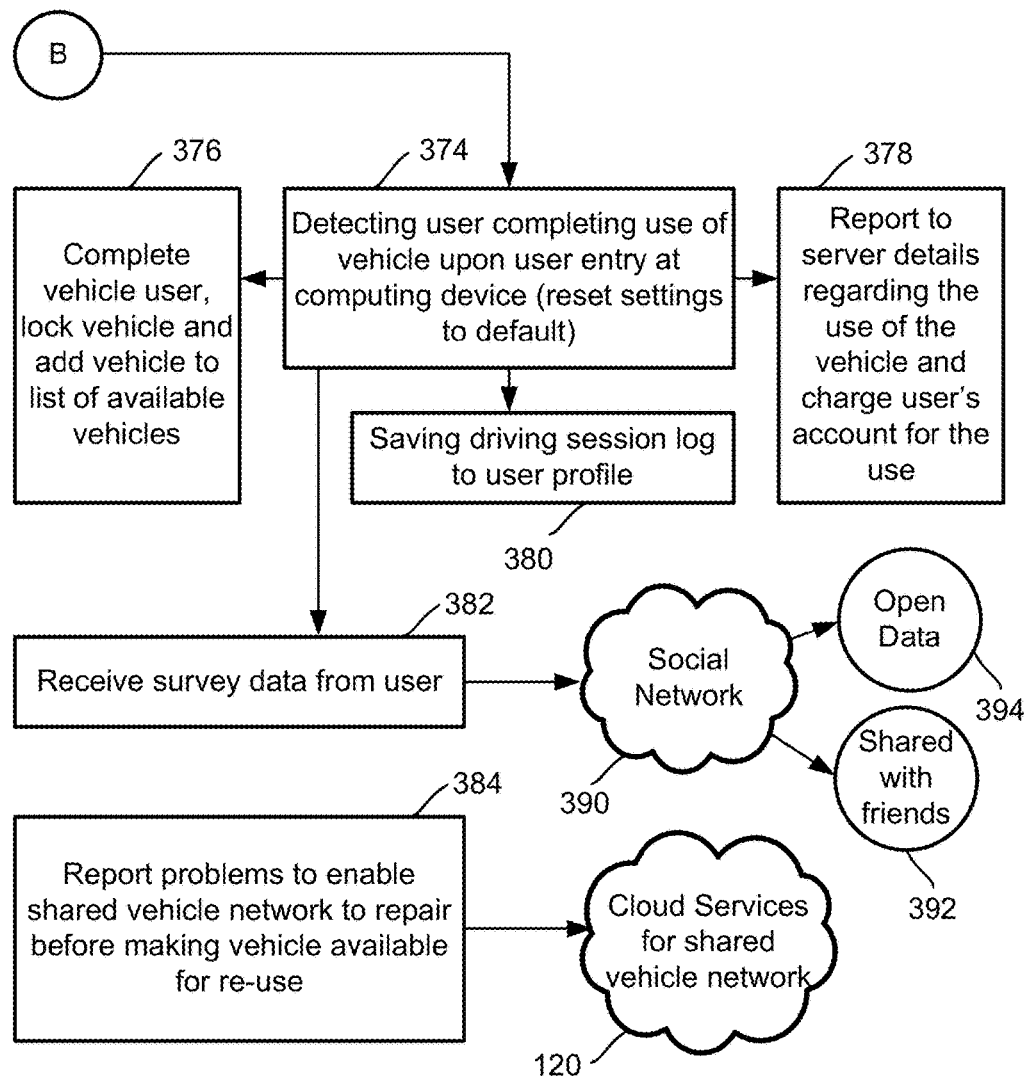

In operation 372, the settings that are made by the user when in the vehicle or adjustment settings can be sent back to the user profile. Thus, when the user offering the vehicle and making changes to his or her profile, those changes can also be communicated back to the profile database in cloud services 120. This provides for a continuous feedback loop over time, to allow the users profile settings to be managed and maintained current to the users best liked preferences. The operation then proceeds to B in FIG. 9B.

In operation 374, it is detected that the user has completed use of the vehicle upon some user entry at a computing device. The computing device may be computing device of the vehicle, or a mobile device. The entry can be, for example, the user logging out of the vehicle indicating that the user has terminated use of the vehicle. At logout, the vehicle's original profile settings will then be returned, and the users custom profile settings will be terminated.

In operation 378, a report sent back to the server regarding the use of the vehicle and the charges to the users account for the use. In one embodiment, the use reporting can occur continuously while the user is driving vehicle. In operation 380, the drivers session log can be saved user profile, keeping a history of the user's travels. In operation 382, survey data can be requested of the user regarding the vehicle use. Because the user was utilizing a shared vehicle, feedback from the user can be helpful to potential future users that may want to rent or utilize vehicles from the same company.

The user may be provided with options to publish likes and dislikes or commentary to a social network 390. Ratings can also be transferred to rating companies, such as those that allow internet users to view user comments, reviews, complaints, etc. The social network 390 can allow the data to be open data 394, or data that is shared with friends 392. In operation 384, problems with shared vehicle can be reported to the vehicle network to allow repairs before making the vehicle available for reuse. Cloud services for the shared vehicle network can then be updated in cloud services 120. For example, if the vehicle has been identified as having some mechanical malfunction, the cloud services can update that vehicle as being out of service, so that discovery of that vehicle does not cause users to access that specific vehicle that may be out of commission.

FIG. 10 illustrates a user (Bob) entering the vehicle, such as a shared vehicle 200, in accordance with one embodiment of the present invention. In this example, the user has been identified by the vehicle, such as using a camera 402. The camera 402 may use face detection 406 to automatically identify the user, and set the users preferences and settings for the vehicle automatically. In some embodiments, this allows verification that the user driving the vehicle 200, from the shared network, is the driver that unlocked the vehicle from a remote location (such as a mobile device). In this example, the vehicle 200 may also include a plurality of cameras, such as cameras 404, 408, 410, 412, 402, etc. Any one of these cameras can be accessed from a remote location, if the user's profile provides access, or the privacy setting allows such access.

These cameras can be used to detect and monitor the exterior portions of the vehicle as the vehicle drives around, as well as interior portions of the vehicle. These cameras can be used by the vehicle sharing company to monitor the status of the vehicle, and the location where the vehicle is parked.

In one embodiment, the user who has rented the vehicle can set a privacy setting to disable certain cameras. In one embodiment, a speaker 420 can be activated to allow the vehicle to speak and communicate with the user. Vehicle electronics and logic 400 can be in communication with cloud services 120.

Cloud services 120 can also be in communication with user profiles 160. In one embodiment, the user profiles 160 can also include specific profiles for registered users. In one embodiment, the registered users can include a family of users. A specific family can have a number of drivers or users that have been registered with a service. For example, the database can include users ABC123xi (such code is only an example, and any form of ID/code can be used), and the users can include a particular family or group of people. The group of people can also be a group associate with a company, a sharing service, a group established for a particular event, or other types of groupings. The vehicles can therefore be monitored for use by the specific users in a particular family or group. In one embodiment, the particular family and groups can be associate with their own profile history settings, which include data from their previous uses.

In one embodiment, FIG. 10 illustrates a process utilize to communicate between vehicles, users, and cloud services. In operation 450, a vehicle with communications is provided with cloud services. The cloud services will be in account, software, or interface that allows communication with cloud services 120. In operation 452, the user in the vehicle may be detected, and the face of the driver or other biometric data can be used to identify the specific user sitting in the car. The detection of the user can, in one embodiment be enabled or restricted based on privacy settings desired by the user.

In operation 454, the user may be identified and the users profile can be automatically retrieved from cloud services and the user profile 160. The preferences settings for the user can be identified from the database in operation 456, and the settings can be applied in operation 458. The settings can be applied to the vehicle for the identified user. When the user terminates use of the vehicle, the settings can't be deactivated, or return to a neutral setting.

FIG. 11 illustrates an example of particular types of settings that can be set, or recorded, or accessed, in accordance one embodiment of the present invention. In one example, cameras 480 can be provided as options for access by the user. The cameras can be accessed to view historical uses by the user, or can be access to view current and live video of the vehicle. For example, if the user has rented a vehicle for a period of time, and parked it in a specific location, the user can monitor the vehicle from a remote device connected to the Internet.

Record settings 482 can also be set by the user, the vehicle provider, or cloud services. A plurality of recording options and access can be set or adjusted by the user from a remote location. Remote access 484 also provides the user with options to control specific features of the vehicle. The control the vehicle can be set for a period of time when the users profile is associated with the vehicle.

In a car sharing environment, the remote access of the vehicle can be enabled during the period of time when the user is assigned or the users account is assigned to that vehicle. In examples where the user owns the vehicle or is more tightly connected to the vehicle, the remote access can be provided by entering axis control information, credentials, passwords, usernames, and biometric data or combinations of one or more.

In still other embodiments, user interfaces are provided to provision customized data regarding available charge station locations. In one embodiment, users having other devices, such as smartphones or portable electronics can obtain data, which can be shared with other user interfaces. The sharing can be by way of a sync operation, that can be automatic when the user enters the vehicle or on demand by the user. In other embodiments, the application or program running on the user portable electronic device can continue to execute the processing, while allowing the display of the vehicle to show all activity on the display. For example, if the vehicle electronics are not capable for processing an application or access a cloud service, the portable device can act as the agent for the vehicle electronics. In one embodiment, the display and I/O of the EV simply acts as a passive interface, while the processing or accessing to cloud processing is done by the user's portable electronics (e.g., smartphone or the like).

In some embodiments, the user's portable device is already programmed with access codes, passwords, etc., so the user may wish to use the portable electronics instead of having to program the vehicle. This is important when users share a vehicle. If users share a vehicle, one user may have the electronics programmed to their likes or dislikes. By allowing programming, data settings, etc., to be shared or synced (e.g., temporarily or not), users can more easily share vehicles, while keeping the settings that the user is used to having.

In still another embodiment, allowing the user's smart phone or portable electronics to sync with an EV, users of rental cars can more easily step into cars with pre-programmed settings. Thus, users that temporarily use vehicles need not worry about programming the car's settings upon entering the car, but simply sync with the vehicle to allow the vehicle to run display, IO and services based on the custom settings of the user's portable device.

This processing that allows users to sync a vehicle with a user's custom settings stored in the user's portable device can also have application to car sharing environments. In big cities, companies allow users to locate vehicles in a proximity to their current location, and simply enter the vehicle using their membership code. In addition to providing users with access to the vehicle, the user/driver's settings can be synced to the vehicle. This can include settings of the seats, the mirrors, the temperature, the radio stations, and the Internet apps to display on the car's display, etc. Custom information, such as prior uses of the car, cost for driving, etc., can be displayed on the car's display, via the sync data from the user's portable device. The sync data can be obtained at any time, such as by using the user's portable Internet link, etc.

In one embodiment, a user's EV or non-EV vehicle can be in communication with cloud services, and the cloud services can be interfaced with data from various entities that provide power for the grid, provide charging units (CUs), provide discounts to charge at particular CUs, geo location services, mapping services, live traffic data, etc. The user of the EV can communicate with the vehicles electronics via a display unit and its associated electronics, can provide input via touch or voice, can request data regarding routs to local charge stations, cost estimates at the various charge locations, how crowded the charge stations are at the various locations, etc.

The cloud services 120 are also accessible via a computer that has access to the Internet, a smart device (e.g., smart phone, tablet, etc.), etc. Thus, data can be acquired from various sources and data can be consumed by various sources. The data that is acquired, shared or accessed can be launched on the user's device and then transferred to share in real-time with the display and/or electronics of the vehicle. Thus, a unified access display can be customized to the user, regardless of the vehicle that the user chooses to drive. This is in contrast to current models that customize settings for one vehicle owner or owners.

In one embodiment, the user's settings are seamlessly transferred to the vehicle the user chooses to drive. This is especially useful for cases where a user drives many cars, but wishes to keep his settings constant. Settings can include cloud services, or local settings such as seat positions for the size of the user, mirror positions, radio stations, weather stations, history of routs taken, favorite locations to visit, etc. The application that allows syncing of a user's settings on a portable device to the vehicle electronics is especially useful for car sharing applications, which is common in large cities and may expand in the future. As car sharing increases, it is most useful to allow a user to save his/her settings in their mobile device, instead of relying on the fixed settings of the vehicle. In another embodiment, it is also possible for a user to type in their universal login code (e.g., user name/password) into the car display, and all of the user's settings are transferred to the vehicle while the user is driving the EV. Once the user stops using the EV, the car can go back to the normal mode for another user to login. The data regarding the user's settings would, in this embodiment, be saved in the cloud.

In one embodiment, user interfaces of a mobile device can share data with the vehicle's display and native apps. App unification allows EV system to display APPS on the user's smartphone device in an opt-in PAIR mode. In one embodiment, this allows one person to enter another's EV, share apps on the EV display while in the EV, and when the person leaves the EV, the Apps de-pair. This auto-sync facilitates sharing of data and also allows users to unify their settings across any number of vehicles the user may drive.

In one embodiment, the synchronization will enable users to universally transfer settings from portable devices to electronics of a vehicle. In some embodiments, the vehicle that the user wishes to drive is not his vehicle. For instance, the vehicle may be a friend's vehicle, a rented vehicle or a shared vehicle. If the user has programmed settings in his or her device, the settings that are useful for the vehicle will be transferred to the vehicle. Settings can include travel speed restrictions, car seat settings, mirror settings, remote access to home controls (e.g., lighting, garage doors, etc.), radio settings, satellite radio settings, internet settings, etc. In some cases, only some settings are directly transferrable. In other embodiments, a database can be accessed to find a translation metric. The translation metric can include mapping tables that allow for settings to be transferred between functions of one vehicle to other vehicles. In one embodiment, vehicle makers can upload their translation metric for each model and the mapping tables can be used to provide the sync operation.

Figure 12:
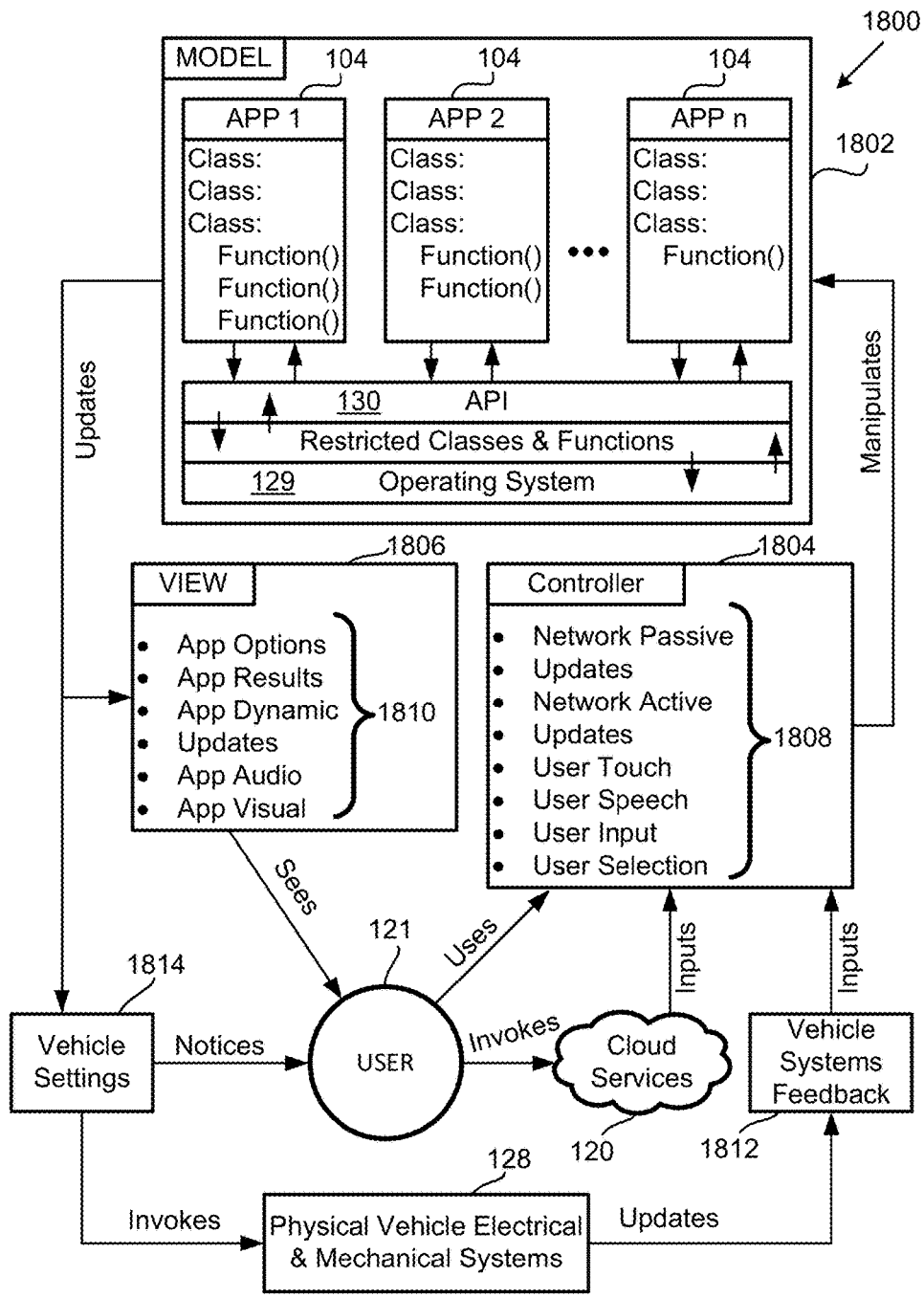
FIG. 12 describes a system in which a user interacts with a model view controller software environment useful for processing APPS using APIs on vehicles with vehicle operating systems capable of processing computer code, in accordance with one embodiment.

FIG. 12 describes a system in which a user interacts with a model view controller software environment 1800 useful for processing APPS using APIs 130 on vehicles with vehicle operating systems 129 capable of processing computer code. The APPS can execute profile retrieval, updates, and sync operations. The model view controller paradigm 1800 shows basic interaction, control, processing, and updating of data useful for manipulating and viewing resulting actions by to vehicle running an APP in such a system. Such a system useful for running APPS on vehicle operating systems will accept inputs by a user 121, cloud services 120 via data streams, vehicle systems feedback and data streams 1812 used by a controller 1804 that may constantly poll electrical, capacitive and physical sensors, and input streams to detect if interactions 1808 such as network passive updates, network active updates, user touch, user speech, user input, user selection among others has been triggered.

Each input 1804 will then trigger manipulation of the system's model 1802 portion of the APP software paradigm thus invoking stored routines within APPS 104 which then in turn interact with the vehicle's API system 130 built upon the vehicle's operating system 129. Depending on the app presented to the user 121, the input may trigger stored routines or functions on APP software or operating system level restricted stored routines or functions.

After the processing of stored procedure code is manipulated with arguments provided by the controller 1804 inputs, visual and or sensory results are presented to the user in the view 1806 portion of the model view controller paradigm. These sensory outputs, data streams, electrical signals may all be translated as additional options, results, dynamic updating, audio or visual graphical user interface changes 1810 on any of the user's connected display devices. The user will notice these results visually or audibly but may also feel or detect changes in the vehicle's mechanical systems. Updates from the model 1802 may also be used to toggle vehicle settings 1814 which in turn may invoke changes in the vehicle's physical, mechanical and electrical systems 128.

Finally, the system controller 1804 may receive additional updates from the vehicle systems affected or additional user 121, cloud services 120, vehicle systems feedback inputs 1812 to re-engage the user in a cyclical fashion. If no inputs are sensed, the system's controller will continue to poll its electrical and data I/O systems for input on a continuous basis.

The model view controller paradigm 1800 described is one example of the software input output lifecycle that may be used to invoke, manipulate, process, update portions of computer readable code such as APPS 104 using an intermediary API 130 to communicate with the vehicle's operating system 130. However, APPS 104 may be run on physically wired, wirelessly connected or remote devices having processing abilities to translate the computer readable code in APPS into actionable invocations on one or more vehicles in order to facilitate or utilize the vehicle's electrical and mechanical systems in prescribed or customizable fashions.

Figure 13A:
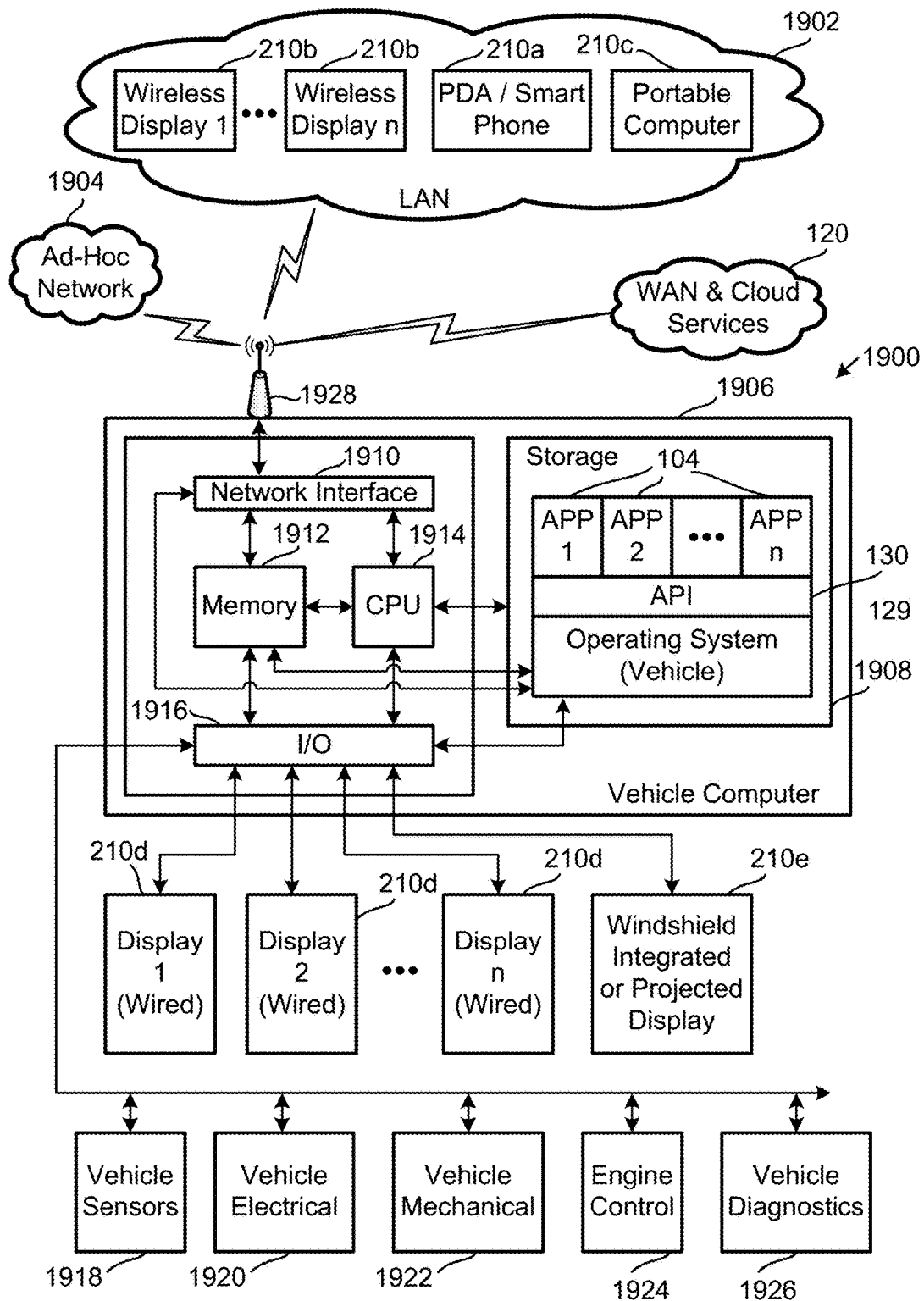
FIG. 13A describes how vehicle on board computer with input output system useful for accepting input, processing input and displaying results in conjunction with stored computer readable programs or functions in the forms of APPs may be structured, in accordance with one embodiment.

FIG. 13A describes how vehicle on board computer with input out put system 1900 useful for accepting input, processing input and displaying results in conjunction with stored computer readable programs or functions in the forms of APPs 104 may be structured. Although system 1900 describes one way to provide vehicle on board computing power to run APPs 104, the arrangement of the vehicle computer 1906 may be altered or arranged in differing fashions with differing connection routing in order to achieve the same. In this example, vehicle on board computer 1906 may be comprised of components such as the network interface 1910, memory 1912, a central processing unit 1914, an input output buffer useful for streaming data 1916, storage 1908 having the ability to store computer data in long term or short term fashion useful for stored computer code procedures in the form of an operating system 129, intermediary stored procedure code in the form of APIs 130, stored subsets of computer code procedures APPs 104 interacting with API 130 as an intermediary to the operating system 129.

In this example, the vehicle computer 1906 has the ability to transmit, receive and process information using wired or wireless connections. One such wireless connection is provided by a wireless data sending and receiving antenna 1928 connected to a network interface 1910 useful for pairing with and communicating data with portable or stationary wireless devices which may or may not be part of a network 1902. Such wireless devices include but are not limited to wireless displays 210b, portable smart phones 210a, portable computers, 210c and even stationary objects, structures, buildings, toll bridges, other vehicles etc. The vehicle's network interface 1910 through antenna 1928 may also communicate with cloud services 120 to receive instructions from a remote location that invokes stored programs such as APPs 104 on the vehicle's computer.

The vehicle may also send and receive data wirelessly in order to establish a connection with a peer-to-peer ad-hoc network. Invocations may result in output data streams interpreted by wireless devices 210b, 210a, 210c as well as wired devices such as wired displays 210d or vehicle integrated display devices such as windshield heads up projected display or integrated glass displays 210e. All data streams generated by APPs 104 stored on the vehicle's computer may also be triggered by wired devices such as vehicle sensors 1918, vehicle electrical systems 1920, vehicle electrical systems 1922, engine control systems 1924, vehicle diagnostics systems 1926, user input as well as environmental input.

A user and or vehicle may find system 1900 useful in one example, where the user drives the vehicle past an electronic toll bridge where a fee is required to pass the toll bridge. The vehicle's computer will communicate wirelessly as it passes the stationary structure transmitting and receiving information with it as it drives by. The user's vehicle may have an APP 104 installed on the vehicle computer 1906 that can process the input using the computer's wireless antenna 1928, network interface 1910, input output system, 1916 automatically responding to the toll bridge with payment information. Once the payment is received and processed, the APP 104 receives information from the stationary wireless toll taking device which is then stored either locally on the vehicle's storage 1908 or remotely using cloud services 120. The results of the transaction are then sent via data stream from the compute code running on the APP 104 to a display device(s) where the user can visually confirm that the toll was paid, accepted and show the user's remaining balance all through the GUI displayed for APP 104.

FIG. 13B describes one example of how stored data and function declarations may be compiled to provided intermediary access to a vehicle's computer controlling vehicle systems 1950. Such routines, data and functions may be arranged in such a way that limited access is given to third party code on APPs 104 to manipulate certain unrestricted operating system functions and vehicle systems. Such a method of providing the intermediary allowed stored function set to third party code can be referred to as an API 130.

In this example of an API 130, computer readable code is arranged in such a fashion that the type of API is described and in this case, an API that allows third party control of the vehicle's HAVC system is declared. A declaration may be useful for reserving the vehicle's computer long term and short-term memory in order to run stored procedures. The shown declaration 1954 describes an example set of data that may reference memory locations and their contents. The contents of these memory location may be modified by stored procedures 1956 or functions.

This HVAC API 130 has the ability to store data relating to the vehicle's temperature, status, target temperature, split zone temperate, data from electrical and mechanical sensors, calendar dates, error information among others. Invocable functions 1956 are the methods by which a third party APP 104 may manipulate data 1954 on board a computer. Free access is not given to the restricted data on a vehicle's computer, thus a structured method or methods are described for user by third party APP developers.

These functions 1956 that may or may not take arguments in order to execute may include functions in the example HVAC API that update temperatures for both the left and right or given zones of the vehicle, toggle are conditioning, allow visual skins on the APP GUI, manipulate schedules and displays etc. The HVAC API 130 described is one example of how one API can control one vehicle system. There may be variations of the APIs for multiple vehicle systems or one superset API that allows access to all of the vehicle's systems through stored procedures or methods.

FIG. 13C describes a set of computer readable and executable code 1970 that can be compiled together by a third party APP 104 developer in the form of an APP. The APP 104 uses structured programming languages to execute stored functions allowed by the vehicle's system API 130. In this example, the APP is a third party HVAC app that allows a GUI to be displayed to a user giving them the option to adjust the temperature on the left or right side of the vehicle up or down. In this case, the APP's GUI has provided a data stream to the APP letting it know that the user has selected to set the temperature on the left side of the vehicle to 80 degrees and the right side of the vehicle to 76 degrees.

The APP 104 will then use functions available from the vehicle's API 130 to manipulate the data on the vehicle's storage system which in turn will be electrically polled by sensors, data streams etc. to manipulate the vehicle's electrical and mechanical HVAC systems. The user will notice the result visually by the data provided by the APP to the GUI as well as environmentally as the temperature is changed in the vehicle.

Figure 14:
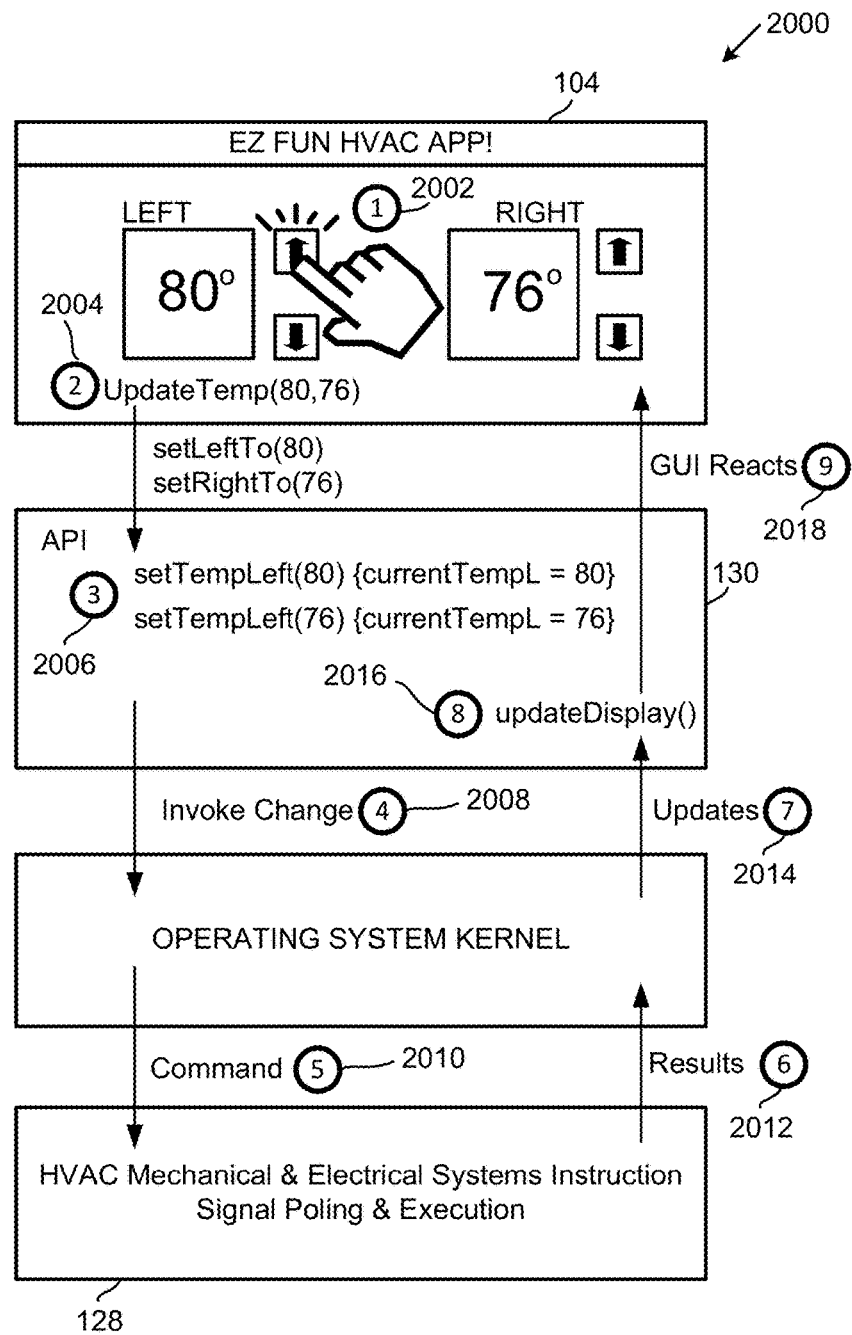
FIG. 14 describes the stepped flow of events as a user interacts with an APP, in this case, an HVAC APP, in accordance with one embodiment.

FIG. 14 describes the stepped flow of events 2000 as a user interacts with an APP 104, in this case, an HVAC APP 104. The GUI shown for APP 104 describes the first step 2002 where a user physically interacts with a sensor, screen, voice system etc. polling to see if an input has been received. The user's input in 2002 has been interpreted by the app to raise the temperature on the left hand side of the vehicle to 80 degrees and maintain the temperature on the right hand side of the vehicle at 76 degrees. This input invokes step 2004, which calls a stored function on the APP 104 that is API 130 allowable with arguments. The stored function may invoke other helper or associate functions within the API 130 in step 2006, which all in tern invokes restricted computer readable code at the operating system and or kernel level in step 2008. These invocations will then in turn command mechanical and or electrical systems in step 2005 in order to achieve the requested response in step 2002.

The results of the commands on the vehicles systems are based back to the vehicle's operating system or kernel level in step 2012 which then updates data on the API 130 in step 2014 that the APP 104 is polling, such as updating the display to show the resulting temperature in step 2016. The results of a function that is invoked at the API 130 level updating the display produces a data stream translatable and displayable by the vehicle's screen showing the APP 104's GUI in 2018.

Figure 15:
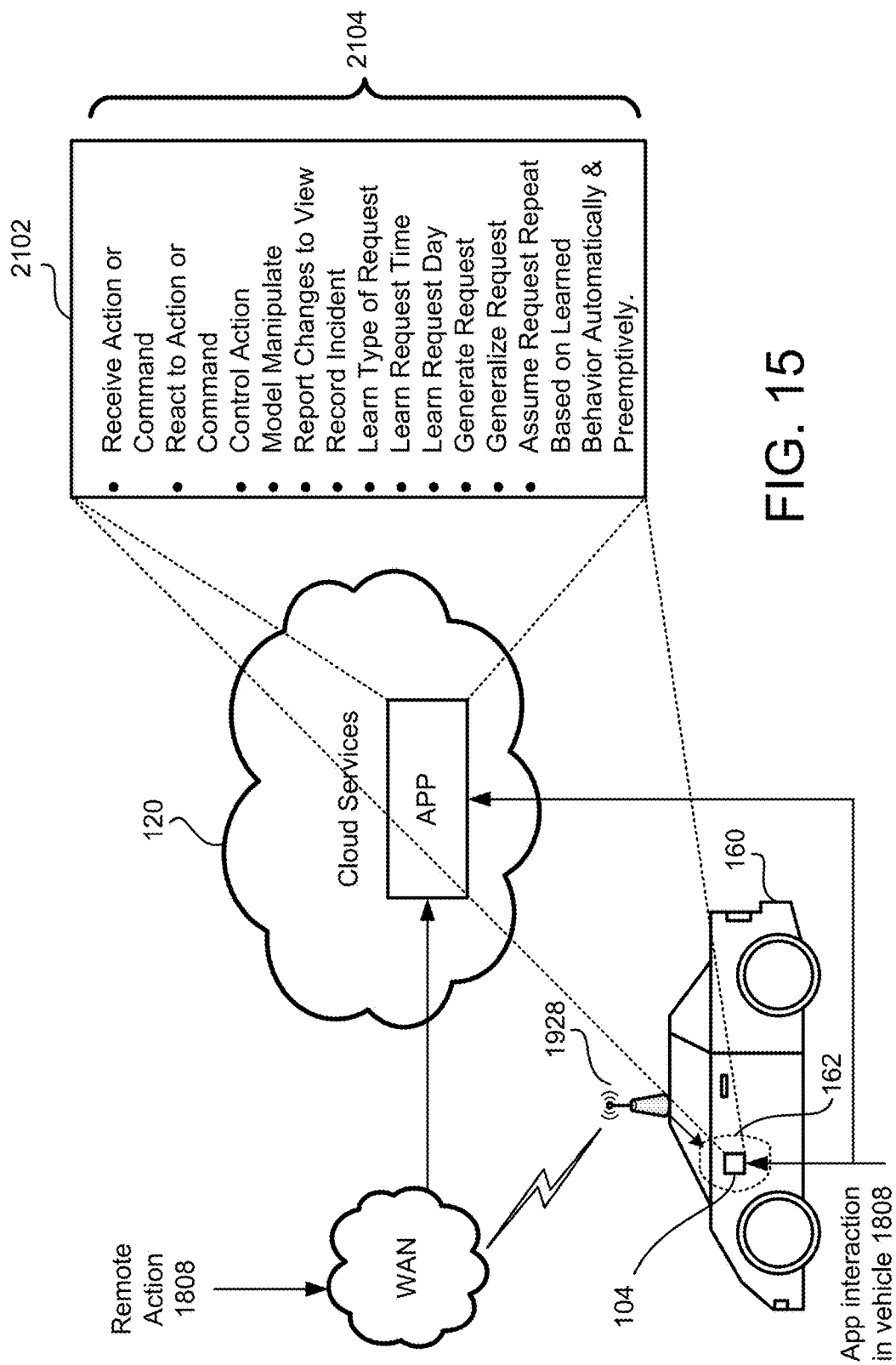
FIG. 15 Describes further ways an APP may take, process and produce results, in accordance with one embodiment.

FIG. 15 describes further example ways an APP 104 may take, process and produce results 2100. FIG. 14 shows a way to interact with an APP 104 locally but a vehicle computer system may relay data, inputs and information to the APP while connected to a wide area network, local area network, cloud process 120 or private cloud. A remote action to invoke change on an APP 1808 may be initiated via a network and pass to the APP running on the vehicle 160 using the vehicle's antenna 1928 or wired interface. An APP 104 running virtually on a network or cloud services 120 may also take input remotely and process the results accordingly.

Some of the inputs and results 2102 that an APP can take and produce locally or remotely include but are note limited to the set 2104 that can receive an action, react to an action, control an action, manipulate data models, report changes to a view or GUI, record events or incidents, learn the types of requests being submitted, learn the times of request being submitted over time, learn the days of the year the requests are being submitted over time, generalize and interpret requests, assume user intent in order to automatically invoke changes, automatically and pre-emptively act on behalf of a user, fine tune learned user behavior etc.

The learned behavior (e.g., learned settings that provide for automatic programming) can be assigned to particular applications, particular sub-features of applications, to particular native system features of the vehicle, or combination of one or more thereof. The learned settings can also be managed via an interface, which shows to the user settings that have been learned and provides the user with options to modify learned settings.

The modifications of the learned settings can be made via the vehicle display or any other device having access to cloud services. The learned settings can also be communicated to the user via notifications. Such as, "We noticed you like your truck temperature at 3 pm to be 60 degrees? Please confirm," or "We noticed you like your car temperature at 8 am to be 75 degrees, this will be preset for you automatically," or "We have detected your favorite settings, please login to your account to see settings we have programmed for you or make updates," or other similar notifications via the vehicle or to any connected device over the Internet.

In other cases, notifications may not be sent. In some cases, the settings will just occur automatically. In some examples, notifications can be provided with a link or access to a user interface of an application. Via the application, the user can manage, set, control or view any aspect of the connected vehicle. In some cases, the settings can be manually adjusted by the user way from the auto settings. In such cases, the manual setting can be learned and can be provided more weighting since the user took the time to correct an auto setting. Thus, various levels of weighting or importance can be given to learned settings. In other embodiments, the learned settings can be compared against learned settings of other vehicle owners having access to cloud processing. Using data from these different user profiles, learned settings can be obtained or generated.

Generation or analysis can be by way of overlap processes, cluster analysis algorithms, Connectivity based clustering, centroid-based clustering, clustering model most closely related to statistics is based on distribution models, cluster validation, density-based clustering, KNN/profile similarity, collaborative filtering, content-based filtering, hybrid recommender systems, mobile recommender systems, cross-sectional analysis, similarities in particular data types or settings, concentration in similar settings by particular demographics, and other similarity analysis calculators and aggregators. These settings can then be recommended to the user or can be automatically added to the profile. Recommender systems can the user the analyzed data to generate the custom recommendations for settings to users' profiles.

Figure 16A:
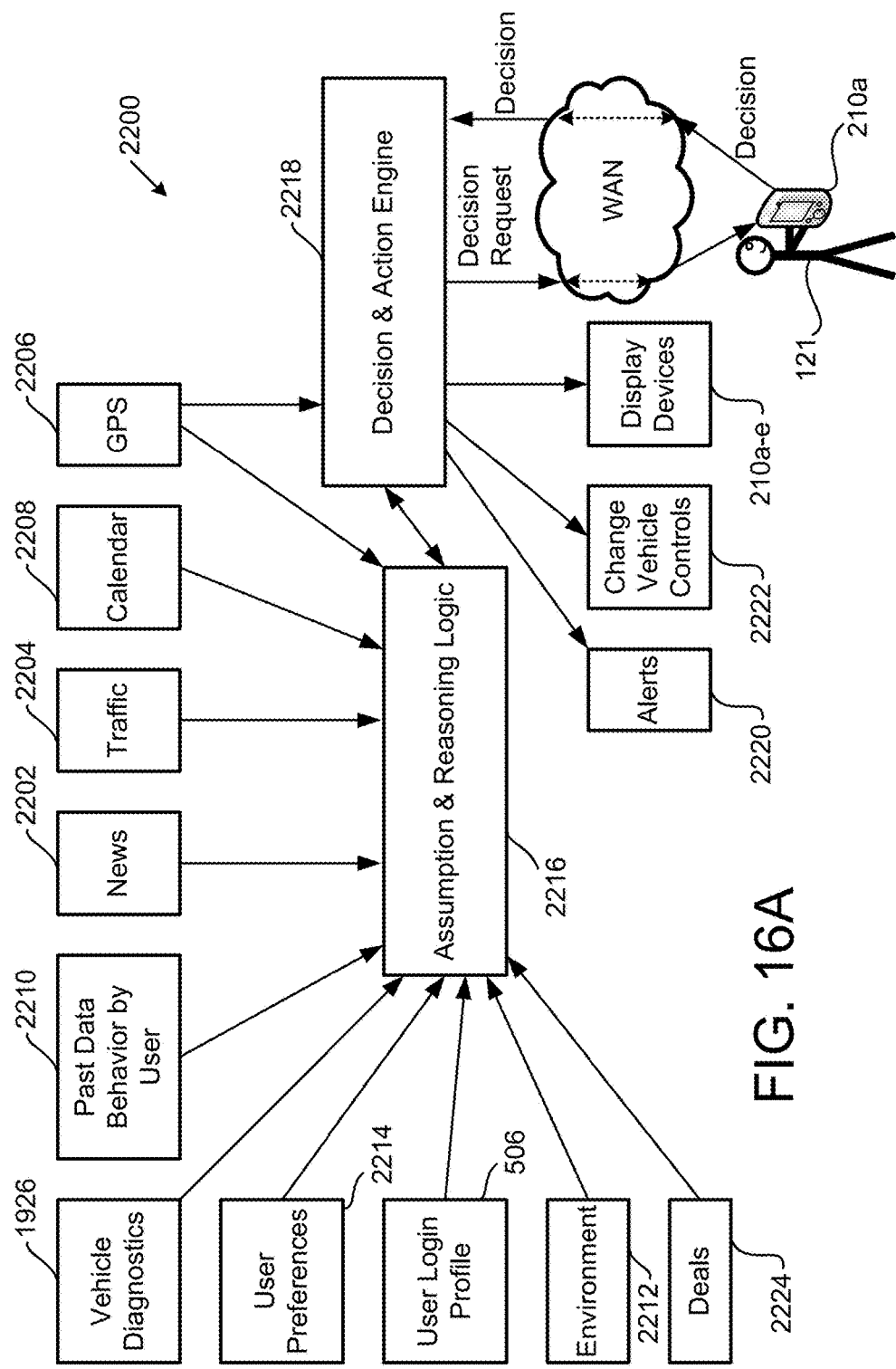
FIG. 16A describes an ecosystem where an APP in conjunction with a vehicle API may work together to make assumptions, make decisions and take actions, in accordance with one embodiment.

FIG. 16A describes an ecosystem where an APP 104 in conjunction with a vehicle API 130 may work together to make assumptions, make decisions and take actions 2200. API and APP code together can be arranged in such a fashion that creates an assumption and reasoning logic module 2216. This Assumption and reasoning logic module can take inputs from various systems and data streams including but not limited to GPS 2206, calendars 2208, traffic conditions 2204, local news 2202, past data of user behavior and interaction 2210, vehicle diagnostics 1926, user preferences 2214, user login profiles 506, environmental interpretations by sensors 2212, marketing deals 2224 among others. These inputs can be local and physical or remote and abstract via a network. The assumption and reasoning logic module 2216 compiles data from these sources to invoke decisions and actions on a decision and action engine 2218.

This decision and action engine 2218 has the ability to execute on what the assumption and reasoning logic module has determined needs to be done. The decision and action engine has the ability to produce alerts, both local, on screen, audibly, visually or remotely on a remote display device 210a-e using a data network. The decision and action engine 2218 also has the ability to change vehicle controls automatically on behalf of a user without user action based on assumptions made by the assumption and reasoning logic module 2216. Additionally, the decision and action engine has the ability to request a decision from the user preemptively in order to change vehicle controls.

This may be achieved locally or remotely requiring input from a user to proceed. For instance, the assumption and reasoning logic engine has determined that the user may want to have his or her car automatically started at 7:55 am because the user typically starts the car at 8 am. Starting the car at five minutes early will allow the system to heat the vehicle to the user's typical liking. However, the assumption and reasoning logic may have only reached a level of confidence of 75% where 80% confidence is required to act without user input. Thus, the system, being only 75% sure that the car should be turned on will automatically send the user an alert requesting a decision on whether or not to turn the vehicle on. Once the user 121 provides an decision remotely on their remote device 210a, the decision engine 2218 updates the assumption module 2216 so that it can augment it's assumptions for an updated level of confidence on the next action trigger. These actions by the user automatically and continually update the assumption and reasoning logic module 2216 in order to fine tune the level of confidence on acting without user input and learn the user's behavior for future decisions.

FIG. 16B describes how one of many types of inputs into an assumption and reasoning logic module 2216 can be compiled over time. Although inputs can come from many sources, this particular example focuses on input into the assumption and reasoning logic module 2216 from past data originating and triggered by user behavior in order for module 2216 to learn. Past actions 2210 are logged into a database either locally on the vehicle computer or remotely which are fed into to module 2216. In this example, data about when the user's actions are stored, along with unique identifiers that will allow assumptions to be made in the future.

These identifiers include times, dates, rates, capacities, temperatures, frequency, degrees, distance, etc. In this example, the system has been keeping track of when the user has been starting his or her engine in the morning on weekday sand weekends. The system harvests all data points associated with given events. These data points 2210 are purely mined data points and no assumptions or reasoning occurs at this point. This data will be used by the assumption and reasoning logic 2216 to determine future actions.

FIG. 16C describes one example of what an assumption and reasoning logic module 2216 may produce using the data points collected on an ongoing basis in FIG. 16B. Over time, using inputs that are continually harvested by a user's action, assumptions are made and refined to aid in making decisions for a user in advance or behalf. Module 2216 has taken the inputs provided by 2210 past data and behavior to determine that before a decision can be made, the user's local or network-stored calendar should be polled to determine how the user's schedule might impact the system's pending actions. For instance, if the system had determined that the user typically starts his vehicle at 8 am but the user's calendar shows a meeting at 730 am located at a location that does not match the current location, the vehicle may assume that the car should be started at 725. They system will determine its level of confidence of the decision and may poll the user for a decision.

The system, by using prior data points has stored assumptions based on conditions, the day it is, the temperature of the environment and historical events, that the user will most likely start the vehicle's engine between 803 am and 805 am, and if the temperature is in the 30s inside the vehicle, the user will most likely set the interior temperature to between 70 and 80 degrees, it is not likely that the user will use the are conditioning unit, if there is ice on the windshield, the user will most likely defrost the windshield for 7 minutes before departure, the user usually drives between 15 and 18 miles at this time of day, the user typically starts the vehicle again in the afternoon between 505 pm and 510 pm, if the temperature is in the mid 70s, the user usually activates the AC and sets the temperature to 65 degrees, typical weekend behavior, the user typically makes frequents stops, does not have a set time the vehicle is started, uses certain APPs at certain times and has a history of certain destinations as recorded by GPS.

FIG. 16D describes an example list of decision the decision and action engine 2218 may take based on information provided by the assumption and reasoning logic module 2216 and sets of assumptions created. The decision and action engine 2218 will attempt, using a degree of confidence to anticipate what the user will want to do in terms of engine start and stop, location destinations, preferences of temperature, driving habits and poll vehicle capacities to ensure the intended path the user usually takes is attainable. For example, the user usually drives a distance in the morning at a certain time, however, the vehicle's fuel supply will not allow for that distance to be traveled. Thus, the decision and action engine polls the user as a reminder that the user should begin their intended travel sooner than usual to allow for refueling time.

In one embodiment, at a remote location, a user is able to access a user interface for an application, which provides users access to user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In some embodiments described herein, vehicles, structures and objects may include circuitry and communication logic to enable communication with a cloud processing system over the Internet.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user.

The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard, etc.

In one embodiment, vehicles can maintain information regarding where they are, where they are heading and their destination maintained which is maintained by GPS and navigation systems on board. The information collected and maintained by every vehicle may be mutually exclusive, meaning that only each individual vehicle is aware of its own heading, rate of speed and current location. This information, in one embodiment is crowd sourced and/or crowd shared/consumed for use in for accident avoidance or other communication. By networking vehicles within a certain radius together, all individually location-aware vehicles become aware of all other vehicles in their sphere of influence. Vehicles may network with vehicles in their range using wireless communication systems such as but not limited to Wi-Fi, Wi-Gig LTE, cellular, radio, near field communication or other methods.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing 120 can be access by the vehicles themselves using their electronics and communications, via mobile devices, from home, from work, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

A user's APP homepage may also include dynamically updating sections in which the most important information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another.

This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

FIGS. 17-30B define methods and systems for assigning advisor accounts for accessing data regarding the vehicle, and also describe the use of electronic keys (e-keys), in accordance with several embodiments.

In one embodiment, users of vehicles may wish to provide advisors with access to select data associated with a vehicle. For example, a vehicle owner may decide to make a user account for an advisor. The advisor, in one embodiment, can be any person or entity. The advisor, in one embodiment, may be a service person, a dealership service department, a mechanic, an auto shop, a consultant that provides auto advice, or a fiend of the vehicle owner. In one embodiment, an owner of a vehicle can define particular aspects of the vehicle data, as being available for providing or sharing with an advisor. The aspects can include, for example, maintenance type information or vehicle status.

Other aspects can include, without limitation, engine indicator data, tire status, tire air pressure, oil level, transmission fluid level, oil grade level, electric vehicle battery status, battery charge level, battery faults, temperature over heating data, service date expiration, mileage data, next service time, coolant level or status, transmission faults, air filter state, wiper change/status, brake pads, brake fluid, tire rotation, remote diagnostics requests, history data, etc. In one embodiment, a user of a vehicle can define or establish an advisory account, which will be provided with limited or select access to specific vehicle data, so that the advisor can process the data and provide recommendations to the user.

For instance, certain vehicle data can include data that is not personal or sensitive. The vehicle data can then be used by the advisor to process the data, examine the data, and based on some expertise or knowledge, the advisor can provide some recommendation to the user. The recommendation can include, for example, notifying the user that the vehicle needs some service or action. The recommendation can include, for example, sending the user information regarding the recommendation and suggesting available times, dates, etc., to allow scheduling of an appointment.

In one embodiment, the communication from the advisor can be in the form of an email, a notification, a phone call, a text message, or combinations thereof. The communications can include, for example, icons, links or graphics to allow the user to accept a schedule time for brining in the vehicle for service. In one embodiment, when the engine light comes on, the advisor is notified, and the advisor can contact the user to tell the user that the engine light is critical or not, and the advisor can be allowed to do remote diagnostics to better define the significance of the engine light warning. The advisor can then provide more informed advice to the user. In one embodiment, the advisor account is limited to the predefined data that the user wishes to provide access to.

In one embodiment, when the advisor is given an advisor account by a user, the advisor may be provided with an email, link, phone number, text, message, etc., which will allow the advisor to login to an advisor portal of cloud processing. The advisor portal will provide the user with a website that shows the current vehicle status for each of the vehicles that the advisor is monitoring or for which the advisor was provided an advisor account.

The advisor portal will allow the advisor to set logic or rules to be alerted when certain types of important data is received for particular vehicles. For instance, if the advisor is monitoring a plurality of vehicles, the advisor may wish to know when particular vehicles see a particular type of fault or error, which may be important enough for the advisor to handle immediately. The advisor may see that a certain user's car is running too hot, the advisor may be notified or alerted so that the advisor can contact the user of the monitored vehicle. The advisor can execute or cause to execute remote monitoring procedures to query the vehicle to see what other condition are, so that a proper recommendation can be provided.

In one embodiment, the user can add a mechanic or auto repair shop and assign them an adviser account. The adviser account would get access to specific vehicles (that pre-allow access), and the user can define specific vehicle data for which access or privileges are provided. For instance, as a user drives around, the car may detect a fault, and the adviser may get a message or notification regarding the fault. The adviser can then communicate with the user to provide his/her technical advice, recommend actions to take, recommend to come in for service, or the advisor can pre-order a part needed for the service, or notify the user that a part of the vehicle is defective or is on recall.

The adviser account can be defined for auto dealers, mechanics, service stations, persons having vehicle knowledge or expertise, etc. Dealers that provide service (e.g., service departments) can receive selected notifications regarding the vehicle health, and based on the degree of seriousness, the dealer/service center can ask you to bring the car in. Currently, dealers rely on users to notify them when warning lights go off. If the problem is serious, and the driver ignores the warning lights the car can get damaged. In one embodiment, these methods/systems provide ways to share specific vehicle maintenance data with select entities. The reporting by the car can be saved to a log/database of events that are reported, and the adviser/dealer can reply to the notices to communicate instructions or recommendations.

Figure 17:
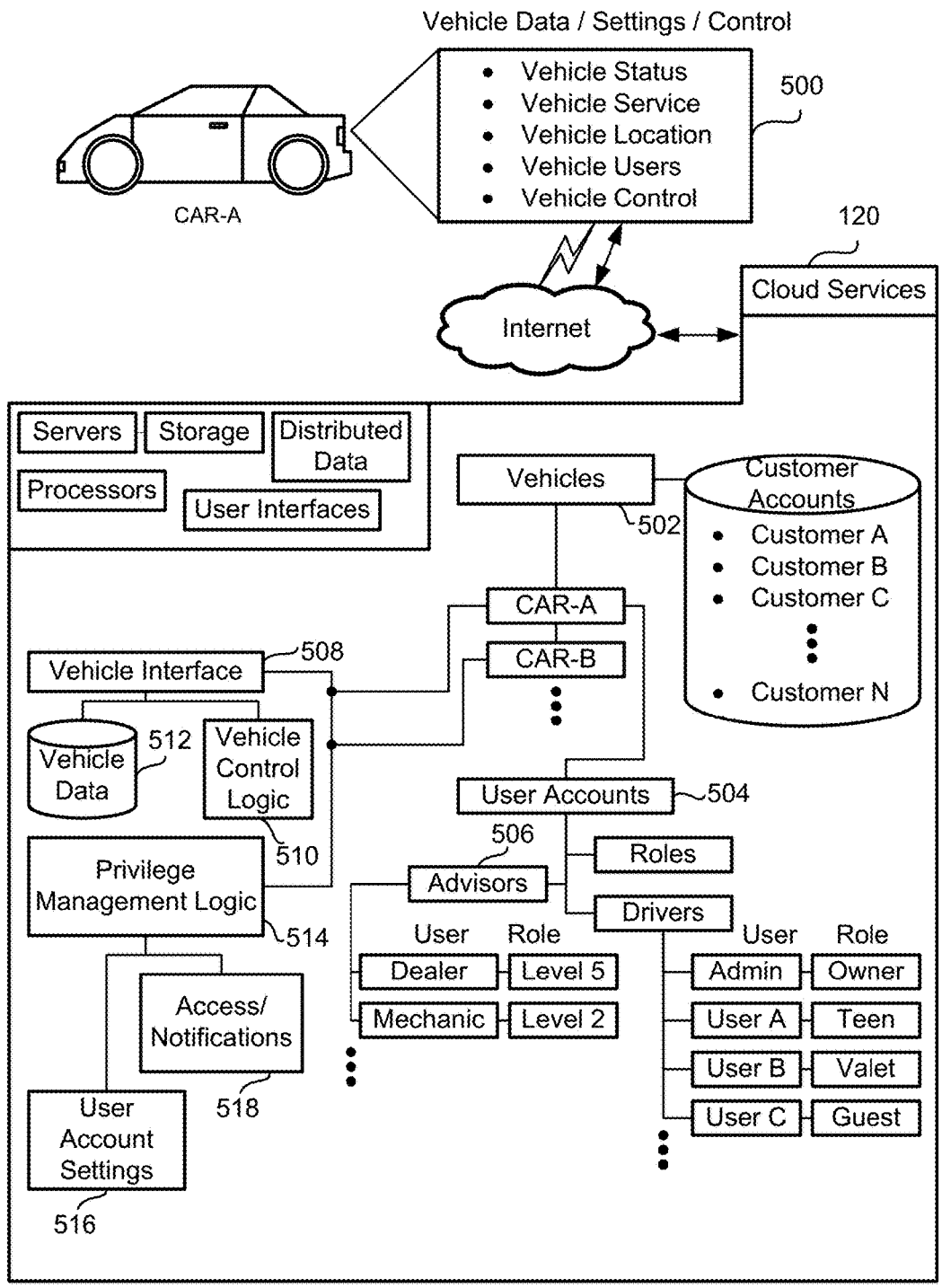
FIGS. 17-25 define methods and systems for assigning advisor accounts for accessing data regarding the vehicle.

FIG. 17 illustrates a block diagram of a process where a vehicle (CAR-A) is associated with vehicle data, settings and control 500, and the vehicle is connected or connectable with the Internet and cloud services 120. In one embodiment, the vehicle can produce a plurality of types of data, such as vehicle status, vehicle service, vehicle location, vehicle users, and vehicle control, etc. The type of data that a vehicle produces can essentially be limitless, and will depend on the type of vehicle, activity of vehicle, the types of users, the location of the vehicle, features the vehicle, use of the vehicle, etc. Additionally, various aspects of the vehicle can be controlled remotely via the Internet, and through cloud services 120 in response to control systems, algorithms, methods, circuits, and the like.

In one embodiment, cloud services 120 can include a customer account database that includes a plurality of customers. Customers may be customers that have registered with a service that manages or provide access to features of a vehicle. The service may be a separate company from a dealer, or it may be a dealership, it may be a car service center, a private service, a friend, or an Internet service, etc. In one example, the customer database has is a plurality of customers that have registered with the service to enable issuance and management of user accounts for their vehicles that have been registered with the service(s).

In this example, the customers include customer A, customer B, customer C . . . customer N. In one embodiment, each customer may register one or more vehicles for the service. For example, customer A is shown to have two vehicles 502 (CAR-A and CAR-B). For CAR-A, the customer may have user accounts 504. The user accounts 504 can include different types of accounts. One such account can be those associated with drivers that may be driving the vehicle. The drivers will each have different roles, which defined the type of user and associated privileges. For example, one user may be administrator (admin), wherein administrators are usually the owners, the person that leased the vehicle, or a person that has some control over the vehicle. In other embodiments, the administrator may be the dealership for the service provider.

Other users can be assigned as drivers, such as teenagers of the family, valet drivers, guest drivers, etc. Each of these drivers can be associated with their own user account, which provides specific privileges (use capabilities, restrictions, limits, parameters, etc.). In another embodiment, user accounts viewed as advisors 506 can also be created. As noted above, advisor accounts are those that provide third parties with access to the vehicle or access to data about the vehicle. Such parties can include dealerships, mechanics, service people, personal advisors, friends, etc. Each advisor account can be assigned a different role, which is linked to a level of privilege. The more privileges that are provided to an advisor account, the more data that the advisor can receive, access, or control.

In one embodiment, if the dealer is an advisor having an advisor accounts, the owner the vehicle can define the level of privileges provided to the dealership. The level of privileges can identify what aspects of the car the user wishes to allow the dealership to know or be made aware of. For instance, the advisor account can set that the vehicle will automatically provide certain data to the dealership. Such data can include the status of the vehicle, engine light data, health information about the vehicle, malfunctions of the vehicle, service information of the vehicle, etc. However, because the advisor account can be specifically tailored to only provide certain information and privileges to the dealer, the owner or admin of the vehicle can define the specific advisor accounts to share only certain sub-sets of information.

For example, certain information that would likely not be shared can include, location of the vehicle, history of routs of the vehicle, radio station data, Internet communications, camera data, voice data, or other information that may be private or sensitive to the user. Of course, this information can be shared if desired. In essence, the advisor account can be defined to provide only the information that the user wishes to share with that specific advisor. This allows for information sharing about the vehicle to be spliced down to the specific feature and data and the specific recipient of the data via the advisor account.

Thus, the information can be parsed to various advisors, by defining multiple advisor accounts. For instance, the user can define an advisor account for a tire dealership and a separate advisor account for an oil changing service station (e.g., for the same vehicle). The vehicle can then automatically transmit data to the service provider, or cloud services, which can then allow the entities associated with the advisor counts to see the data coming from the vehicle or posted by the vehicle to a website. The operators of the services for which the advisor accounts were assigned can then communicate with the user and provide advice regarding the operation of the vehicle, information about updates, warnings, service scheduling, or provide for remote access to the vehicle diagnostics and make changes when necessary.

Therefore, by providing this level of detail to specific advisor accounts, the user can predefine what type of data will be shared with the advisor accounts while not sharing data that is sensitive to the user, administrator, owner, or proprietor of the vehicle.

In one embodiment, cloud services 120 will be defined by a plurality of servers, storage, dash-board data websites, graphical user interface APIs, processors, user interfaces, and the like. The configuration of services offered via cloud services 120 can depend on the service provider. As noted above, the service providers can include any number of entities. Entities can include car dealerships, service providers, mechanics, private entities, individuals, etc.

In one embodiment, the service provider operating a cloud service 120 can include a vehicle interface 508. Vehicle interface 508 is logic that will enable cloud services 120 to communicate with the electronics and software with specific vehicles. Different vehicles have different APIs, systems, software, firmware, etc., and the vehicle interface 508 can facilitate the handshake between cloud services 120 and a specific vehicles. Vehicle interface 508 can include database 512 for vehicle data. Additionally, the vehicle interface file a can include or have contact with vehicle control logic 510, which manages the interfacing with the specific vehicles. For example, if one vehicle type requires a specific algorithm, packet structure, API, etc., the vehicle interface 508 will utilize that communication protocol.

Vehicle control logic 510 can further provide the APIs and commands that are necessary to provide or obtain information associated with the vehicle. The information can requests for data from the vehicle, and can include instructions to the vehicle to perform certain executable tasks. Executable tasks can include, for example, running diagnostics, testing component parts or functions, communicating with occupants of the vehicle, etc. Cloud services 120 can also include logic for managing privileges 514, which can interface with user account settings 516 and can also manage the access and notification requirements or privileges 518.

Accordingly, each of the customer accounts can include a plurality user accounts, and each of the user accounts can be associated with specific user account settings that define the privileges for that account, whether it be a driver account or an advisor account.

Figure 18:
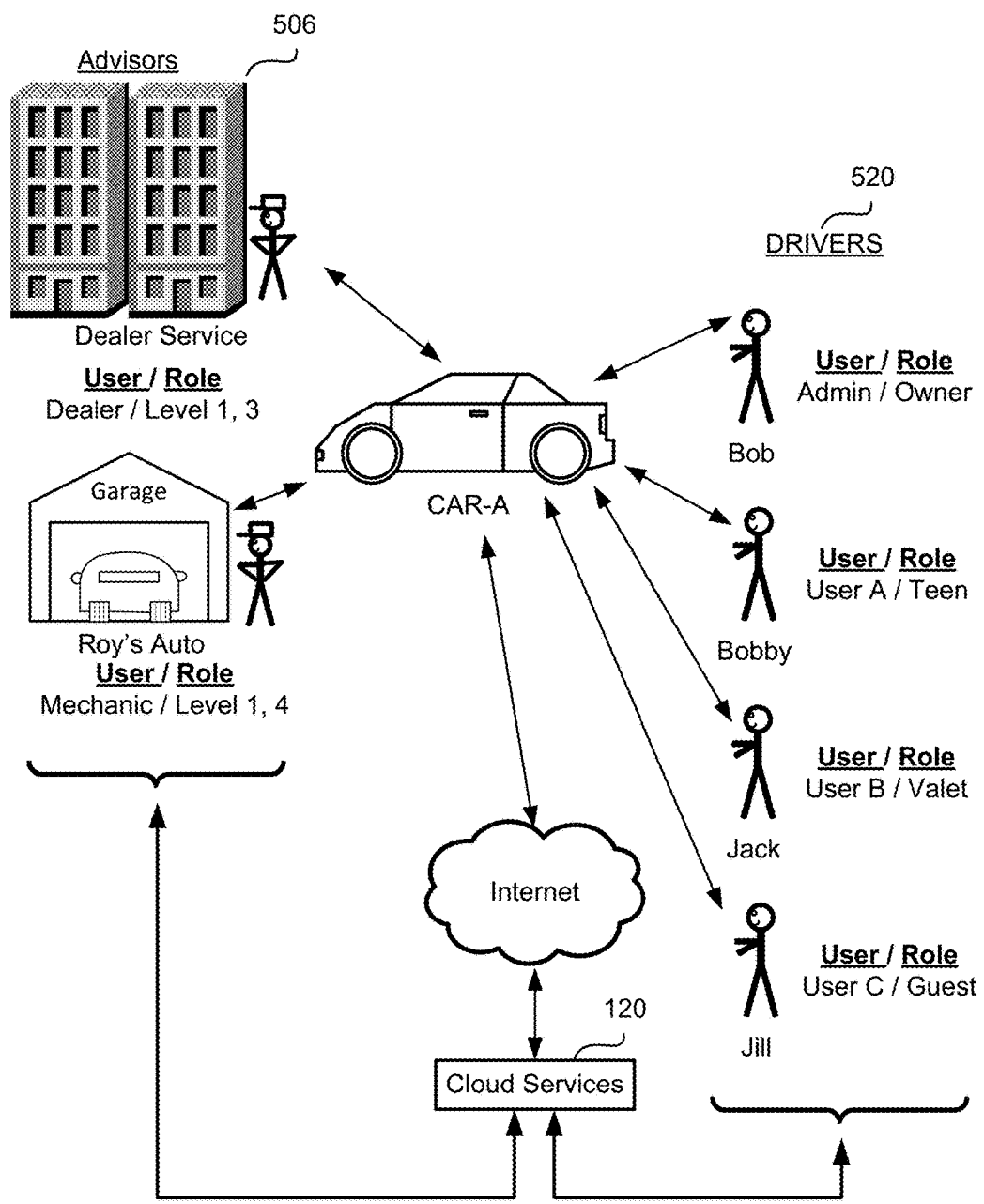

FIG. 18 illustrates an example a vehicle being associated with advisor accounts 506 and driver accounts 520. Advisor accounts 506 can include, for example a dealership, a mechanic, and other entities that will have restricted access to data of the vehicle or specific suites of information regarding the vehicle and/or access to communicate or control features functions or parts of the vehicle from a remote location.

The drivers 520 can also include a plurality of drivers, which may have predefined access to the vehicle. Some accounts can also be associated with temporary drivers, such as valets, mechanics, service people, friends, etc. In one embodiment, the driver can place the car in the valet account mode when the vehicle is provided to a valet for parking. In the valet mode, the vehicle will have restricted use parameters, and will also provide for reporting back to the user in case violations occur in accordance with the predefined privileges assigned to a valet. Examples of violation can include, driving too fast, driving out of an area, accelerating too fast, stopping too fast, parking too close to a structure or other vehicle, coming in contact with a structure or another vehicle, slamming the door, turning on the radio, changing personal user settings such as seats and mirrors, etc.

Cloud services 120 can therefore assign the advisor accounts and the driver accounts accordingly and manage the privileges associated with those accounts. The cloud services will also enable efficient communication with the vehicle to provide and place/set the various accounts at different times.

Figure 19:
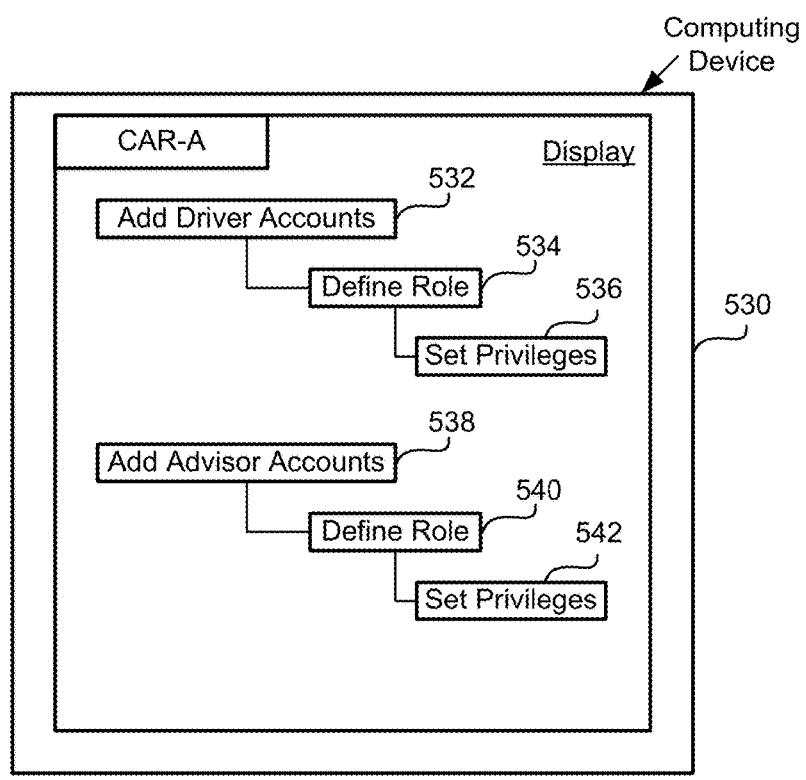

FIG. 19 illustrates an example of a computing device, which may have a plurality of user interface icons for assigning new driver accounts 532, or advisor accounts 538, in accordance with one embodiment of the present invention. Using Add driver account 532, the user can defined the roles of the driver 534. The roles of the driver can also include a set of privileges 536. For example, the driver account can be for a teenager and the role can be set to limit the speed, or provide notifications when the teenager has driven the car beyond a particular area or geographic location.

The privileges can also moderate access to the speed of the vehicle, and used during specific periods of time. For setting an advisor account, the user can set advisor account and defined the roles 540, and set the privileges 542. The diagrams on device 530, maybe part of a user interface that includes icons and buttons that allow the user to select, edit and add accounts, or management of the accounts that the previously set.

Accessing the accounts that have been previously set can also allow access to the history database. The history database can include information regarding the use of the vehicle when the vehicle was controlled under a specific user account, or the types of actions taken by an advisor via an advisor account. Access to these user interfaces can also be through a website provided by the service provider. The website can provide access to the user by user name and password, or other credentials. This access will therefore be tied to a user account. The user account can include identifying information of the user, the vehicle, privileges, encryption keys, etc. The user, upon access, can view the historical use of the vehicle, assign new accounts, revoke accounts, remove accounts, store historical information, and communicate with holders of the accounts.

For instance, the user can log in to website and communicate with their advisors if advisers had left a message for the user/owner of the vehicle. In one case, the advisor account of a dealership may have left a message for the owner indicating that the engine light is on and the vehicle must not be driven due to a recall. Via the website, the dealership may propose certain dates for the service or an appointment to have the vehicle picked up or serviced. These messages may also be transferred to the users mobile device, and urgent communications can be sent by e-mail, text, notification, phone calls, voice messages, or any combination thereof.

Figure 20:
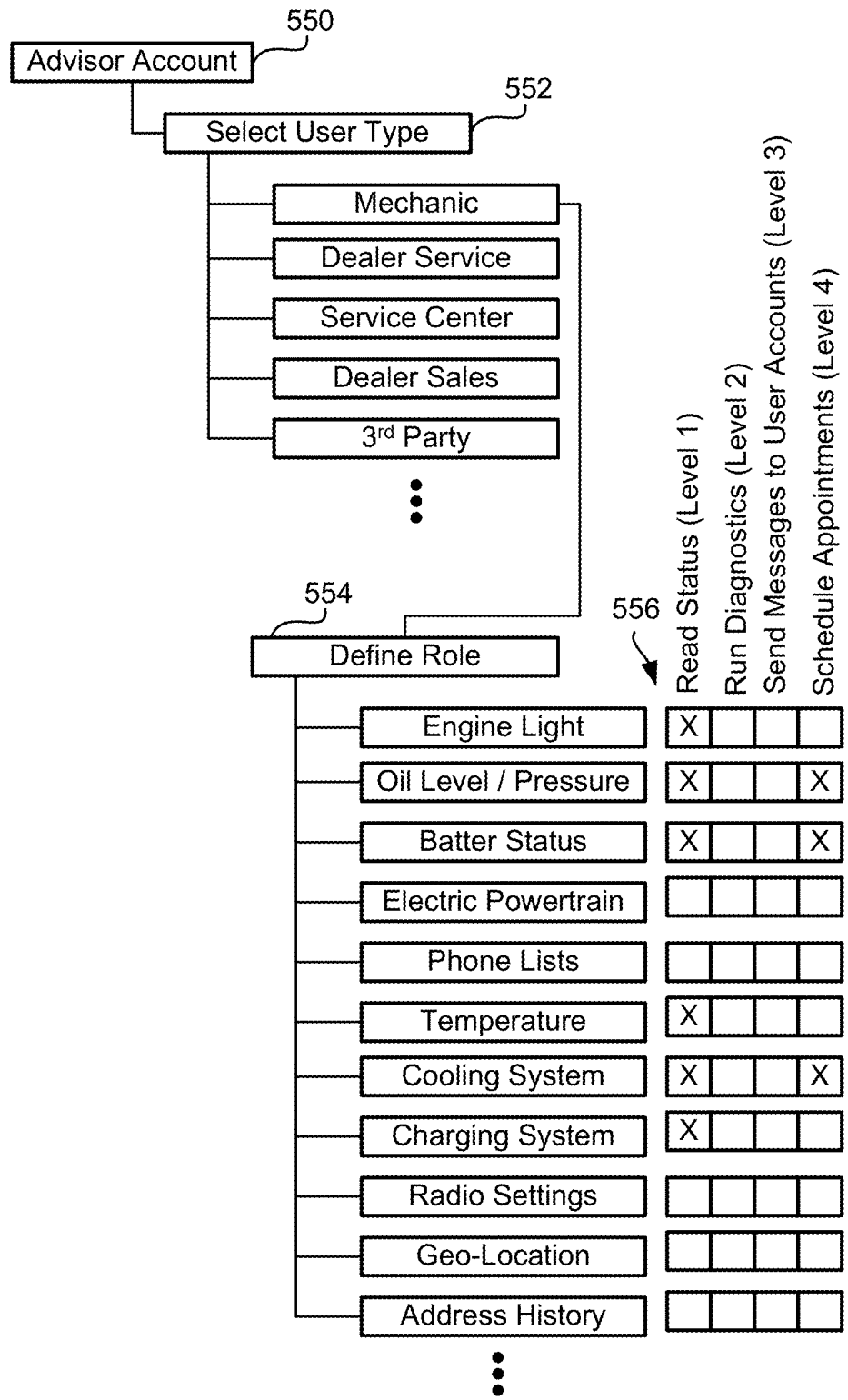

FIG. 20 illustrates an example of an advisor account 550, where the user has selected the type of user for that advisor account 552, in accordance with one embodiment of the present invention. In this example, the user may select the type of advisor account to be for a mechanic, a dealer, a service station, service center, a dealer in sales, a third party, etc. For this illustration, the advisor accounts 550 is for a mechanic, and the user can defined the role 554 of the advisor account when mechanic. The mechanic may be given access to specific features of the car but not access to other features of the car. The features can be associate with different levels of privileges, and the user can use selection buttons, icons, tick boxes, radio buttons, touch screens, keyboards, etc., to select some or all or none of the specific privileges for each of the types of functions or actions or data that may be accessible or usable by the mechanic using advisor account 550.

For illustration, the roles 554 can define access the various features, for example engine light, oil level or pressure, battery status, electric powertrain, phone lists, temperature, cooling system, charging system, radio settings, entertainment settings, geo-location data, historical data, advisers history, etc. This listing of features or information regarding the vehicle is only exemplary, and should be understood that more features can be accessible depending on the type of vehicle and the type of features provided by the vehicle. Additionally, the advisor account can be associated with specific ones of the features and for each feature that is associated with the advisor account, the levels of privileges can also be defined.

Figure 21:
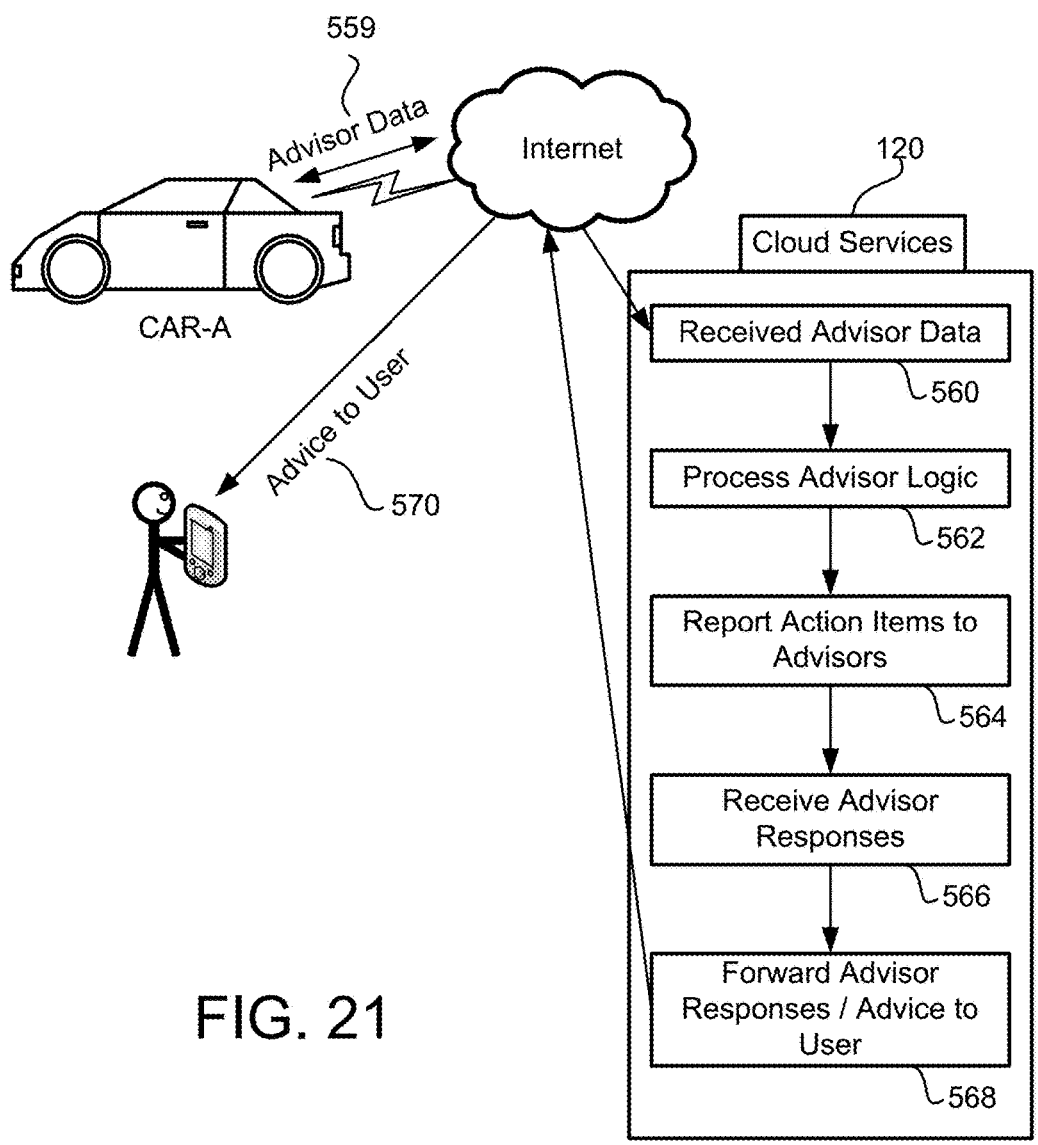

FIG. 21 illustrates an example where a user having an advisor accounts can communicate with an advisor application to receive advisor data regarding the vehicle. The advisor data is data that is provided by the advisors in response to the advisor receiving data from the vehicle. The data from the vehicle, in one embodiment, is automatically sent by the vehicle over the Internet/cloud services 120. As discussed above, the type of data sent to cloud services from the vehicle will depend on the advisor account and the privileges for the specific features and/or control provided to the advisor user. As shown, advisor data 559 is transferred to cloud services 120. Cloud services will receive the advisor data 560, and it will process the advisor data using advisor logic 562.

In one example, the advisor logic 562 will include programs that will define what will happen to the data that is received. Some of the received data will be processed to generate recommendations, some data will be processed and added to a log, some data will be send and processed to automatically notify the vehicle owner about a vehicle event. Certain of the data will produce or require that action items be reported to the advisor. Advisors will receive data 566 from the vehicles that were assigned to the advisors, and in return the advisors can provide feedback to the vehicle owners.

In some embodiments, an advisor will have advisory accounts from many vehicles (such as a dealership advisor), and the dealership can provide feedback to the different vehicle owners. Advisor responses and advisor feedback is then forwarded to the user in operation 568. This forwarding of the advice can include automatically generated notifications, messages, or custom notifications as feedback based on the advisor data 559 received from the vehicle over time or for one event. The vehicle owner or user will then receive advice 570 from the advisor account reporting back to the user, based on the data provided by the vehicle automatically, based on the advisor accounts.

Figure 22:
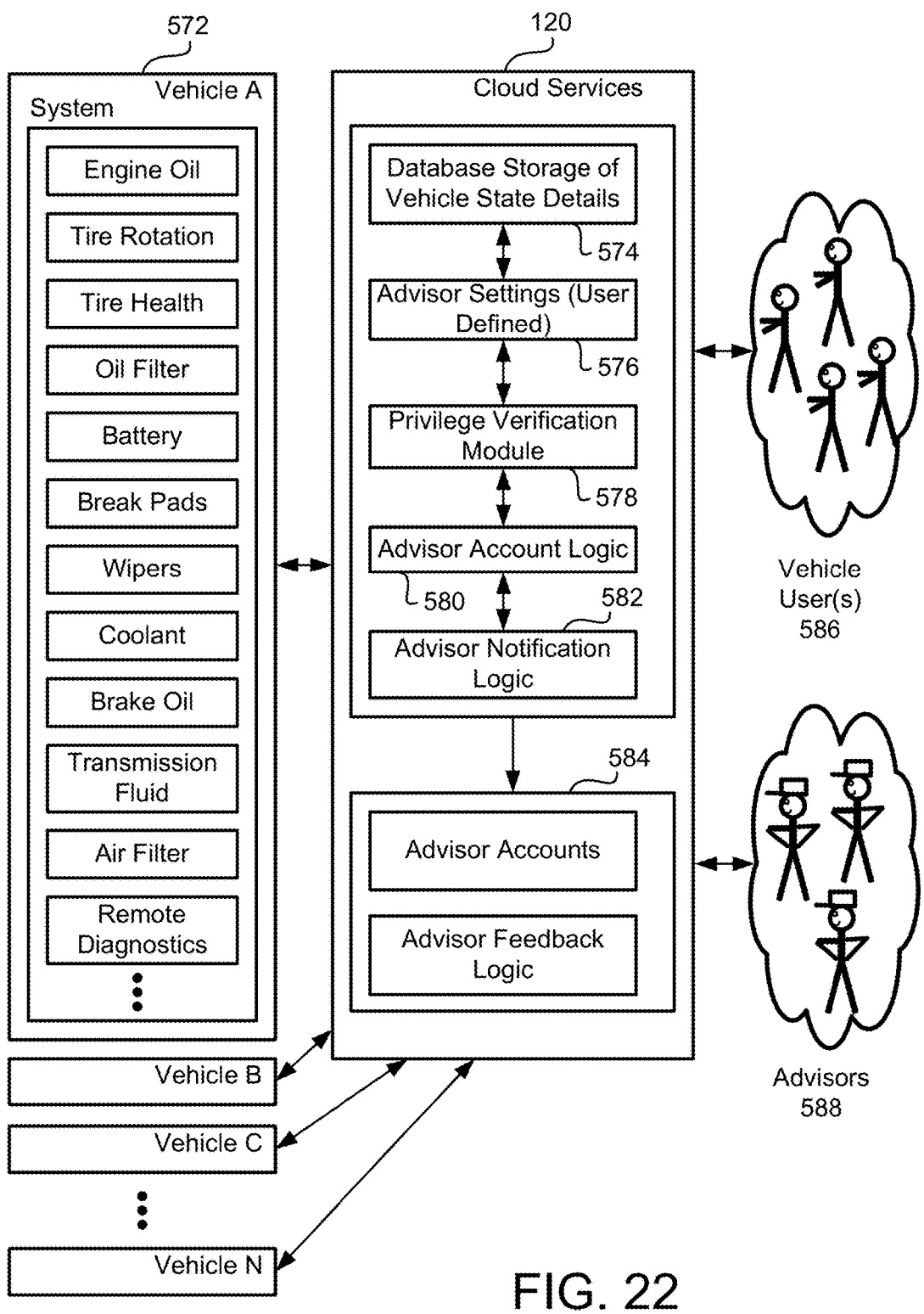

FIG. 22 illustrates an example of various vehicles in communication with cloud services 120. Cloud services 120 is also in communication with vehicle users 586 and advisors 588. The type of information received from vehicles can include any number of metrics associated with features, functions, parts, operation, etc. For purposes of example only, some system features can include engine oil, tire rotation, tire health, oil filter, battery, brake pads, wipers, coolant, transmission fluid, air filter, remote diagnostics, etc. Cloud services can include a number of operations and systems and programs that operate on the data, notify vehicle owners, receive data from vehicles, hold and exchange data between advisors and vehicle owners, etc. In one example, cloud services can include an operation where a database storage vehicle state data 574 is managed.

Additional data can include advisors settings and user defined settings 576. Also included are privileged verification modules 578 which assign privileges to the various user accounts and manage enforcement of the privileges defined by the users for each of the various accounts.

Advisor account logic 580 is also provided, which allows advisors the custom defined what programs, actions, or operation will take place either automatically or require notification to the advisor when vehicle data is received from vehicles placed in their advisor care. The advisor account logic 580 can also provide access to the advisors via website, which allows advisors to view, access, communicate, adjust, control, and interface with features that were provided by the user in the privileges for that advisor account.

The advisors not having access to certain features, as defined by the advisor account will not be allowed access via the website and the advisor account logic 580 will restrict that access. Advisor notification logic 582 is also provided, which provides for communication modules that will interface between the user, the vehicle, and the advisor. The communication modules can also include interfaces for communicating with users via third-party applications, such as e-mails, notifications, social media, text, web applications, and general messages.

Advisors module 584 is also provided, which provides for management of the advisor accounts, creation of advisor accounts, management of advisor feedback logic, and historically tracking actions taken or not taken by advisors using the advisor accounts 584 on specific vehicles.

Figure 23:
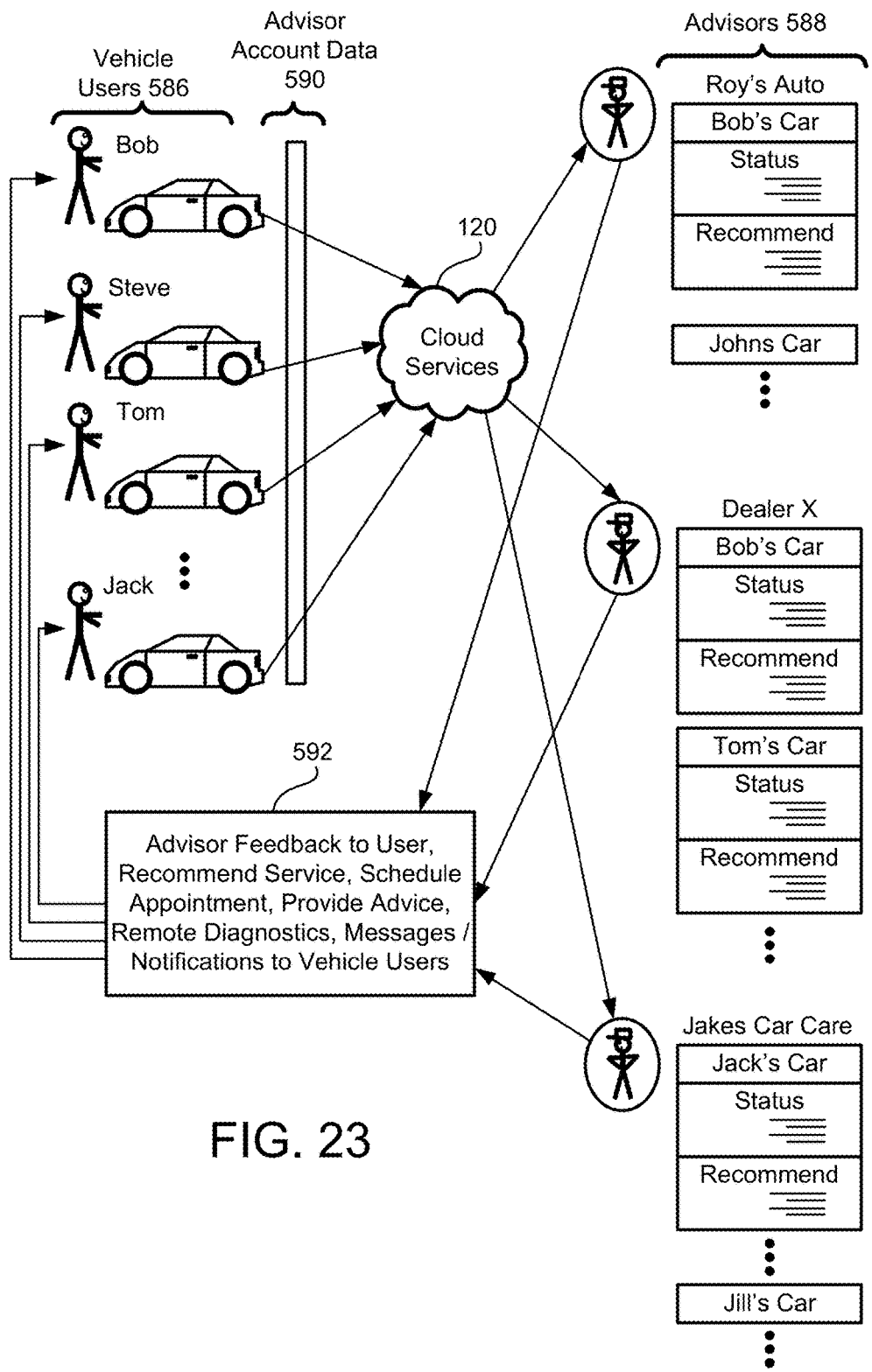

FIG. 23 illustrates an example where a plurality of vehicles 586 exchange advisor account data 590 with cloud services 120. Cloud services 120 will then communicate with the various advisors 588. The advisors and be an auto shop, such as Roy's Auto, a dealership, a car care service, etc. The various owners of the vehicles can therefore define specific advisor accounts for different types of features, functions, or parts of the vehicle. Data seen from the advisors 588 is therefore provided as advisor feedback to the users 592. The advisor feedback can include recommendations for service, scheduling of appointments, providing advice, providing remote diagnostics, providing messages and notifications to the users that assigned the advisor accounts. The communications, messages, notifications from the advisors will then be sent back to the vehicle users 586.

Accordingly, data is passively sent from the vehicles to cloud services 120 as the advisor account data 590, and only specific data is sent to the specific advisor accounts. The advisor accounts will receive only that data identified by the privileges set in the advisor accounts assigned to them by the vehicle users. The vehicle users will then receive information back from the advisors, as set by the owners/admins of the vehicles. Some owners/admins may only use one advisor account for a limited feature, such as oil changes, and no more. This is possible as well as the other extreme where many advisor accounts are set up for different parts or same parts of the vehicle.

Figure 24:
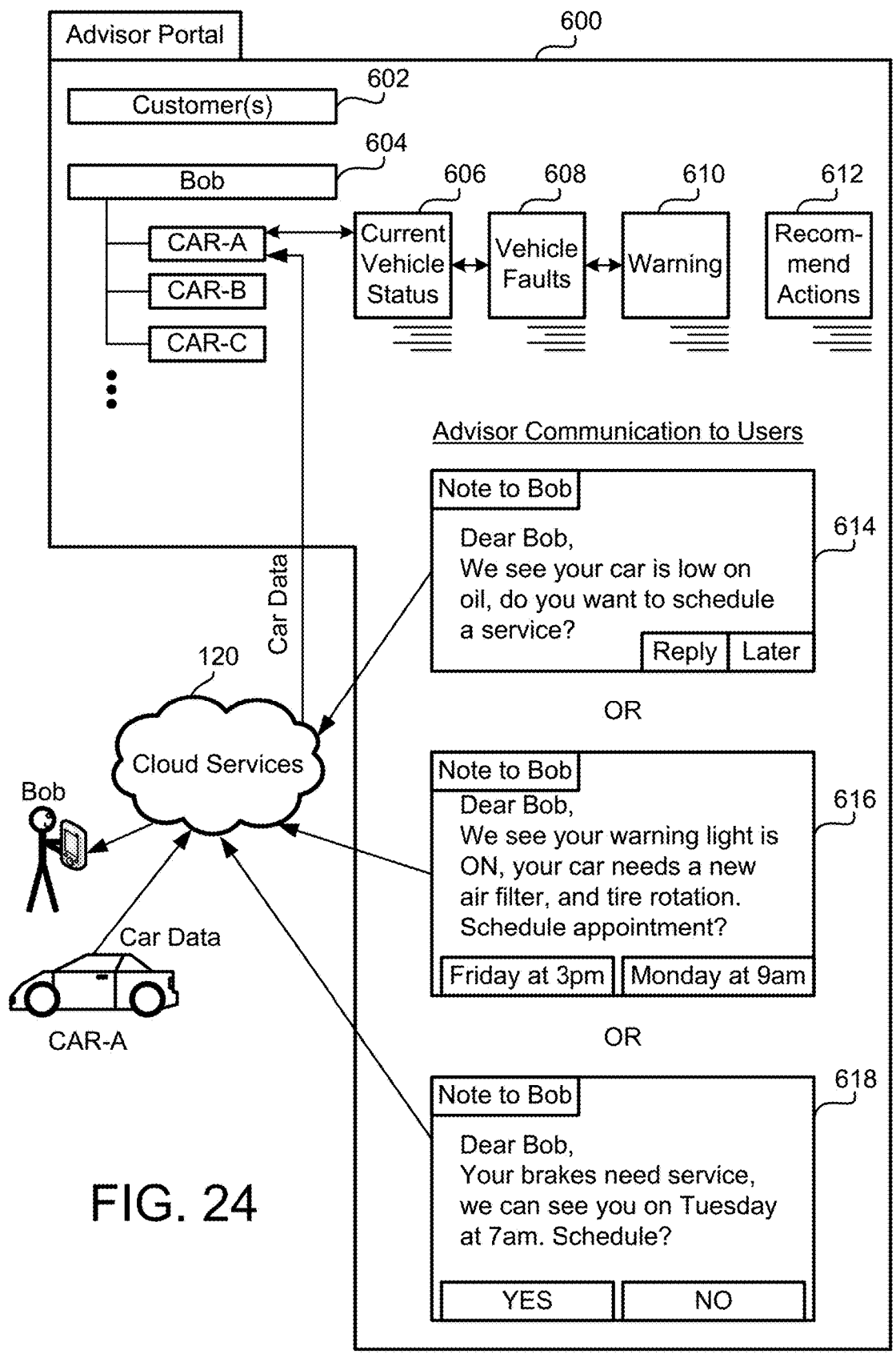

FIG. 24 illustrates an example of an advisor portal 600. The advisor portal 600 may be a website provided to an advisor that has been provided an advisor account by a vehicle owner Bob 604, which is a customer 602. Bob may have various cars set up with advisor accounts with the same advisor. For the specific cars that Bob has assigned to this advisor, the advisor can view specific information regarding the car and can provide communications back to Bob regarding the car. In this example, the advisor can view current vehicle status 606, vehicle faults 608, warning lights 610, recommended actions 612, and can interface with the information via graphical user interfaces to expose more data if privileges were provided. The advisor can also provide specific communications to the vehicle owner Bob. A note to Bob 614 can be generated to notify Bob that his car is low on oil and recommends a service. Bob can also be notified that the warning light is on and can provide a recommended/appointment date and time 616. The message can also be sent to Bob regarding his brakes, along with a recommended scheduling time 618.

Cloud services 120 can then communicate the advisors responses to Bob, and the car can communicate car data back to cloud services 120. In this manner, information that is traditionally only stored in the vehicle and accessible when the vehicle is taken in for service can now be automatically transferred to those advisors that have knowledge about the vehicle and can provide feedback in substantial real-time.

Figure 25:
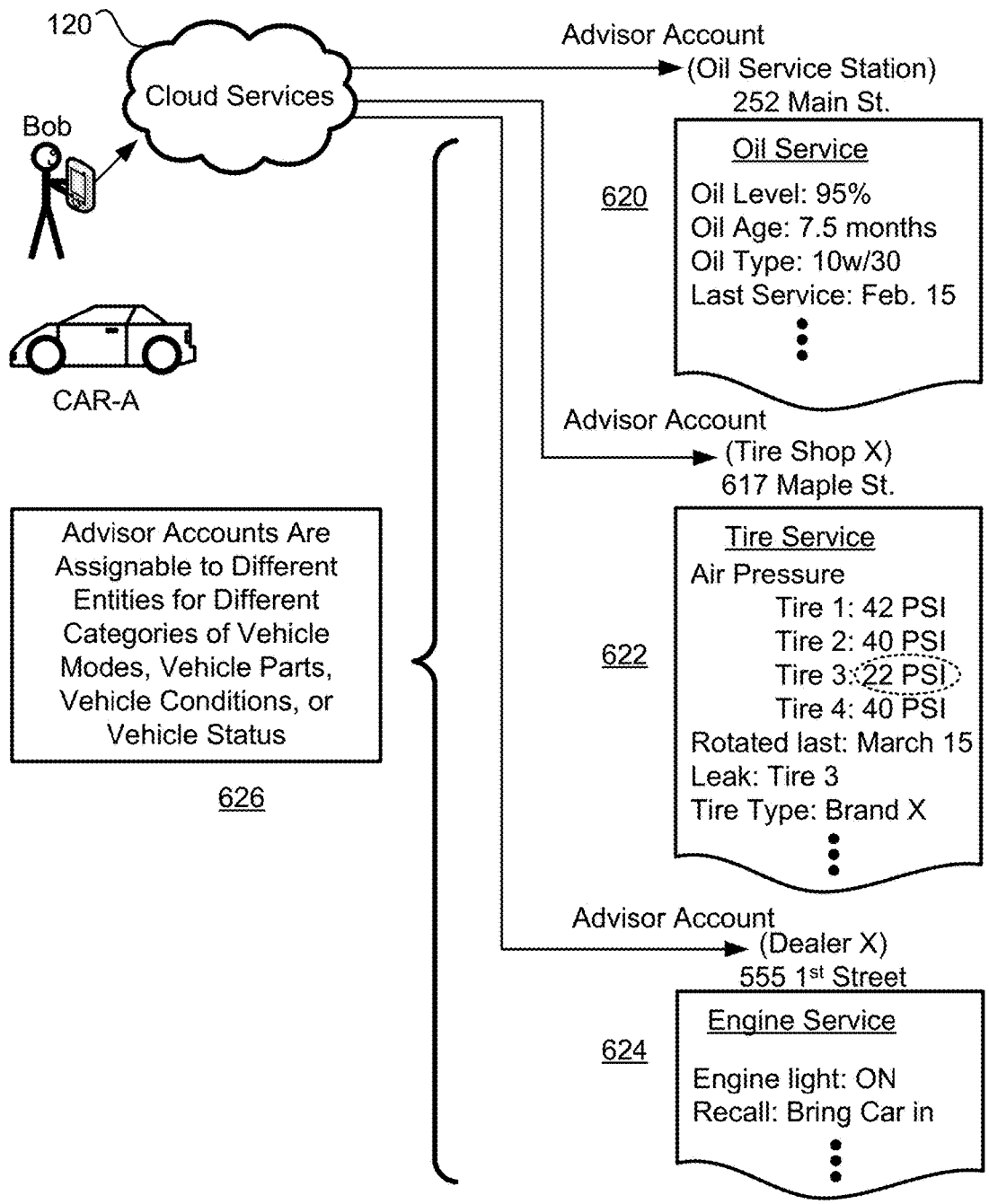

FIG. 25 illustrates an example where Bob utilizes cloud services 120 to assign multiple and different advisor accounts for the same vehicle. In this example, an adviser account has been set up for an oil service station 620. Advisor account has been set up for a tire shop 622. And advisor account has been set up for a dealer 624. Because advisor accounts can be set up for specific parts or functions of vehicle, is possible to assign specific advisor accounts for specific functions of the vehicle, while excluding other functions. The advisor account for the oil service station will not have access to the tire information of the vehicle. In this example, the tire shop will likewise not have access to the oil service information of the vehicle. Cloud services 120 will manage sending only the information that relates to that specific advisor account to their advisor accounts, and in accordance with the privileges. Advisor accounts are assignable 626 to different entities for different categories of vehicle modes, vehicle parts, vehicle conditions, vehicle states, etc.

Figure 26:
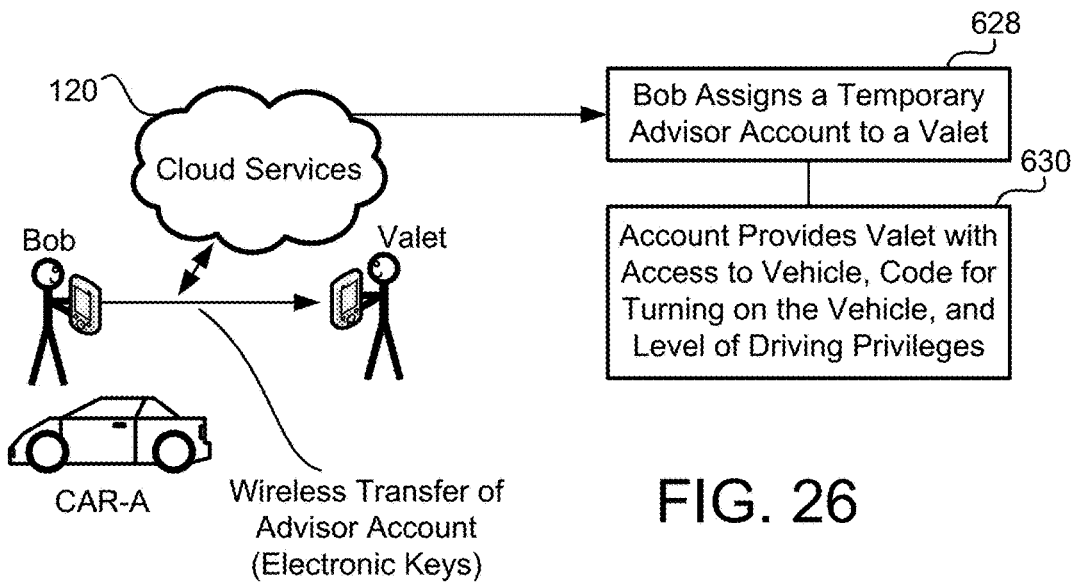
FIGS. 26-35 illustrate methods and systems for assigning e-keys for enabling access of a vehicle to a remote user.

FIG. 26 illustrates an example where the vehicle owner Bob has assigned advisor account to a valet, in accordance with one embodiment of the present invention. Using cloud services 120, Bob can utilize his mobile device to assign on the spot an advisor account to the valet, who will utilize his or her mobile device to access the vehicle. It is example, the advisor account is able to transfer electronic keys (e-keys) to the valet for use via his mobile device. In operation 628, Bob assigns a temporary advisor account to the valet. In operation 630, the account will provide the valet with access the vehicle, such as for unlocking/locking and turning on the vehicle. In this example, metadata sets the level of privileges for the vehicle during the use of the electronic keys.

Figure 27:
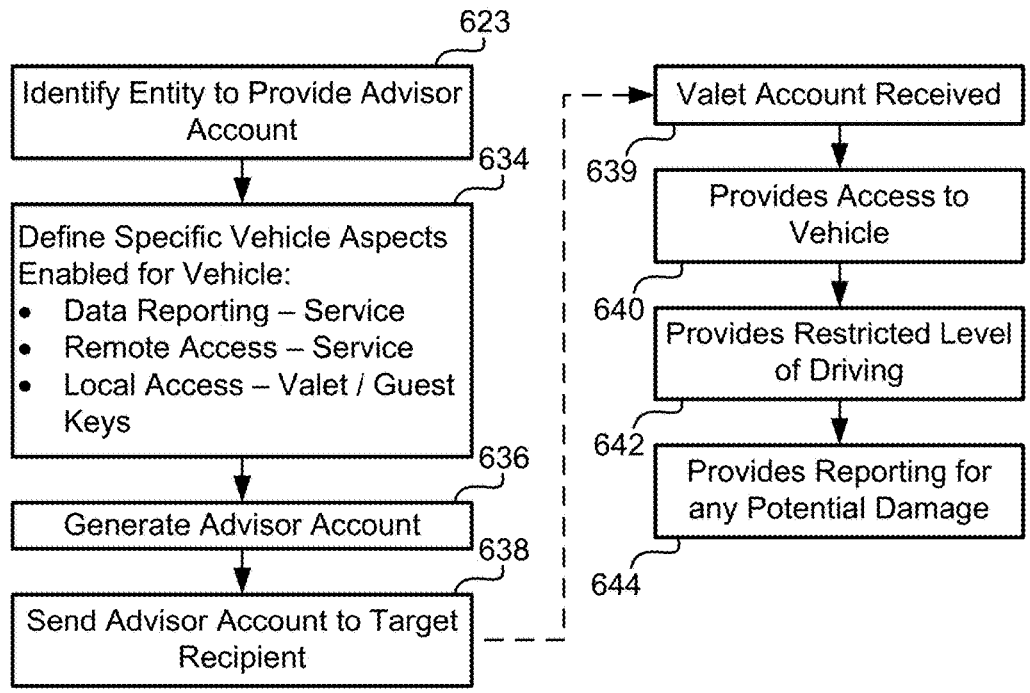

FIG. 27 illustrates an example where electronic keys are assigned to an advisor account. In operation 632, that entity that is to receive an advisor account is identified. The identification of the entities can be by way of sending an entity e-mail, a text message, a notification, a near field communication (NFC) signal, a bump signal, a Bluetooth signal, a WiFi signal, or some electronic transfer signal or signals. In operation 634, the privileges are set for the advisor account, where specific vehicle aspects are enabled for the vehicle.

Information regarding data reporting can be set, remote access privileges can be set, local access can be set for using the vehicle (such as starting the vehicle opening the vehicle, locking the vehicle, unlocking the vehicle, restricting speeds, restricting distances, etc.). In operation 636, the advisor account is generated. The advisor account is then sent to the target recipient in operation 638. Sending the advisor account to enable use of the vehicle, in one embodiment includes sending encrypted e-keys to the recipient.

The target recipients can be the person to which the advisor account is being set. For example, the advisor account can be for a mechanic, a dealership, a service station, a valet attendant, a person, a corporation, and entity, etc. In the case of the valet, the advisor account can be sent to the recipient user or person working at the valet station. The valet account will then be received operation 639. The valet account will provide access 640 to the vehicle. As noted above, the access may include unlocking the vehicle, enabling starting of the vehicle, locking the vehicle, etc. This will allow the valet to drive the vehicle for the restricted privileges set by the valet account 642. During the use of the valet accounts, the vehicle will maintain a history of the use of the vehicle and will provide reports or save the information to a log on a server or on the vehicle. In one embodiment, the vehicle can provide reporting 644 regarding any potential damage to the vehicle while it was under the care of the valet.

In some embodiments, the valet account can be set using the vehicle electronics. For example, the user can go to a screen of the vehicle, select the type of account which will enable use of the vehicle under those privileges for a period of time.

Figure 28:
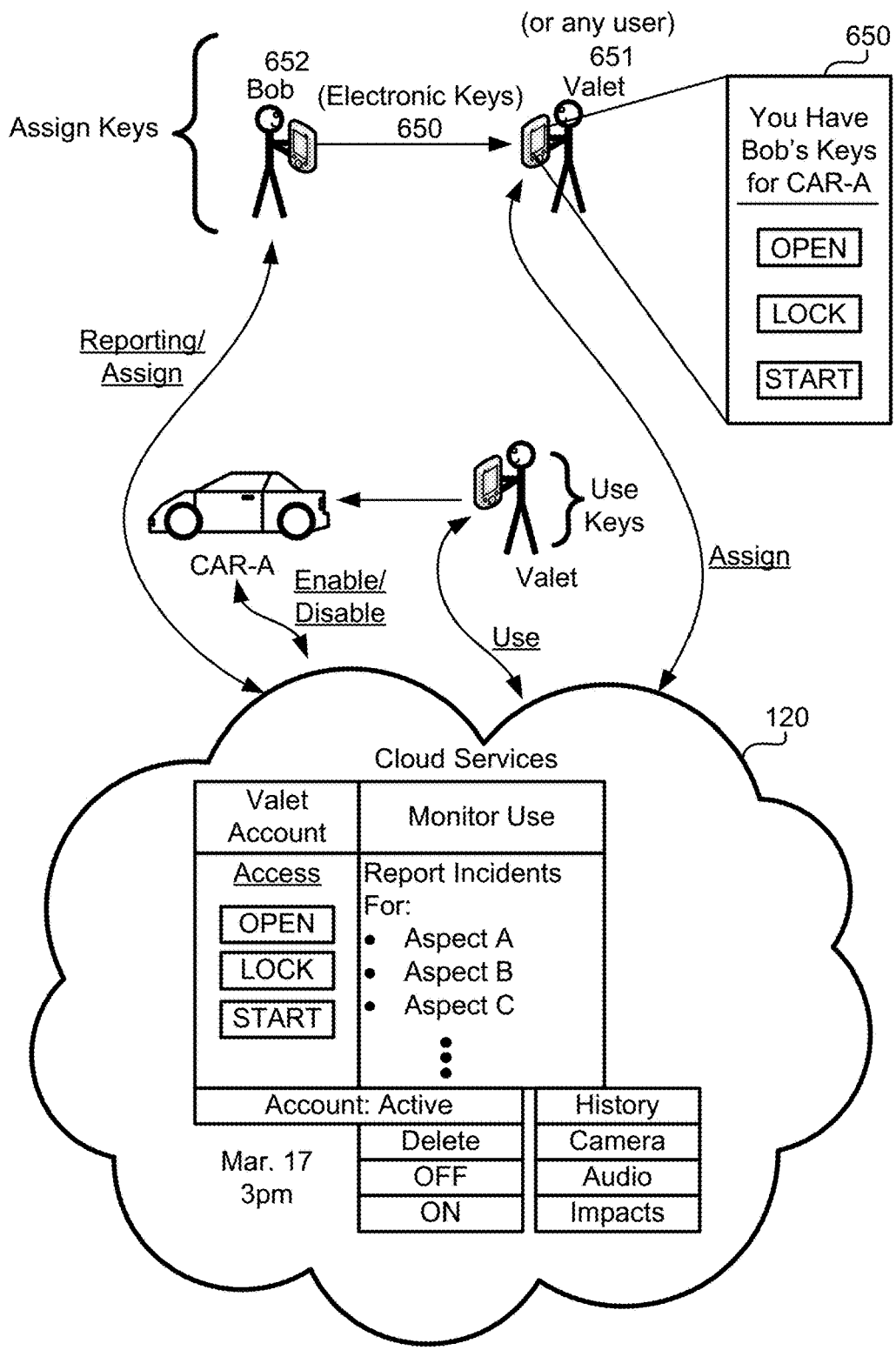

FIG. 28 illustrates an example of the assignment of electronic keys (e-keys) by Bob to a valet. In this example, Bob utilizes his smart phone 652 to transfer electronic key 652 the valet's device 651. The valet's device 651 is the recipient of the electronic keys. In one embodiment, the electronic keys transferred by Bob are sent to the valet by way of cloud services 120. For example, Bob can request that keys be sent to the valet, and the request is sent to the server operating in cloud services 120. The request can include information regarding the privileges, limitations, and/or metadata associated with the request for the electronic keys that are to be sent to the valet. The valet can then use the electronic Keys to use the vehicle in accordance with the privileges set by the requesting user (Bob).

In this example, cloud services can maintain information regarding the monitored use of the vehicle during the assignment of the electronic keys to the valet. A history can be regarding the use. The history can include vehicle functionality, vehicle use, as well as occupant information such as camera data, audio data, exterior conditions, camera conditions exterior to the vehicle, breach violations, attempted thefts, actual theft, damage data, etc. while the account is active. The issuing user can also request that the account be deactivated, deleted, or turned off at any time. Reporting regarding the use of the vehicle can also be managed by cloud services which will inform Bob of any activity or specific activity about the vehicle while the valet utilizes the vehicle using the e-keys assigned to the valet. The assignment of the electronic keys can also have an expiration time, time frame, and an expiration time or date or combinations thereof.

Figure 29:
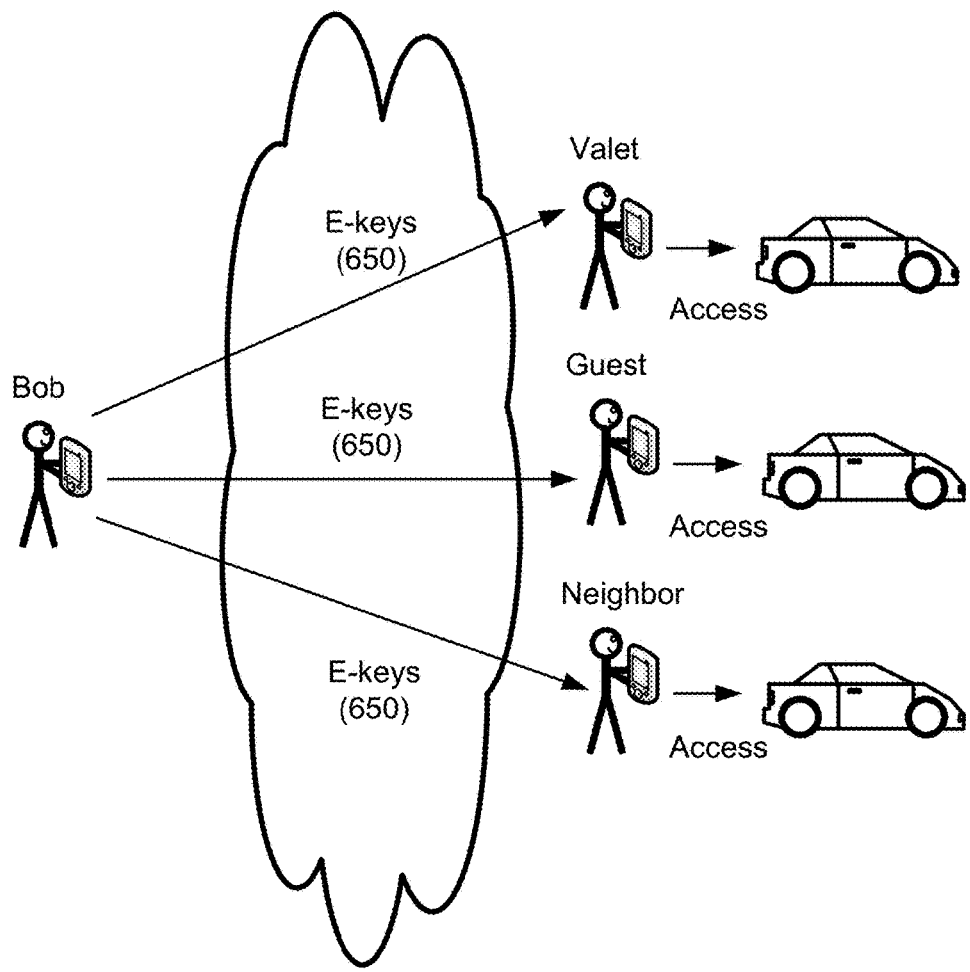

FIG. 29 illustrates an example where an owner of the vehicle Bob, is able to assign electronic keys (e-keys) 650 to any number of users. The keys can be assigned to users with various privilege settings. Additionally, the electronic keys can be sent to users that are remote from the user. For example, if Bob left his car at home, while at work Bob can e-mail, text, message, or send electronic keys to a person that may need access to the vehicle that is remote from Bob. The user (e.g., Bob) can be at a location remote from the vehicle or can be standing next the vehicle or be in the vehicle when assignment of electronics is made. In one embodiment, the electronic keys can be assigned to a number of users, where the privileges are different for the same. The electronic keys for each user can be associated with a different expiration time and privilege priority level.

Each e-key, in one embodiment, will include a unique access code or substantially unique access code. The unique access code can be generated by a server, such as cloud services 120. In other embodiments, the access code can be generated by the vehicle electronics/logic/programs or can be generated by a mobile device or other computing system that is separate from a server. In other embodiments, the access codes can be generated on a remote device from the server or on the server itself. The unique generation of access codes enables each electronic keyed to be different for each user and each e-key can expire at any time set by a requesting user or can be canceled at any time from a device having access to the Internet.

Thus, multiple e-keys can co-exist. In one embodiment, if more than one person wishing to access or ride in the car has an e-key, one of the e-keys can open and turn on the car. If a user with an e-key having higher levels of privileges is riding in the car, the car can either automatically transfer to the higher level or ask for permission to transfer privileges from higher level e-keys, even if the e-keys that first accessed the vehicle were lower level in privilege setting.

Figure 30A:
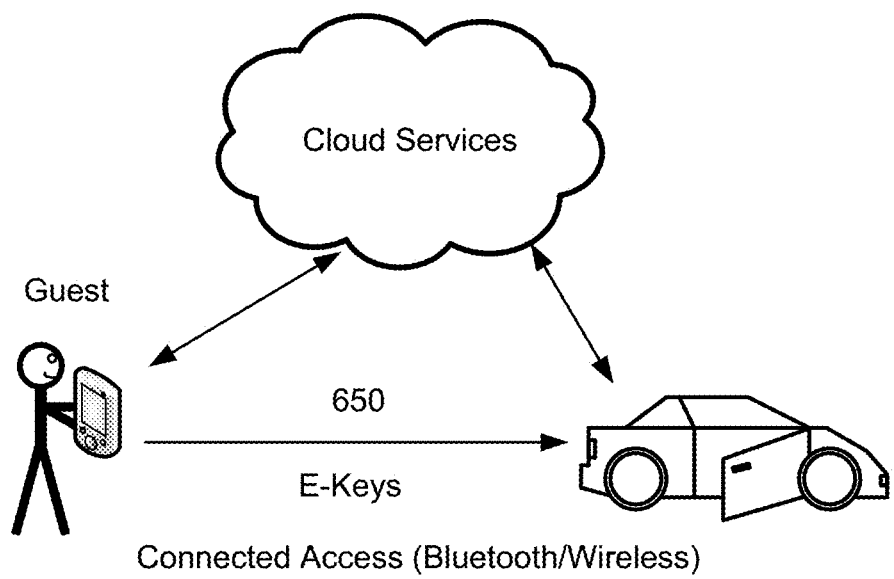
Figure 30B:
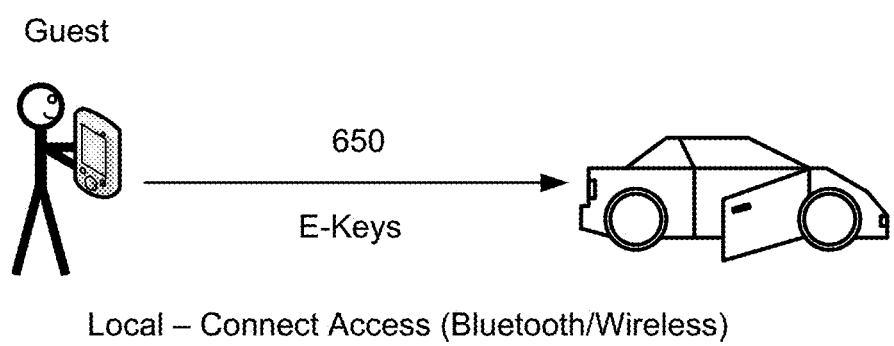

FIGS. 30A and 30B are illustrative examples of having electronic keys transferred to a guest that requires access to the vehicle. The electronic keys 650 can be transferred to the vehicle and verified by the vehicle or cloud services or both, before access is given to the guest. The communication by the guest to the vehicle can be performed using any number of wireless communications, such as radio communication, Wi-Fi communication, Bluetooth communication, etc. The device of the guest, who is the recipient of the electronic keys can be of any type of the device. Example devices can include smart phones, tablet computers, computer glasses, wristwatch computers, computer chips, thumb drive computers, or any other device having the capability of storing data, processing data, and exchanging data either wirelessly or via some wired connection.

FIGS. 26-35 illustrate methods and systems for assigning e-keys for enabling access of a vehicle to a remote user, and related account privileges, as defined in several exemplary embodiments.

In one embodiment, a user can assign an ad advisor account to any individual. The Advisor account can be for any duration, and the duration can be set by the user. In one embodiment, the advisor account can be assigned to a guest driver of a vehicle. The guest driver can be, for example, a friend, a known individual, a service person, a valet person or valet service, etc. The creation of an advisor account can therefore be for a short duration, or long duration, or permanently, or until the account is canceled, stopped, revoked, expires, or eliminated by the person/user that issued or created the advisor account. In one embodiment, the advisor account can act to provide access to a vehicle.

In one embodiment, access can be by way of electronic keys (e.g., e-keys), which can be sent by a vehicle owner/admin to some person or entity. For example, the user-owner of the vehicle can assign a valet with access to the vehicle by going on an application (App or website) on a computing device (e.g., mobile or non-mobile device), identifying the recipient, identifying a mode for communicating with the recipient (e.g., text, email, message, notification, etc.), selecting the advisor account privileges (e.g., what type of access, speed limits, geographic restrictions, amount of time the e-keys will be valid (or else expire)), and requesting that e-keys be sent to the recipient.

Figure 31A:
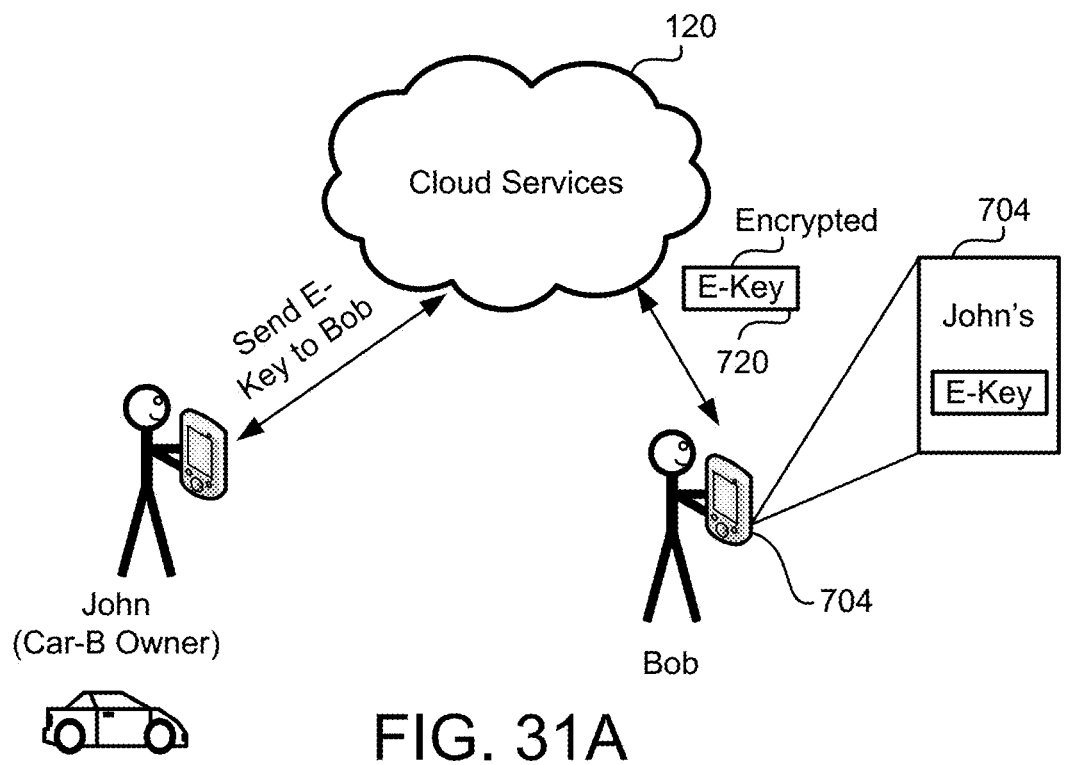

FIG. 31A illustrates an example where a user, John, utilizing his mobile device 702, is able to communicate and send e-keys to another user (Bob). In this example, the sending of e-keys will include the sending of the request to a server, which may be operated by cloud services 120. At the server, the server will generate an access code for the vehicle (car—B). The access code will then be encrypted by the server and then sent as encrypted e-keys 722 to Bob's device 704. Bob's device 704 may be a mobile device, such as a smart phone. The mobile device will include screen having interfaces and icons, and the ability to receive messages, notifications, text messages, and e-mail. In one embodiment, a notification will be received by Bob indicating that John has provided e-keys to Bob.

Figure 32:
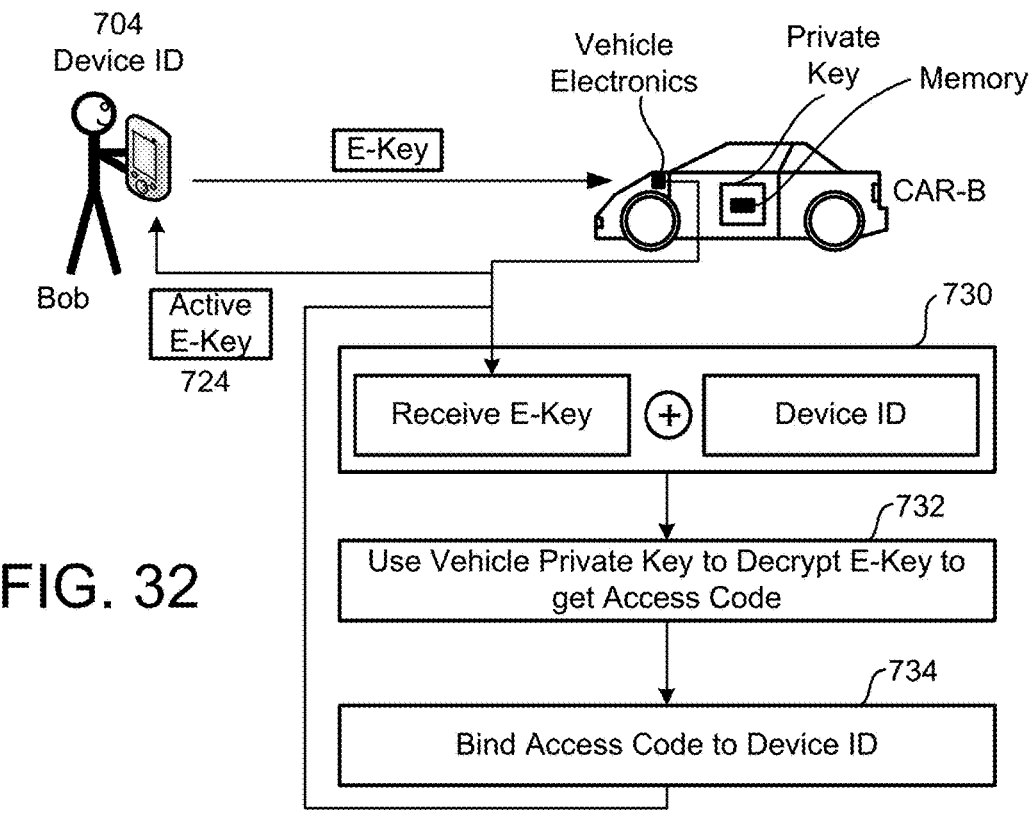

In FIG. 32, Bob utilizing his mobile device 704 will transfer the encrypted e-keys 720 to the vehicle that belongs to John (car—B). In one embodiment, the receipt of the encrypted e-keys 720 will also include code, logic, or program instructions that will request that the device ID of Bob's device 704 should be transferred to the vehicle along with the encrypted e-keys 720. At the vehicle, the vehicle will receive the encrypted e-keys and the device ID of Bob's device 704. The vehicle will hold a private key to unlock an un-encrypt the encrypted e-keys 720.

The encryption by the server of the-keys utilize a public key that is associated with John's car, and held in or associated with an account managed for John. In this manner, John's car, holding the private key in memory can decrypt the encrypted e-keys 720. At the vehicle, the decrypted e-keys will be bound, associated, or paired with the device ID that transferred the e-keys in operation 730.

Because Bob transferred the encrypted e-keys 720 to the vehicle, Bob's device ID is associated with the encrypted e-keys that were transferred to the vehicle. This will assure that future accesses using e-keys that are activated for the car—B will be from the device 704 that received the e-keys from the owner. The target device that receives the e-keys is the recipient device that is identified by the user that requested that the e-keys be provided to the recipient. In operation 732, as mentioned above, the vehicle private key is used to decrypt the e-keys to get access to an access code. The access code is the code that will enable the e-keys to be activated e-keys 724. In operation 734, the access code is bound to the device ID, as mentioned above. The access code is then sent as activated e-keys 724 back to Bob's device 704. Bob's device 704 can now access the vehicle in accordance with the privileges set by John, the owner of the vehicle.

Figure 33:
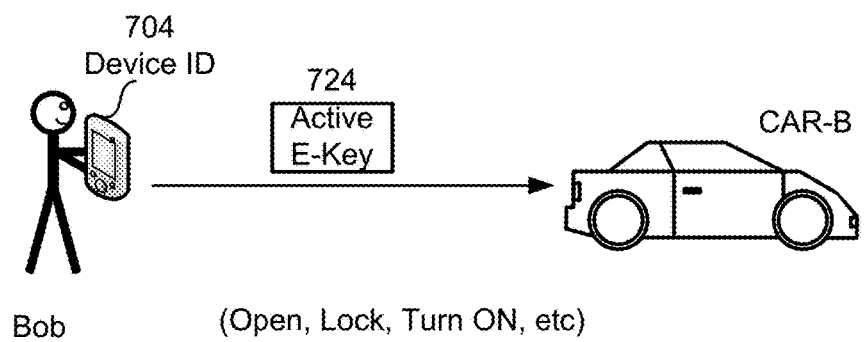

FIG. 33 illustrates an example where Bob utilizes his device 704 to activate, open, lock, turn on, unlock, John's vehicle (car—B). The access by Bob is facilitated by the activated e-keys 724, which are used via device 704 having the device ID that is paired or associated with the access code associated with the activated e-keys 724.

Figure 31B:
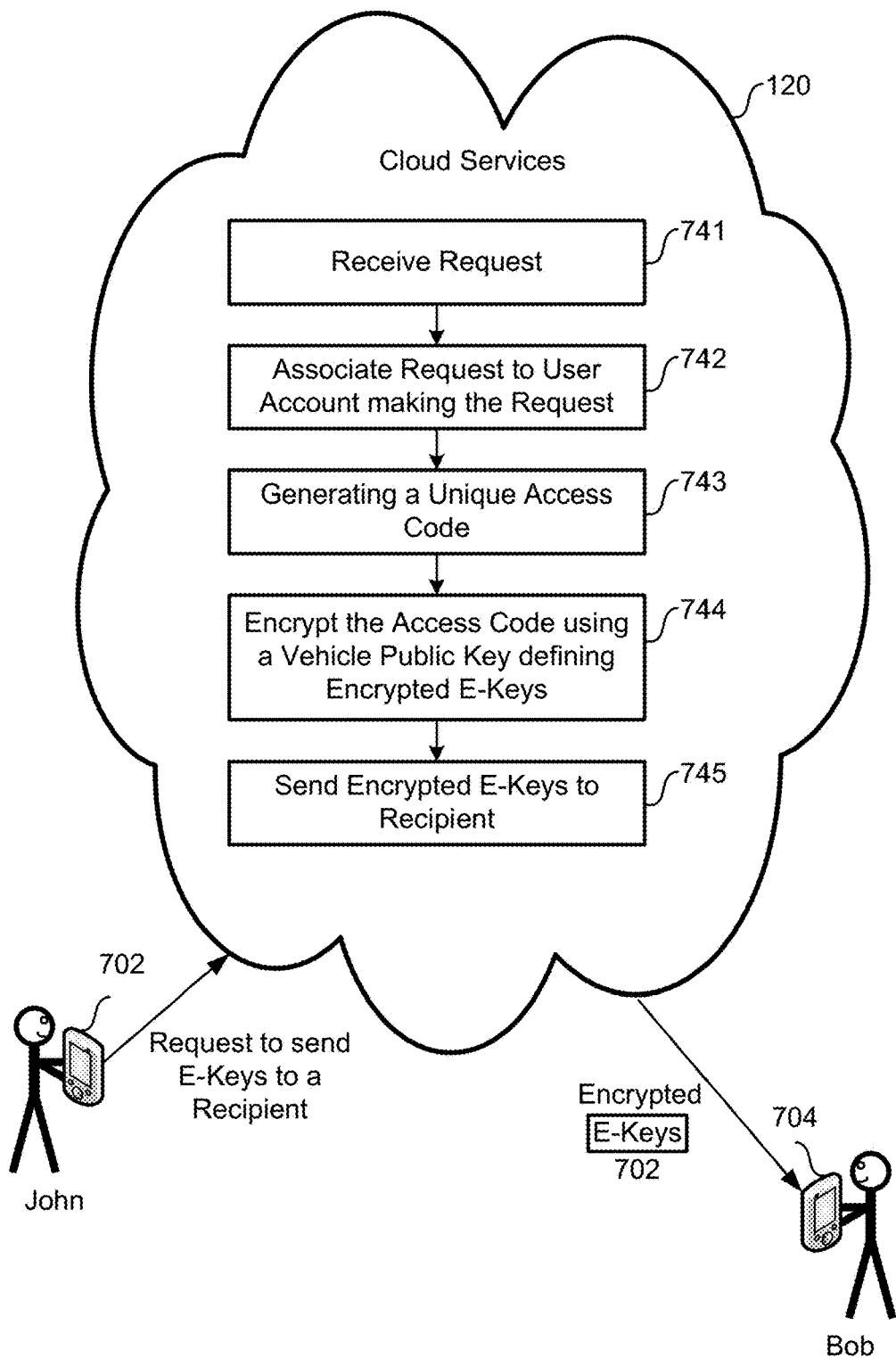

FIG. 31B illustrates an example of operations that may be performed by cloud services 120 when a request to send e-keys to a recipient is received. Cloud services can receive the request 741. The request can include identification of the recipient and the privileges defined by the requester for that issuance of e-keys to the recipient and identification of the device that will receive the e-keys.

In one embodiment, the exact device that is to receive the e-keys is not identified in advance, but only the communication modes to identify the user. For example, the user may have multiple devices that can receive messages. The device that actually receives the message and communicates with the vehicle will be the device that will receive and be able to use the activated e-keys when the transaction to use the e-keys is made with the vehicle. Once the e-keys are activated on one device, the e-keys cannot be activated on other devices unless new e-keys are requested again.

In operation 742, the request is associated with the user account making the request. The user account will be John's account, which will have predefined information associated with the vehicles that John is able to assign e-keys for. Additionally, the user account for John can also include templates that John can use to assign e-keys with various privileges. Some templates can be assigned to teenage users, spouses, mechanics, valet attendants, etc. In this manner, the user does not need to assign the specific individual privileges each time e-keys are assigned, but simply can assign a template of a group of privileges for the specific assignment.

In operation 743, the server will generate a unique access code. The unique access code can be generated by a number generator, and alphanumeric random generator, in incremental number generator, or any other generation device that can generate codes that are unique or substantially unique. In operation 744, the access code is encrypted using the vehicles public key, which is held by the server. The public key held by the server enables encryption of the access code and any associated metadata, privileges, or communication data or codes, which will be sent to the recipient device for accessing of the vehicle. In operation 745, the encrypted e-keys are sent to the recipient. In this example, the encrypted e-keys 720 are sent to Bob and received by device 704.

Figure 34:
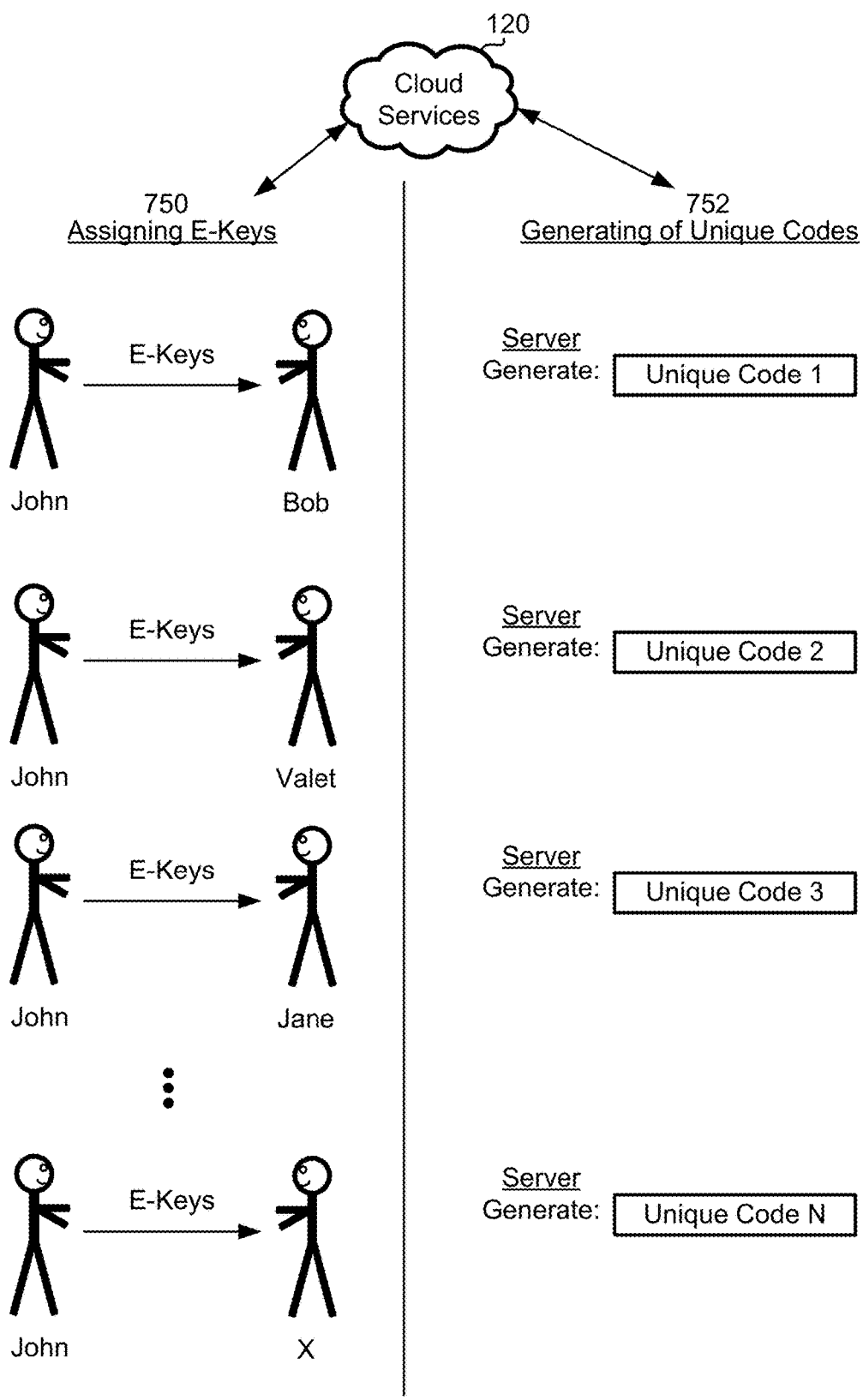

FIG. 34 illustrates examples of various assignments of e-keys 750 and the generation of unique codes 752, as transactions between users and servers of cloud service 120. In the example shown, various e-keys can be assigned by John to various different parties. Each e-key assignment can be associate with a different unique code generated by the server. Each unique code can then be used to associate those e-keys with the same vehicle, but assigned to different devices/people with different privileges. The different e-keys having different access codes can then be encrypted and sent to the user for access of the vehicle.

In other embodiments, the access codes are not encrypted and will enable direct access to the vehicle when the e-keys are sent directly to a recipient. In that embodiment, a user can send e-keys directly from one smart phone to another smart phone or one device to another device without the need for server involvement. Assignment of e-keys in this manner may have lower levels of security, but the assignment of e-keys can still be associate with uniquely associated access codes. The unique access codes can be generated by the mobile devices using applications, and expiration, cancellation or revoking of assignee-keys can be made or conducted via the mobile device (or any computing device, including the electronics of the vehicle). In some embodiments, the mobile device will communicate with the server and in other embodiments no server communication will be needed.

Figure 35:
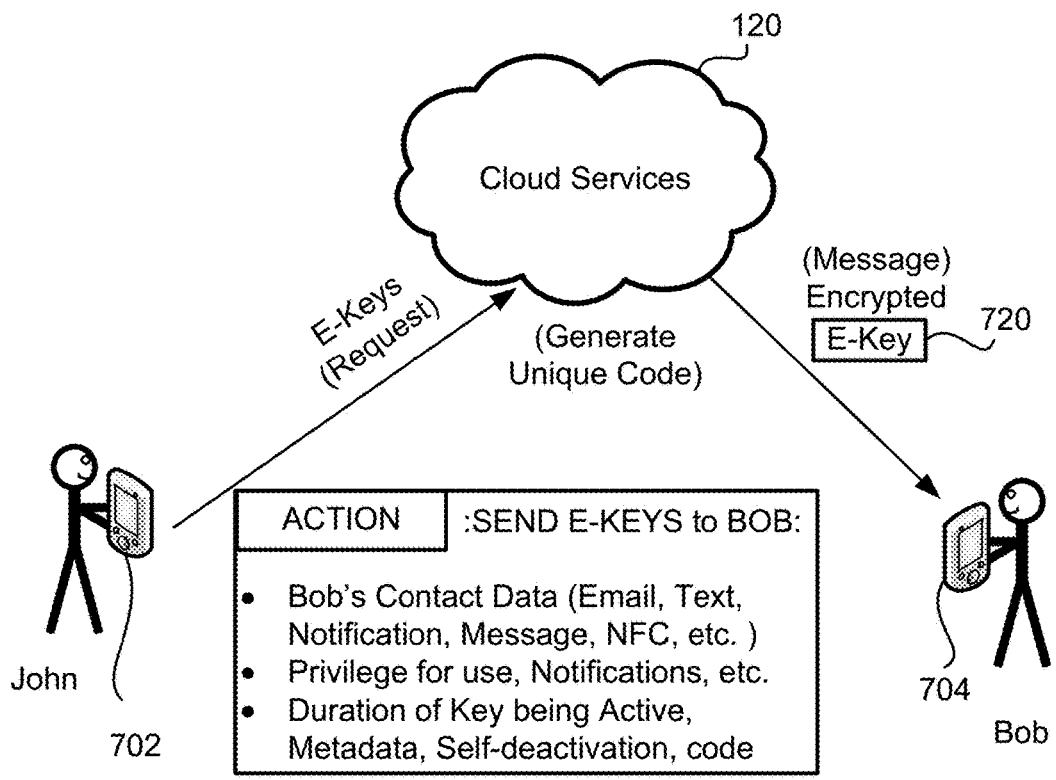

FIG. 35 illustrates an example where a request is sent by John via device 702 to cloud services 120. Cloud services 120 can generate the unique access code which is then encrypted in a message and sent as encrypted e-keys 720 to the recipient, Bob, who receives it via device 704. The request sent by the requester can include an action request. The action can be to send e-keys to Bob. The requester will identify Bob's contact data, such as e-mail, text, notifications, messages, NFC, etc. and can defined privileges for use. The duration that the e-keys will remain active can also be set by the requester. Metadata defining the active state of the e-keys can also be managed by the request, including deactivating codes or self-destructing access code routines when violations occur.

In one example, the app on the user's mobile device can request that a message be sent to the recipient, so that the recipient can receive the e-keys and be granted access to the vehicle. In one embodiment, the recipient may have a mobile device or computing device (e.g., smartphone, tablet computer, laptop computer, personal digital assistant, smartwatch, computer glasses, or the like), on which a communication can be received that provides instructions for obtaining/validating/using the e-keys. In one example, a message can be sent to the recipient, which may provide instructions on how to activate the e-keys.

In one embodiment, the message may have a link to an application that can be launched, which can be used to complete the activation and access with the vehicle. In another embodiment, a simple link can be sent, which when selected will link the user to a webpage, which provides instructions for activating the access for the e-keys.

In one embodiment, application or webpage can identify that e-keys were sent to the individual recipient and will also identify the vehicle (e.g., brand, year, model, color, license plate, or more or less data), may identify the restrictions, and may identify the duration during which the e-keys will remain active. After the duration (or earlier if the e-keys are cancelled by the user), the e-keys will discontinue to work. If, for some reason, the recipient still needs access to the vehicle, the original message or link can provide a method for allowing the user to request more time. The user (e.g., owner of the vehicle) can therefore, via the app or website, reactivate the e-keys.

In some embodiments, the e-keys when active will provide a graphical user interface on the device of the recipient, which may allow access, such as icon buttons to unlock, lock, start and stop the vehicle. The app can also send notifications to the recipient, if for example, the user wishes to provide the recipient with more time or less time. While the e-keys are active, in one embodiment, the vehicle can report back activity of the vehicle, while under the care/use of the recipient. The user may have access to audio input or cameras, to communicate with the driver/recipient. The vehicle use history can also be saved to a server, such that the recipient's use activity can be audited, or viewed or accessed.

In one embodiment, the e-keys can be sent to any person, via a communication message. The e-keys, in one embodiment, are sent to a user in a message so that the recipient can get a graphical user interface that allows the recipient to activate the e-keys and then open the car, turn on the car, drive the car, turn off the car, lock the car, etc.

For security purposes, e-keys are generated at a server, which may be managed by a server to execute cloud services. The server may receive requests from registered users who may wish to assign e-keys to some individual or entity. The request is associated to the user account, as managed by the service. If the user has multiple vehicles, the request may further include identification of the vehicle, such as CAR-A or CAR-B, etc. At the server, the server is configured to execute the generation of access codes for a particular request. The access codes can be uniquely generated by the server, for each received request. In one embodiment, the access code format or form is set, so that a vehicle knows what to expect and reject access codes that do not meet the format or form. Once the access code is generated for the request, the access code is encrypted using a public key of the vehicle, which is assigned a public/private key pair.

In one embodiment, the public/private key pair can be re-generated from time to time, if the user feels that a security breach has taken place. Usually, however, one public/private key pair may serve for a life of a vehicle. The server keeps and maintains the public key and the private key is stored in storage/memory of the electronics of the vehicle. Although traditional encryption may make the public key freely available, in one embodiment, the public key is only referred to as "public" for purposes of defining the encryption logic, but preferably the public key is kept private or securely held by the server. The private key can be stored or programmed when the vehicle is registered with a service or at any other time, when the public/private key pair are re-generated for security purposes. The transfer of the private key to the vehicle can take place over any wired or wireless network, or by transfer via some connector, plug, memory card, thumb drive, etc. In any event, the private key is stored and kept secure by the vehicle.

In one embodiment, in addition to the access code being encrypted, other data can also be encrypted along with the access code. Such other data can include, for instance, metadata. The metadata may include a number of control information/parameters, programming information, privileges defined by the requesting user, the expiration time of the e-keys, code/logic for self-deleting the access code of the e-keys on the recipient's device when the expiration time is reached, etc. In some embodiments, the device of the recipient, once the access code has been activated, can communicate with the server in a background mode. The communication can include, for instance, having the server de-activate the access code if the issuing user decides to cancel the access code.

For ease of discussion, reference will be made to encrypting the access code, but it should be understood that other data may also be encrypted. The encrypted access code is then sent to the recipient, as identified by the requesting user. The recipient will, in one embodiment, receive the message that tells the recipient that he/she has received e-keys, and to click on a link or select a button provided or associated with the message when the recipient is within communication distance to the vehicle. The recipient can then approach the vehicle, e.g., at wireless communication distance (e.g., WiFi, Bluetooth, NFC, radio, etc.). The device of the recipient, upon the recipient selecting the button or link, will cause the device of the recipient to transfer the encrypted access code (e.g., e-keys) to the vehicle.

In addition, a device ID of the device that sent the encrypted e-keys to the vehicle will also be received by the vehicle. The vehicle, because it has the private key of the public/private key pair, will be able to decrypt the access code. The vehicle will then bind the access code with the device ID. The access code, being bound or associated with the device ID will be returned to the recipient's device, which will be the activated e-keys. The activated e-keys will therefore allow the recipient, using the device with the device ID to use screens, graphical user interfaces, apps, or buttons on the screen or device to actively use the vehicle.

The activated e-keys will, however, only be active for the period of time set by the vehicle owner that sent the request to grant the e-keys to the user. As used herein, the device ID can be any type of device identifier, such as a model number, a code, a serial number, an alphanumeric string, a numeric string, a simple number codes, or any type of identifying data. In one embodiment, the device ID is a MAC address of the recipient's device.

A cloud services website, which may be managing the generation of e-keys will set metadata that defines what the limits or restrictions or parameters of the e-keys are, such as how long the-keys will be active. In one embodiment, the generation of the e-keys can be for a predefined set period of time, e.g., such as 1 hour, 1 day, 1 week, 2 weeks, 1 month, 1 minute, 2 minutes, 30 seconds, or until cancelled or eliminated by the user. For example, the e-keys can be generated as a spare e-key for a person's wife or child. In that case, the-keys may not expire, until the account is cancelled, thus deleting the key pair validation and associated encryption.

In one embodiment, each e-key generated is unique, as the generated access code was unique for the specific request. A random number generator can be used to provide access codes. Each unique e-key, being unique, can be cancelled and eliminated without affecting other issued e-keys. The number of e-keys generated can therefore be essentially unlimited, as each e-key is unique. In one embodiment, each e-key assigned to a recipient can be associated with a log of activity. The log can identify what driving took place, where the vehicle was driven, speeds, damage sustained, radio stations listened to, conversations had, images of drivers during that time, etc. In some embodiments, the level of monitoring can be more limited.

In some embodiments, the level of monitoring can be provided in a message, at the same time the e-keys are assigned to a recipient. In this manner, each recipient will know in advance what monitoring is occurring on the vehicle while the vehicle is used with the issued e-keys associated with the account or advisor account. In some embodiments, more monitoring will be acceptable, such as when the vehicle is driven by a valet. In some embodiments, less monitoring is more acceptable, such as when a spouse is driving the vehicle.

The recipient user, in one embodiment will have a computing device for receiving the e-keys. The computing device may be a phone, a watch, a computer chip, or some processing device or storage. The recipient, once receiving the e-keys from a server can then access a link or icons on an app or website of his/her device. The recipient is instructed to press a button or select an icon or link to initiate access with the target vehicle. The action taken by the recipient will cause data packets to be transferred to the electronics of the vehicle. The data packets can include, for example, the encrypted e-keys (e.g., having the access code).

The encrypted e-keys will be accepted and/or validated by the vehicle, and in one embodiment, can also include receipt of the device ID of the recipient desiring the access. Once validated, the recipient will have access to the vehicle. The access may, for example, be in response to the user selecting buttons, icons or app controls on his device, e.g., smartphone or the like. Each time the device sends control data to the vehicle, the control data (e.g., to open the vehicle, start the vehicle, etc.), in one embodiment, the control data can be sent with the server as well for tracking use.

As noted above, the e-keys can be assigned for any period of time, e.g., such as a very temporary period of time or for a longer period of time. For example, a user can assign e-keys to a friend if the user is far from home and the friend needs access to the vehicle that may still be at home. The e-keys can expire, based on the defined period of time for the e-keys. The e-keys can be managed by the user on a website, such as a site managed by cloud services. The user can see all e-keys that have been assigned in the past, which e-keys are active, deactivate any e-keys, see use history associated with any previously assigned e-keys, etc.

In another embodiment, a user can also receive notifications when a vehicle is being accessed, driven or used in a manner that is in violation of the privileges assigned to the e-keys. For instance, if the e-keys were assigned to a valet and the valet attempts to speed excessively during the use of the e-keys, the user can be notified of the privilege breach or violation. In one embodiment, the account associated with the e-keys can act to automatically deactivate the e-keys upon detecting a violation.

In one embodiment, instead of waiting for a user to request that e-keys be sent to a recipient, the recipient may directly request e-keys. For instance, if the vehicle is one that is from a car sharing entity, the user may wish to access a particular car parked as some location. The car may be identified by serial number or some other identifier. The user, in one embodiment, using an application of the car entity can request e-keys. The request can be processed similar to when a user shares his/her keys with an individual. The requesting user waits for the server to issue encrypted e-keys, which are transferred to the vehicle for decryption and verification. The vehicle can then issue activated e-keys to the user for opening the car, starting the car, locking the car, etc. In one embodiment, the user can continue using the vehicle until a pre-determined period of time or during a time that the user wishes to use the vehicle. Vehicle use can be communicated, for the used e-keys, back to the vehicle sharing entity. The vehicle sharing entity can then bill the user for the time used and any incidentals.

Accordingly, it should be understood that the issuing or sharing of e-keys facilitates access and use of vehicles for any defined duration. It should be further understood that issued e-keys can also be issued to multiple individuals at one time. For example, a vehicle owner can have an active set of e-keys on his/her phone. The vehicle owner may also have a set of e-keys active for a child of the home. The vehicle owner may also activate e-keys for service people, mechanics, valet people, etc. These e-keys can co-exist and can all be active at any particular point in time. If both there are two users that wish to ride and/or drive the car, the first user to activate the access via the e-keys will be the e-keys that are logged as active. More specifically, if a husband and wife wish to go to an even in the vehicle, and the wife is the first to activate the vehicle using her e-keys, the e-keys used to activate the vehicle will be the ones that are associated with the active use.

In one embodiment, if the user that activated the vehicle with his/her e-keys does not proceed to drive or ride in the vehicle, the e-keys may be disabled in a safe manner. Thus, in one embodiment, a background signal between the device used to activate the e-keys will communicate with the vehicle to confirm that the device is in the vehicle. In one embodiment, the background signal operates as a tether.

In still another embodiment, if a vehicle is stolen, the owner can access the website or app, and immediately cancel all e-keys for the vehicle. This will act to safely stop the vehicle, e.g., by slowing down the vehicle if it is in motion, or lock the vehicle, report GPS coordinates, etc. The vehicle can, in one embodiment report activity, camera data, voice data, or any other monitoring data associated with the condition that caused the e-keys to be violated.

In other embodiments, the vehicle can also participate and communicate with the server of cloud services to perform either initial assignment of the access codes, verification or monitoring.

Reporting data and history of use can also be logged separately for each e-key that is active or was active. As noted above, the e-keys can be assigned for particular privileges. In one embodiment, the privileges can be assigned by selecting tick boxes, icons, drop down menus, time durations, set limitations, conditions, etc. In some embodiments, a template can be provide for users. A template can have certain predefined privileges that match the assignment of the e-keys. For instance, a template can be provide for a valet, a mechanic, a service store, a child, a spouse. The templates can be pre-defined by the system and can also be adjusted or customized by the owner of the vehicle or admin of the vehicle. Furthermore, although specific reference is made to a vehicle, the embodiment can also be used for other types of devices, homes, structures, real estate lock boxes, lock boxes, safes, robots, electronics, etc.

The various embodiments may be embodied in computer readable media, which is saved in storage. The storage may be saved on cloud storage, data centers, or the like, which are accessible over the Internet. The access may be wired or wireless. In vehicles, the connection to the Internet may be wireless, and the connection can be continuous or non-continuous depending connection. Code on the vehicle electrons can execute at least some of the method operations when not connected and other operations are executed jointly between vehicle electronics (e.g., memory, code and processors of a vehicle) and cloud processing, which may implement one or more servers, either virtual or not.

It will be obvious, however, to one skilled in the art, that the present invention may be practiced without some or all of these specific details. In other instances, well known process operations have not been described in detail in order not to unnecessarily obscure the present invention.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

It should be understood that various examples are shown herein, and the examples and figures should not limit a claimed embodiment to any specific example or figure. To the contrary, it should be understood that various embodiments are possible which can be made by combined features found in the illustrations, description and figures. Thus, some embodiments are possible for specific combinations of figures and parts taken from the various drawings, descriptions to define specific implementations, as supported by the description. Additionally, any of the flow diagrams should not require any embodiments to include any enumerated step, operation or order. Some operations may be taken in different orders from that show as examples in the figures, depending on the desired implantation, as supported by the description.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the description and claims.

What is claimed is:

1. A method for generating service advice for a user account based on remotely obtained diagnostics data from a vehicle, comprising:

receiving a request, at a server, to establish an advisor account for the vehicle associated with the user account, the request identifying a service entity and a vehicle service to be assigned to the service entity, the service entity is configured to receive said diagnostics data of the vehicle;

associating, by the server, the advisor account to the service entity;

sending, by the server, programming data to the vehicle, the programming data used by a computer of the vehicle to capture or collect select diagnostics data that relates to the vehicle service and said server is configured to make accessible said select diagnostics data to the advisor account for the service entity, the advisor account is made accessible to the service entity subsequent to establishing of the advisor account; and receiving, by the server, the select diagnostics data from the vehicle regarding the vehicle service, the select diagnostics data being accessible for viewing and/or processing by a device of the service entity, wherein the service entity is configured to use the select diagnostics data to send a message to the user account regarding a vehicle repair or a suggested vehicle repair determined using the select diagnostics data;

wherein the user account is configured to establish a plurality of advisor accounts, each advisor account is associated with the vehicle and assigned to different aspects of the vehicle, each aspect of the vehicle is configured to receive select diagnostics data that relates to the aspect.

2. The method of claim 1, wherein the vehicle service is related to a vehicle feature, or a vehicle function, or a vehicle operation or combinations thereof; and wherein the advisor account enables remote access to the select diagnostics data of the vehicle, the select diagnostics data being analyzed to determine if a service appointment is suggested for handling vehicle service or notification should be sent to the user account providing additional information or advice regarding the select diagnostics data.

3. The method of claim 1, wherein the select diagnostics data produces updates that identify characteristics or changes in characteristics of the vehicle service that occur from time to time, and the server uses the identified characteristics or changes in characteristics to trigger a notification to the service entity regarding a problem or potential problem regarding the vehicle service.

4. The method of claim 1, wherein the advisor account enables remote access to the select diagnostics data of the vehicle, the select diagnostics data being analyzed to determine if a service appointment is suggested for handling vehicle service or notification should be sent to the user account providing additional information or advice regarding the select diagnostics data.

5. The method of claim 1, wherein the advisor account includes a communication protocol to enable a user of the advisor account to provide advice regarding the vehicle service based on the select diagnostics data, the advice based on analysis of historical failures or repairs for other vehicles having similar circumstances.

6. The method of claim 1, wherein the advisor account is assigned with privileges that enable remote diagnostic of specific aspects of the vehicle that relate to the vehicle service, said remote diagnostics enabling remote advice regarding the vehicle service by the service entity, wherein said remote diagnostics implements one or more application programming interfaces (APIs).

7. The method of claim 1, wherein advisor account defines a role that limits or enables access to one or more aspects of the vehicle, the advisor account may be for one of a dealer service entity, a dealership, a repair shop, a mechanic, a car service center, a private service, a tire service, an oil service, a friend, or an internet service.

8. The method of claim 1, wherein access to said advisor account is enabled via a website or an application, the website or application provides user interfaces for creating accounts, or editing accounts, or viewing activity or history, or combinations thereof.

9. The method of claim 1, wherein the vehicle service is for one or more of engine oil, engine light, oil pressure, battery status, electric powertrain status, phone lists, temperature, cooling system, charging system, radio settings, geo-location data, advisor history, tire rotation, tire heath, oil filter, battery, brake pads, brake systems, wipers, coolant, brake oil, transmission fluid, air filter, recall condition, broken part, service cycle, maintenance updates, part updates, advertisements regarding the vehicle, suggestions, or combinations of two or more thereof.

10. A method for generating service advice for a user account based on remotely obtained diagnostics data from a vehicle, comprising:
   receiving a request, at a server, to establish an advisor account for the vehicle associated with the user account, the request identifying a service entity and a vehicle service to be assigned to the service entity, the service entity is configured to receive said diagnostics data of the vehicle;
   associating, by the server, the advisor account to the service entity;
   sending, by the server, programming data to the vehicle, the programming data used by a computer of the vehicle to store select diagnostics data that relates to the vehicle service and said server is configured to make accessible said select diagnostics data to the advisor account for the service entity, the advisor account is made accessible to the service entity subsequent to establishing of the advisor account; and
   receiving, by the server, the select diagnostics data from the vehicle regarding the vehicle service, the select diagnostics data being accessible for viewing and/or processing by a device of the service entity,
   wherein the select diagnostics data is used to identify characteristics or changes in characteristics that relate to the vehicle service, and the server uses the identified characteristics or changes in characteristics to trigger a notification to the service entity regarding a problem or potential problem regarding the vehicle service;
   wherein the user account is configured to establish a plurality of advisor accounts, each advisor account is associated with the vehicle and assigned to different aspects of the vehicle, each aspect of the vehicle is configured to receive select diagnostics data that relates to the aspect.

11. The method of claim 10, wherein the vehicle service is related to a vehicle feature, or a vehicle function, or a vehicle operation or combinations thereof.

12. The method of claim 10, wherein the advisor account enables remote access to the select diagnostics data of the vehicle, the select diagnostics data being analyzed to determine if a service appointment is suggested for handling vehicle service or notification should be sent to the user account providing additional information or advice regarding the select diagnostics data.

13. The method of claim 10, wherein the advisor account includes a communication protocol to enable a user of the advisor account to provide advice regarding the vehicle service based on the select diagnostics data, the advice based on analysis of historical failures or repairs for other vehicles having similar circumstances.

14. The method of claim 10, wherein the advisor account is assigned with privileges that enable remote diagnostic of specific aspects of the vehicle that relate to the vehicle service, said remote diagnostics enabling remote advice regarding the vehicle service by the service entity, wherein said remote diagnostics implements one or more application programming interfaces (APIs).

15. The method of claim 10, wherein advisor account defines a role that limits or enables access to one or more aspects of the vehicle, the advisor account may be for one of a dealer service entity, a dealership, a repair shop, a mechanic, a car service center, a private service, a tire service, an oil service, a friend, or an Internet service.

16. The method of claim 10, wherein access to said advisor account is enabled via a website or an application, the website or application provides user interfaces for creating accounts, or editing accounts, or viewing activity or history, or combinations thereof.

17. The method of claim 10, wherein the vehicle service is for one or more of engine oil, engine light, oil pressure, battery status, electric powertrain status, phone lists, temperature, cooling system, charging system, radio settings, geo-location data, advisor history, tire rotation, tire heath, oil filter, battery, brake pads, brake systems, wipers, coolant, brake oil, transmission fluid, air filter, recall condition, broken part, service cycle, maintenance updates, part updates, advertisements regarding the vehicle, suggestions, or combinations of two or more thereof.

* * * * *